United States Patent
Offield, II et al.

(10) Patent No.: US 11,996,680 B1
(45) Date of Patent: May 28, 2024

(54) ANTIMICROBIAL SWITCH PANEL SYSTEM AND METHOD

(71) Applicants: Travis Wayne Offield, II, Eastland, TX (US); Ronney Wayne Johnson, Krum, TX (US); Thomas Michael Fox, Sanger, TX (US)

(72) Inventors: Travis Wayne Offield, II, Eastland, TX (US); Ronney Wayne Johnson, Krum, TX (US); Thomas Michael Fox, Sanger, TX (US)

( * ) Notice: Subject to any disclaimer, the term of this patent is extended or adjusted under 35 U.S.C. 154(b) by 238 days.

(21) Appl. No.: 17/670,439

(22) Filed: Feb. 12, 2022

Related U.S. Application Data

(60) Provisional application No. 63/157,024, filed on Mar. 5, 2021.

(51) Int. Cl.
*H02B 3/00* (2006.01)
*H01H 23/04* (2006.01)

(52) U.S. Cl.
CPC ........ *H02B 3/00* (2013.01); *B29K 2995/0037* (2013.01); *H01H 23/04* (2013.01)

(58) Field of Classification Search
CPC ... B29K 2995/0037; H01H 23/04; H02B 3/00
See application file for complete search history.

(56) References Cited

U.S. PATENT DOCUMENTS

| 2014/0224519 A1* | 8/2014 | Mallak | H01H 23/04 156/60 |
| 2021/0298308 A1* | 9/2021 | Hackemeyer | A01P 1/00 |

\* cited by examiner

*Primary Examiner* — Hoa C Nguyen
*Assistant Examiner* — Amol H Patel
(74) *Attorney, Agent, or Firm* — Kevin Mark Klughart

(57) ABSTRACT

An antimicrobial switch panel (ASP) system/method allowing for retrofit of existing switch panels with protective antimicrobial covers for toggle switch levers is disclosed. The disclosed system incorporates a toggle switch cover (TSC) formed from a plastic molded extrusion (PME) that is impregnated with an antimicrobial compound (AMC). The PME includes an outer tactile surface (OTS) and an inner capture recess (ICR). The ICR is configured to conform to the outer surface of a toggle switch (TSW) toggle switch lever (TSL) and includes one or surfaces more configured with protrusions and/or indentations that affect mechanical coupling between the TSL and the PME when the ICR is mated with the TSL. The OTS may be configured with a variety of tactile configurations that identify the function of the TSW and/or include a PME colorant that identifies the function of the TSW and/or provide for photoluminescent operation of the PME.

18 Claims, 80 Drawing Sheets

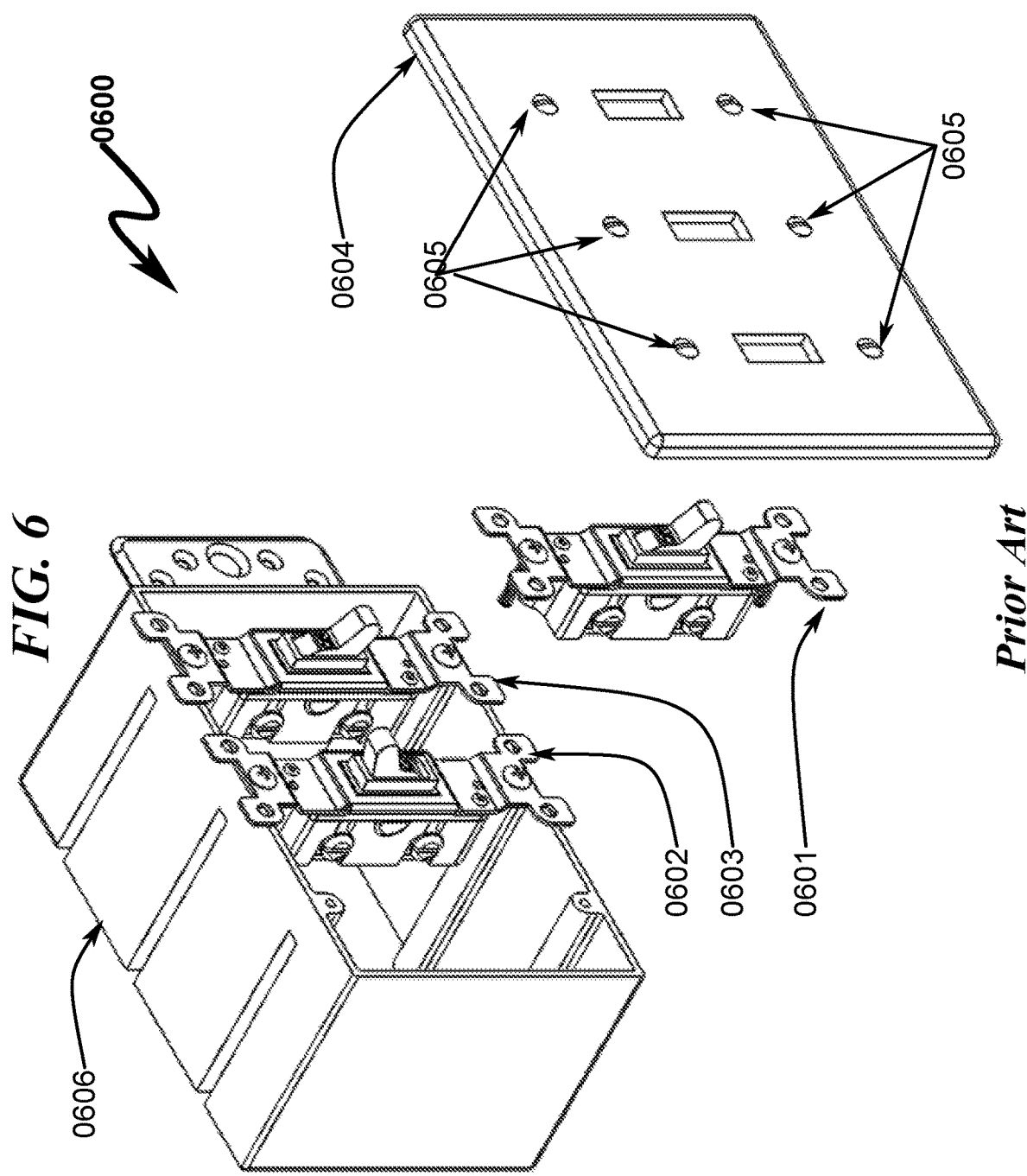

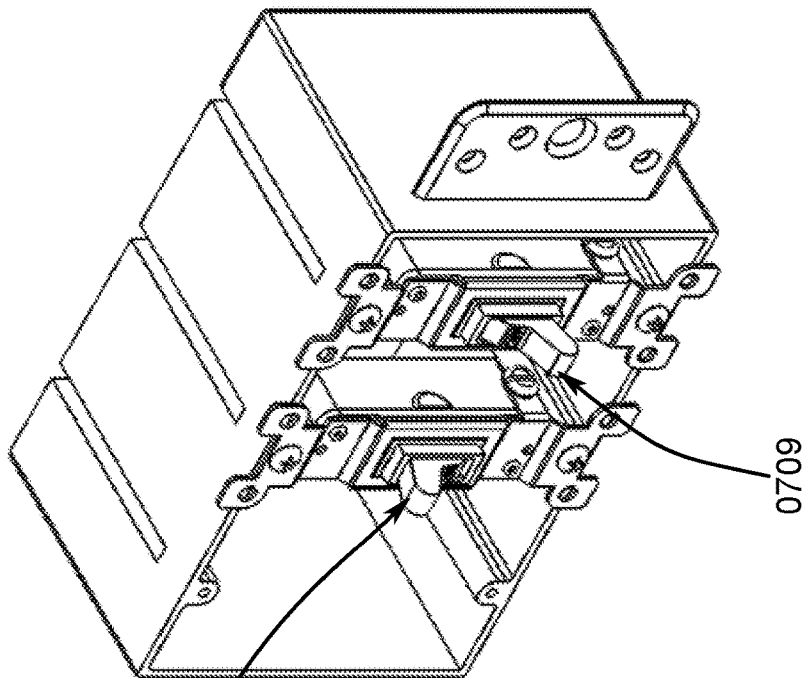
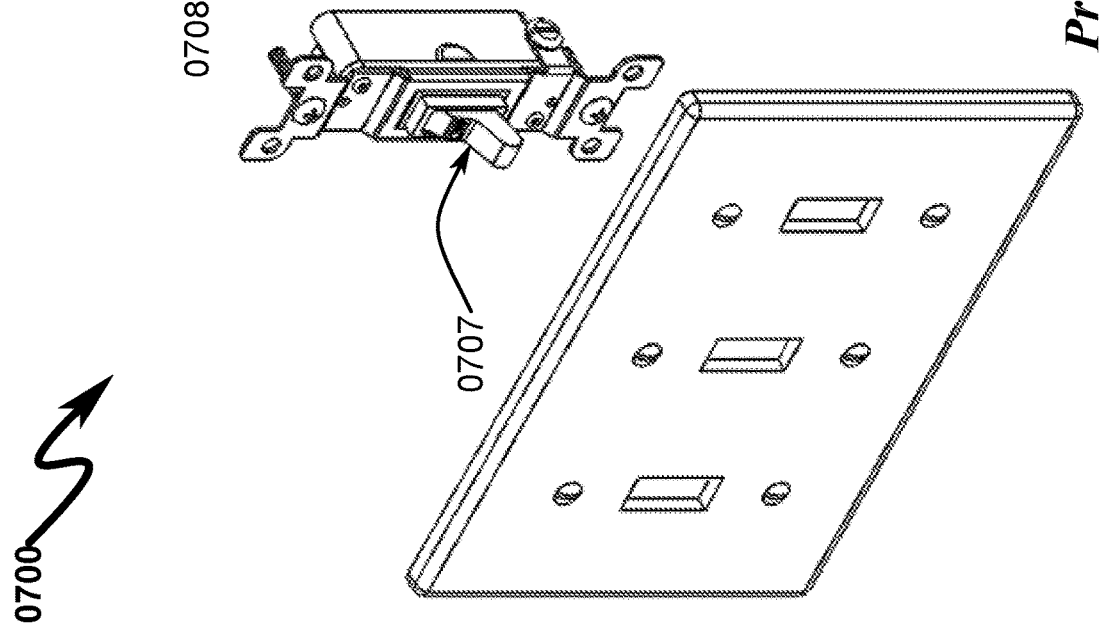
FIG. 7 — Prior Art

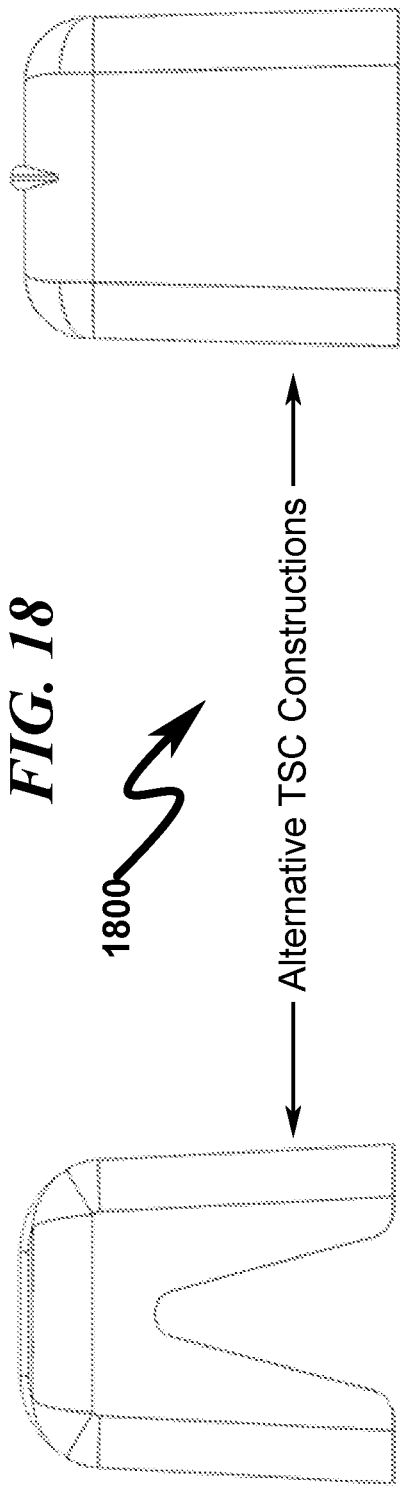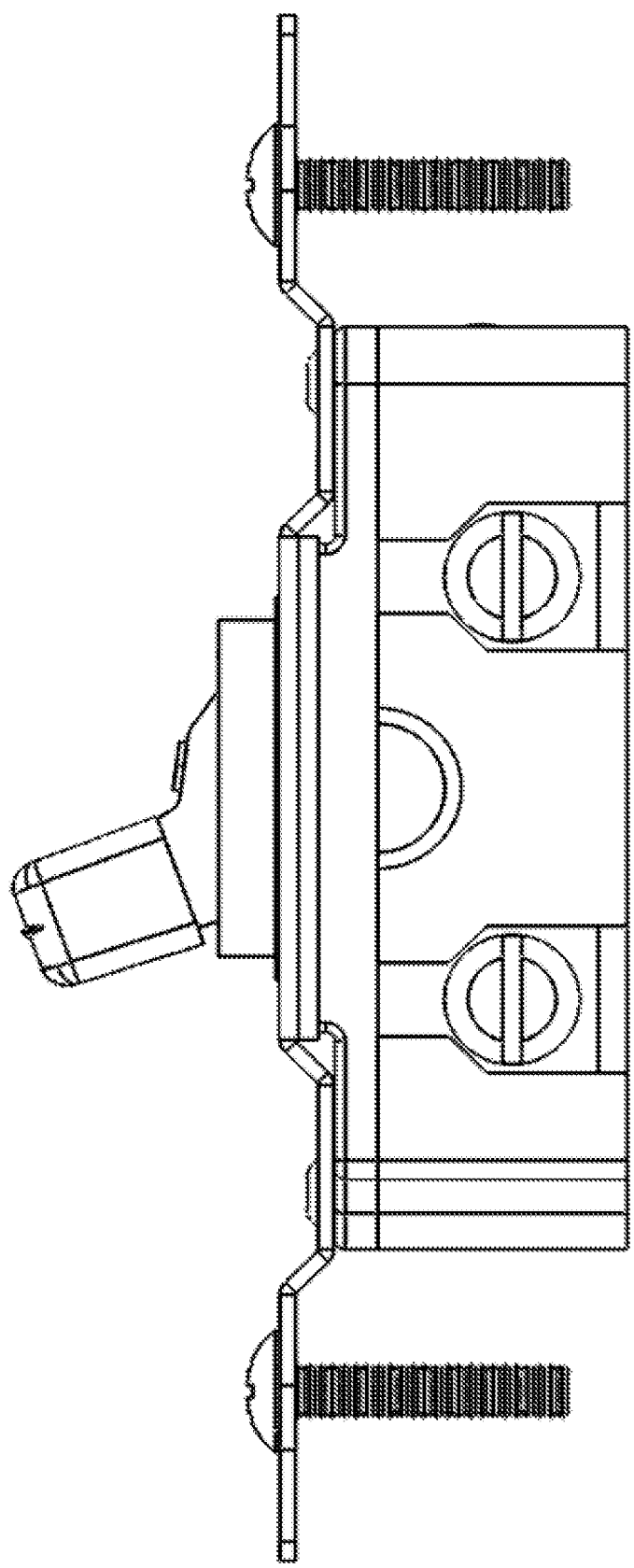
FIG. 18
1800
◄── Alternative TSC Constructions ──►

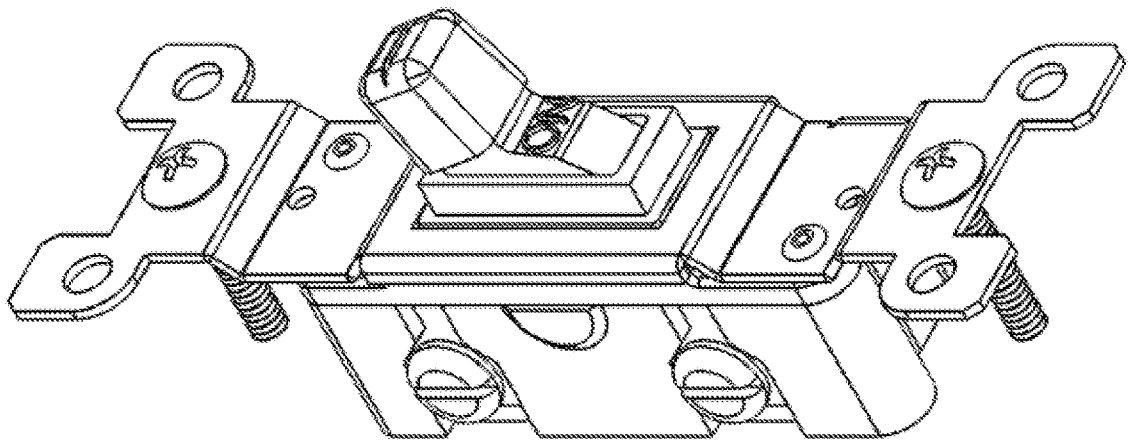
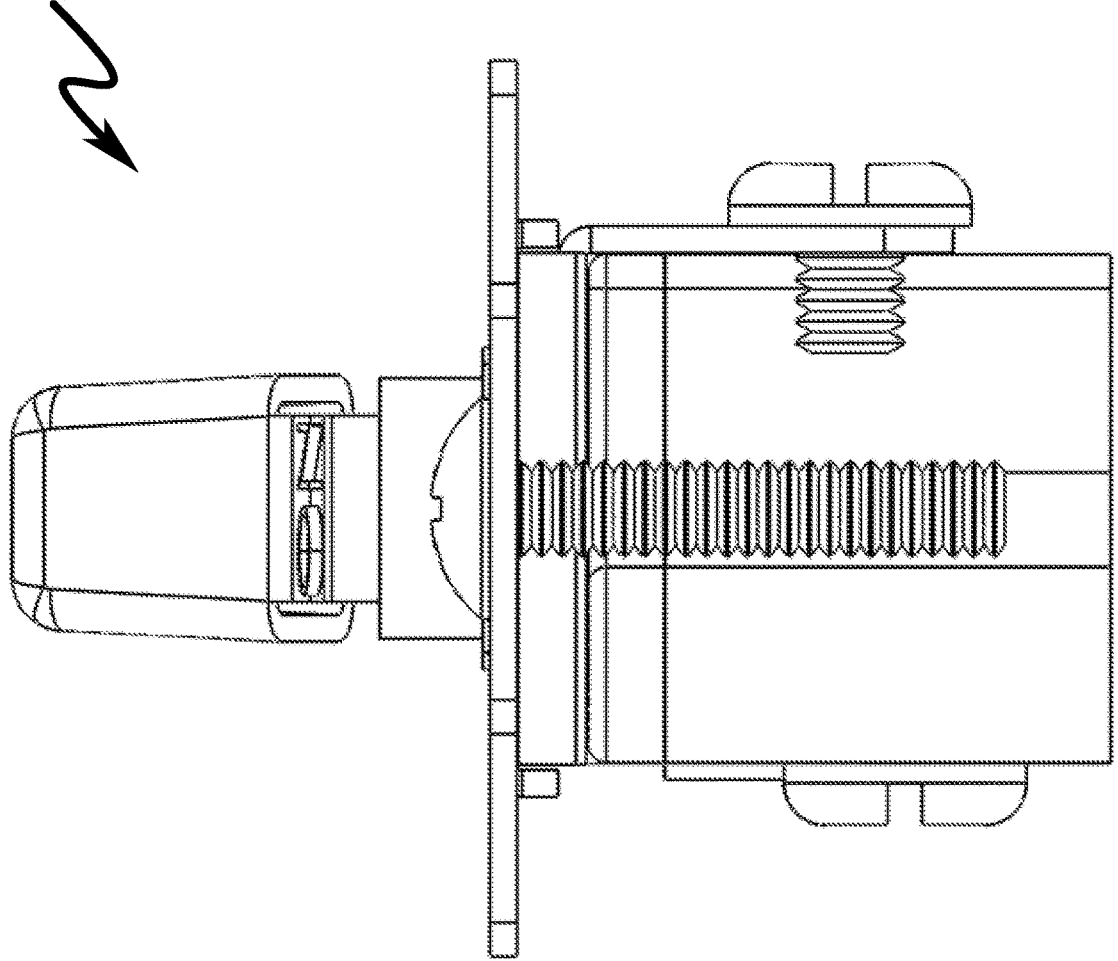
FIG. 21

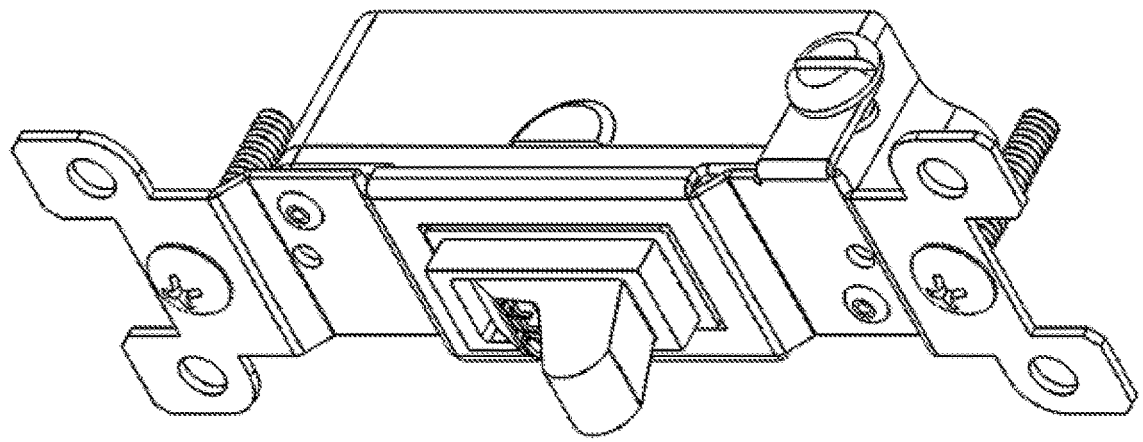
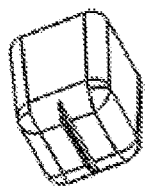
FIG. 23
2300
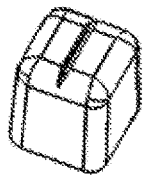
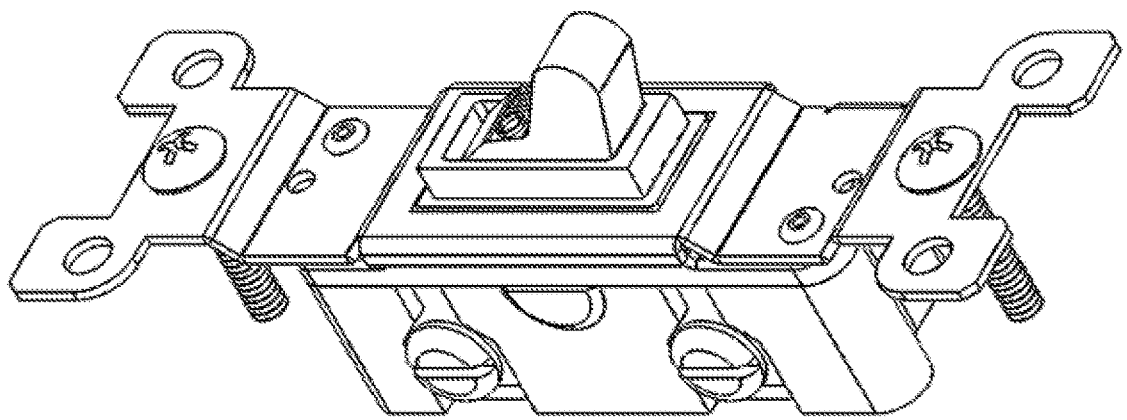

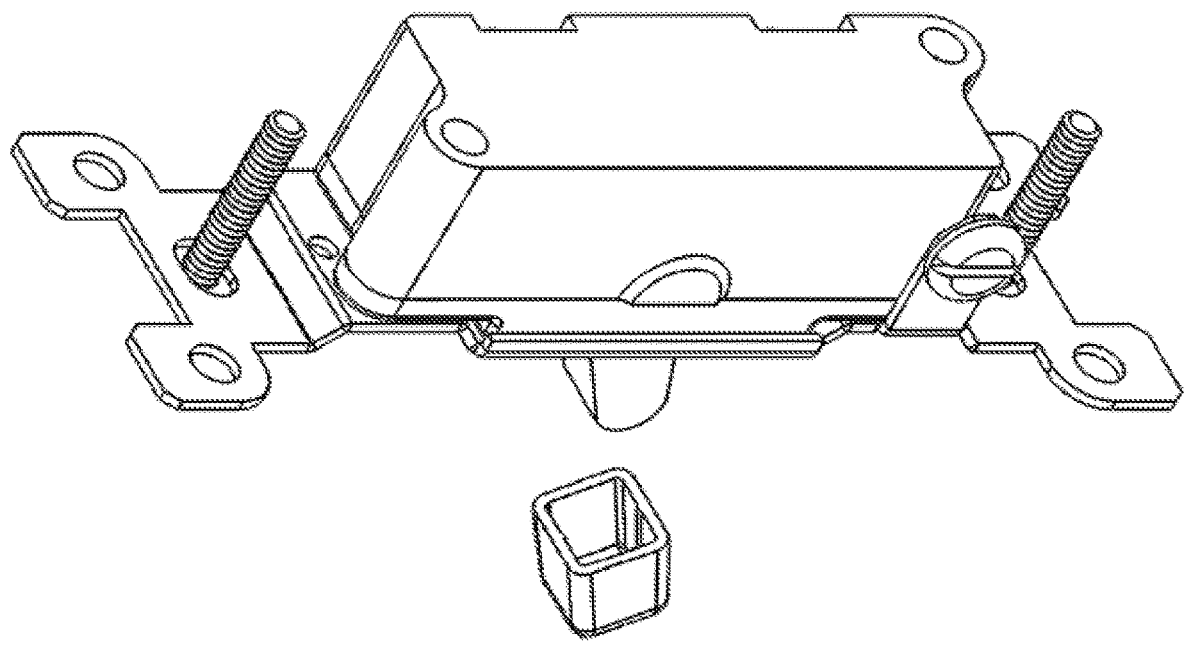
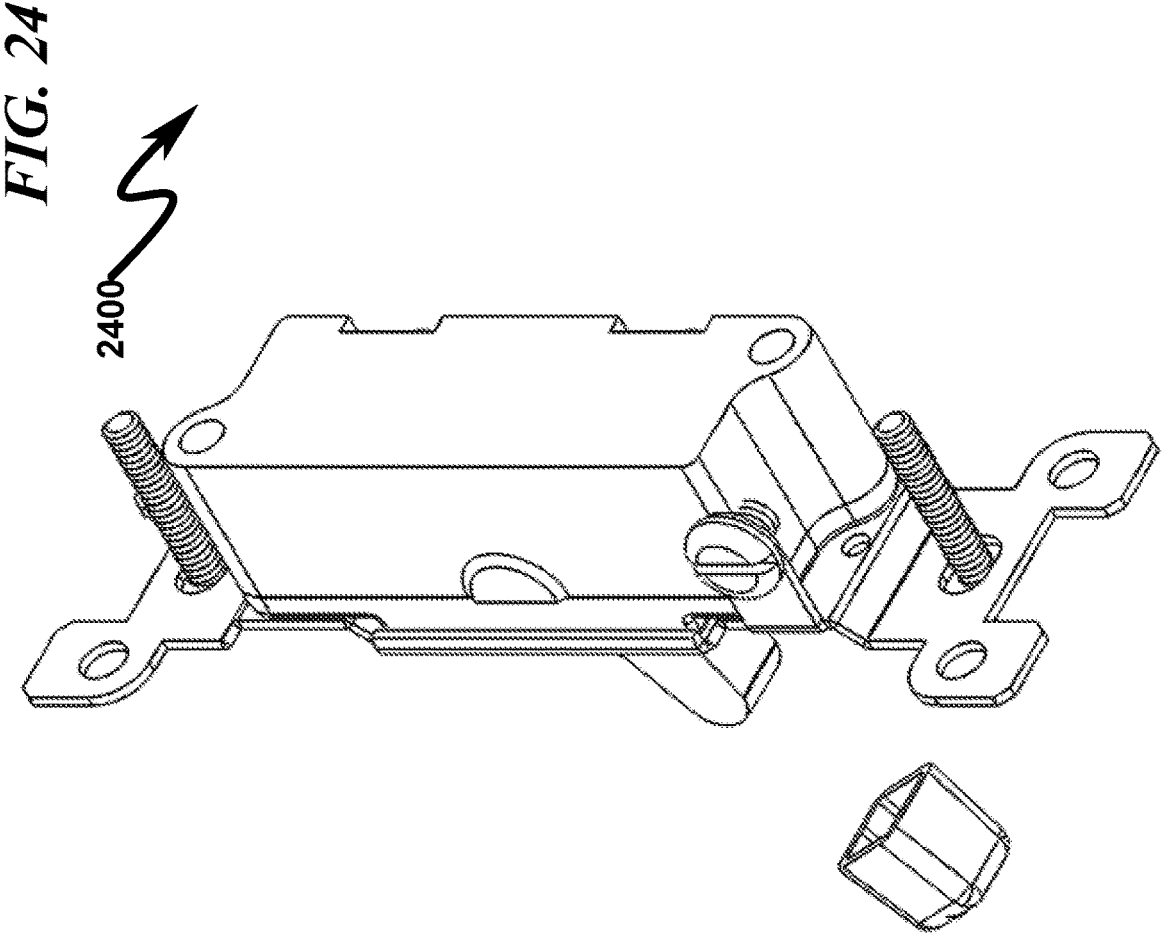
FIG. 24

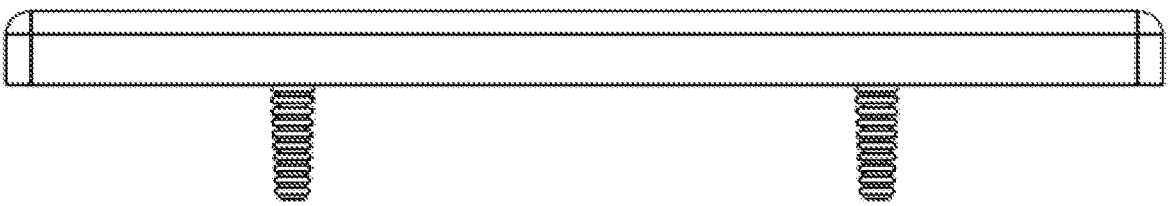
FIG. 51

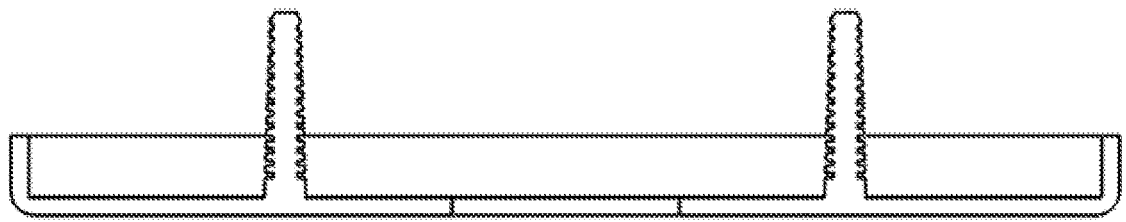
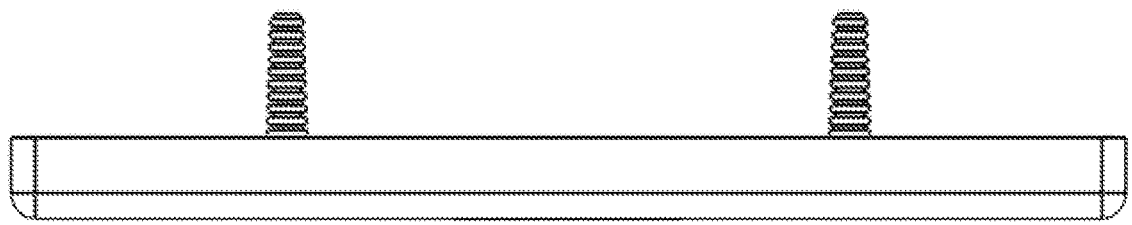
FIG. 52

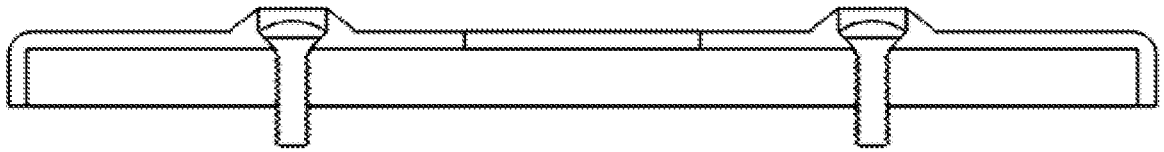
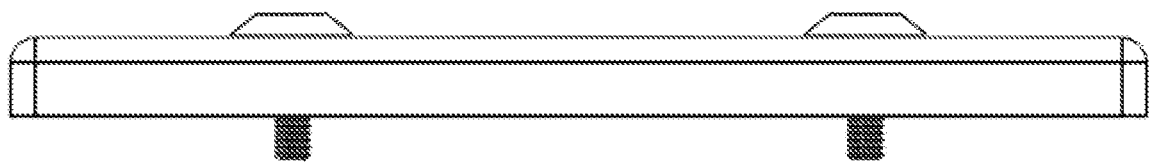
FIG. 59

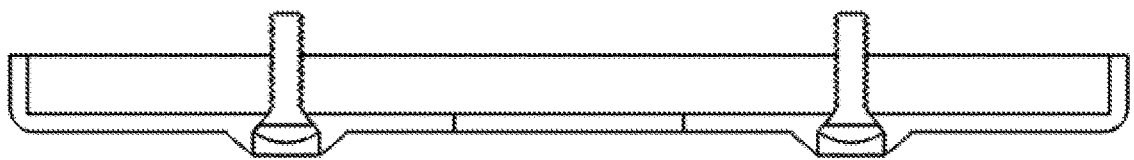
FIG. 60
6000
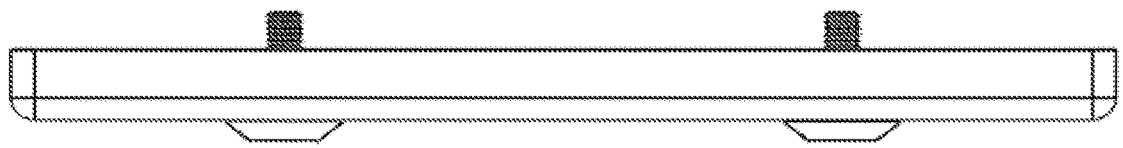

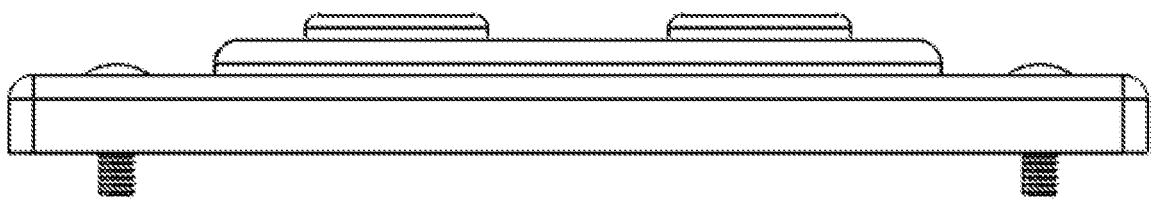
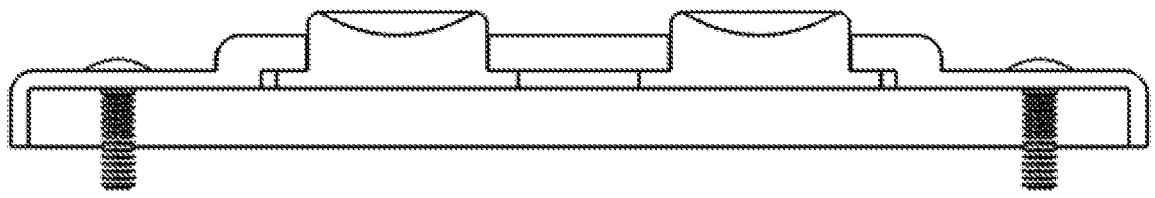
FIG. 75
7500
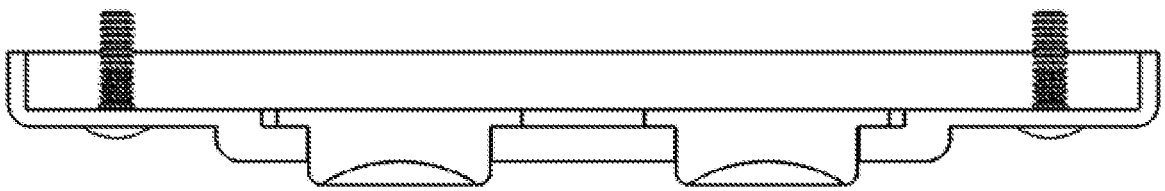
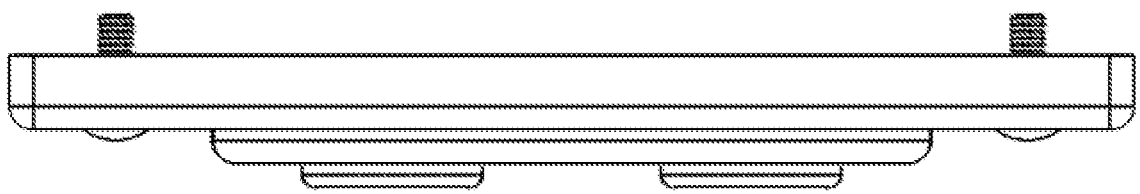

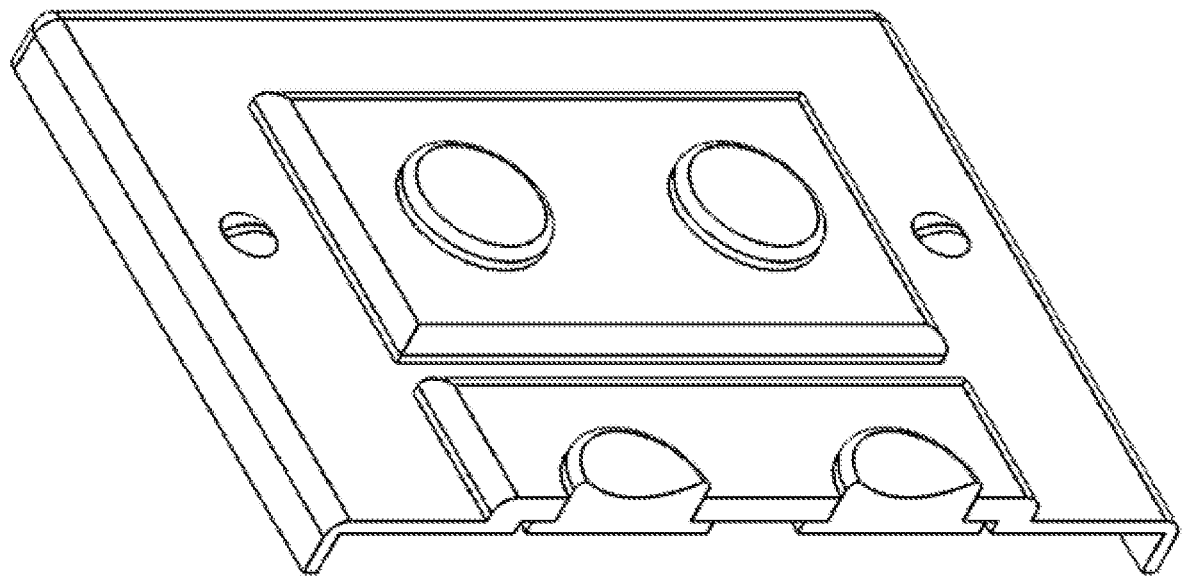
FIG. 79
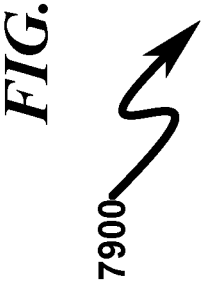
7900
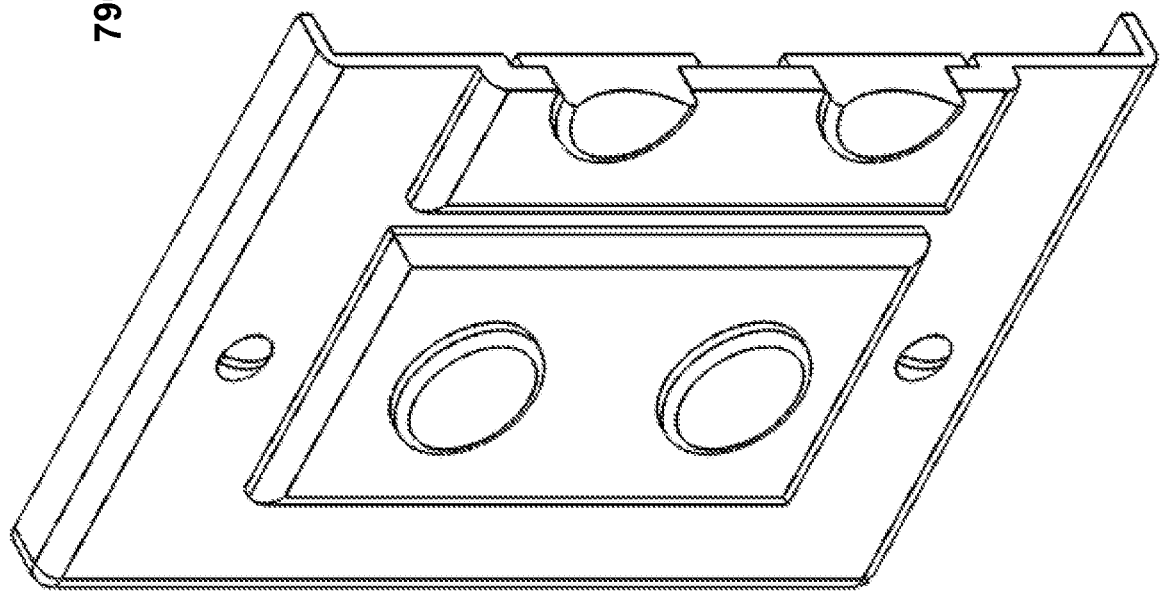

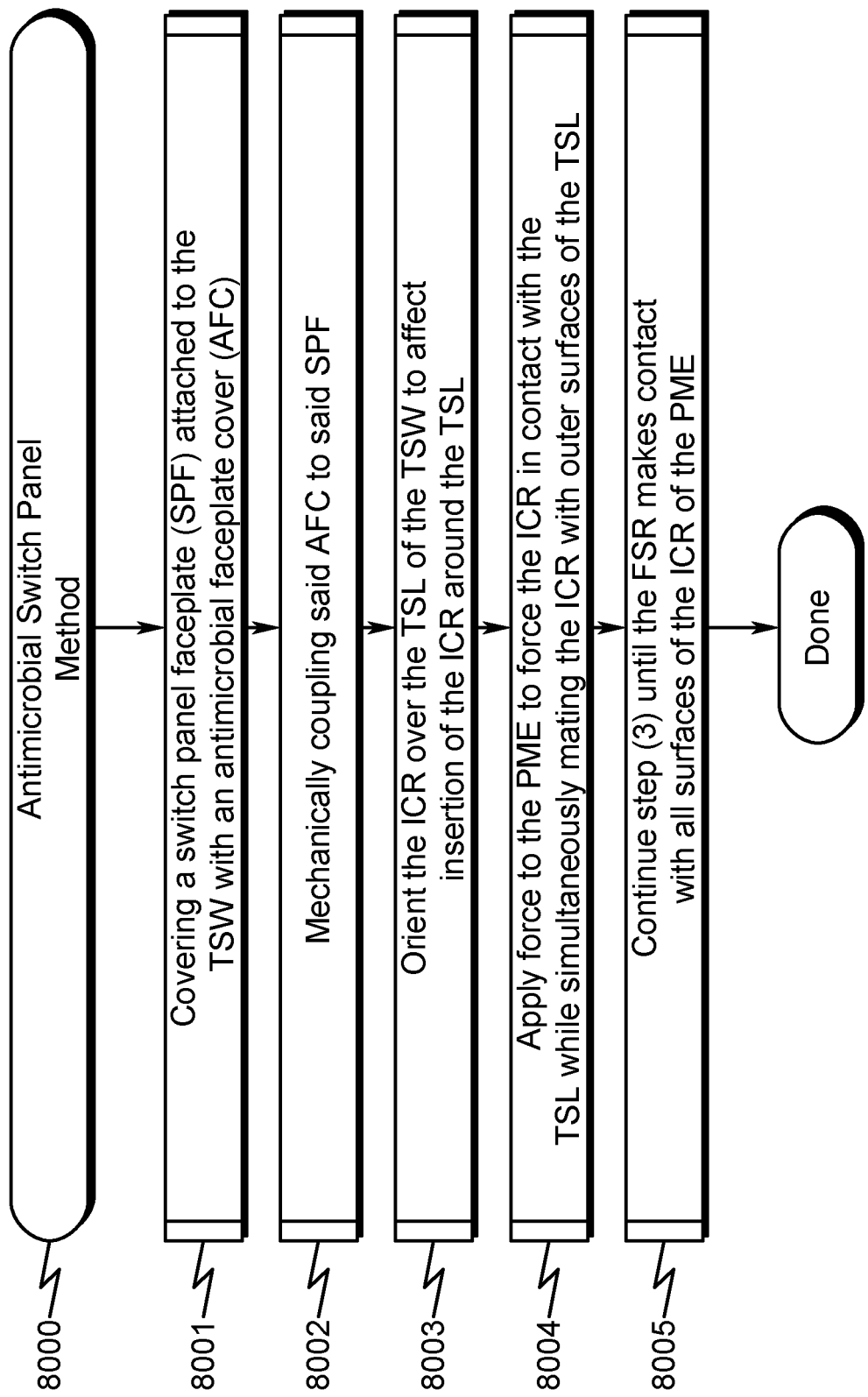

US 11,996,680 B1

ANTIMICROBIAL SWITCH PANEL SYSTEM AND METHOD

CROSS REFERENCE TO RELATED APPLICATIONS

Provisional Patent Applications

This patent application claims benefit under 35 U.S.C. § 119 and incorporates by reference United States Provisional Patent Application for ANTIMICROBIAL SWITCH PANEL SYSTEM AND METHOD by inventors Travis Wayne Offield II, Ronney Wayne Johnson, and Thomas Michael Fox, filed electronically with the USPTO on 2021 Mar. 5, with Ser. No. 63/157,024, EFS ID 42099051, confirmation number 5362, docket TWO-2021-01P.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to a system and method for retrofitting switch panels with antimicrobial functionality. Without limitation, the present invention includes a toggle switch cover (TSC) formed from a plastic molded extrusion (PME) that is impregnated with an antimicrobial compound (AMC). This and other features of the invention permit an existing switch panel to be retrofitted to prevent the spread of disease from human contact with components of the switch panel.

BACKGROUND AND PRIOR ART (0100)-(0800)

FIG. 1 (0100)-FIG. 8 (0800) depict a typical switch panel incorporating toggle switches. These switch panels typically contain one or more toggle switches (TSW) (0601, 0602, 0603) and a switch panel faceplate (SPF) (0604) mounted with screws (0605) to a switch panel enclosure (SPE) (0606). Each of the TSW (0601, 0602, 0603) has an associated toggle switch lever (TSL) (0607, 0608, 0609) used to activate/deactivate the TSW (0601, 0602, 0603) electrical switching action.

While this type of switch panel is common in every building structure, there exists an issue with this design in terms of the spread of bacteria and/or viruses in terms of contact spread with the TSW (0601, 0602, 0603), SPF (0604) and/or switch panel screws (SPS) (0605). Any contact with these areas when activating/deactivating the TSL (0607, 0608, 0609) by a switch panel operator (SPO) may result in the spread of bacteria and/or viruses from one SPO to another. Currently there is no methodology available to ensure the elimination of contact spread from one SPO to another absent hand cleansing before and after operation of the TSL by the SPO.

This deficiency in the prior art has been exacerbated within the last year by the spread of the COVID-19 virus that is highly transmissible both by air and by contact spread. Additionally, the ease of air and/or droplet transmission of the COVID-19 virus without actual contact may produce situations where the TSW (0601, 0602, 0603), SPF (0604) and/or SPS (0605) may be contaminated without physical contact and thus be contaminated prior to contact by the SPO. Again, the prior art does not address how this situation may be corrected or mitigated.

BRIEF SUMMARY OF THE INVENTION

The present invention pertains to a system and method and wherein an electrical switch panel (ESP) may be retrofitted in the field with antimicrobial protective coverings (APC) that mitigate the spread of bacteria and/or viruses that may be present on the surface of the TSW, SPF and/or SPS. These APC may take the form of toggle switch covers (TSC), faceplate covers (FPC), and/or other variants to ensure that SPO contact with the switch panel components is guaranteed to occur only with elements that have functional antimicrobial protection.

BRIEF DESCRIPTION OF THE DRAWINGS

For a fuller understanding of the advantages provided by the invention, reference should be made to the following detailed description together with the accompanying drawings wherein:

FIG. 6 illustrates a front left top perspective assembly view of a prior art toggle switch panel;

FIG. 7 illustrates a front right top perspective assembly view of a prior art toggle switch panel;

FIG. 18 illustrates a left side view of a preferred exemplary embodiment of a toggle switch (TSW) incorporating a toggle switch cover (TSC) over the toggle switch lever (TSL) (also showing alternative TSC configurations);

FIG. 21 illustrates bottom side and bottom left front perspective views of a preferred exemplary embodiment of a toggle switch (TSW) incorporating a toggle switch cover (TSC) over the toggle switch lever (TSL);

FIG. 23 illustrates bottom left front and bottom right front perspective assembly views of a preferred exemplary embodiment of a toggle switch (TSW) incorporating a toggle switch cover (TSC) over the toggle switch lever (TSL);

FIG. 24 illustrates bottom right rear and top right rear perspective assembly views of a preferred exemplary embodiment of a toggle switch (TSW) incorporating a toggle switch cover (TSC) over the toggle switch lever (TSL);

FIG. 51 illustrates a left side view and left side section view of a preferred exemplary invention switch panel screw (SPS) replacement configuration;

FIG. 52 illustrates a right side view and right side section view of a preferred exemplary invention switch panel screw (SPS) replacement configuration;

FIG. 59 illustrates a left side view and left side section view of a preferred exemplary invention switch panel screw (SPS) antimicrobial protection configuration;

FIG. 60 illustrates a right side view and right side section view of a preferred exemplary invention switch panel screw (SPS) antimicrobial protection configuration;

FIG. 75 illustrates detail left and right side and right side and left side section views of a preferred exemplary embodiment of a rocker switch panel (RSP) faceplate (RSF) embodiment of the present invention;

FIG. 79 illustrates front a detail top right perspective section view and front top left section view of a preferred exemplary embodiment of a rocker switch panel (RSP) faceplate (RSF) embodiment of the present invention; and FIG. 80 illustrates a flowchart depicting an exemplary invention method.

DESCRIPTION OF THE PRESENTLY PREFERRED EXEMPLARY EMBODIMENTS

Figure 1:
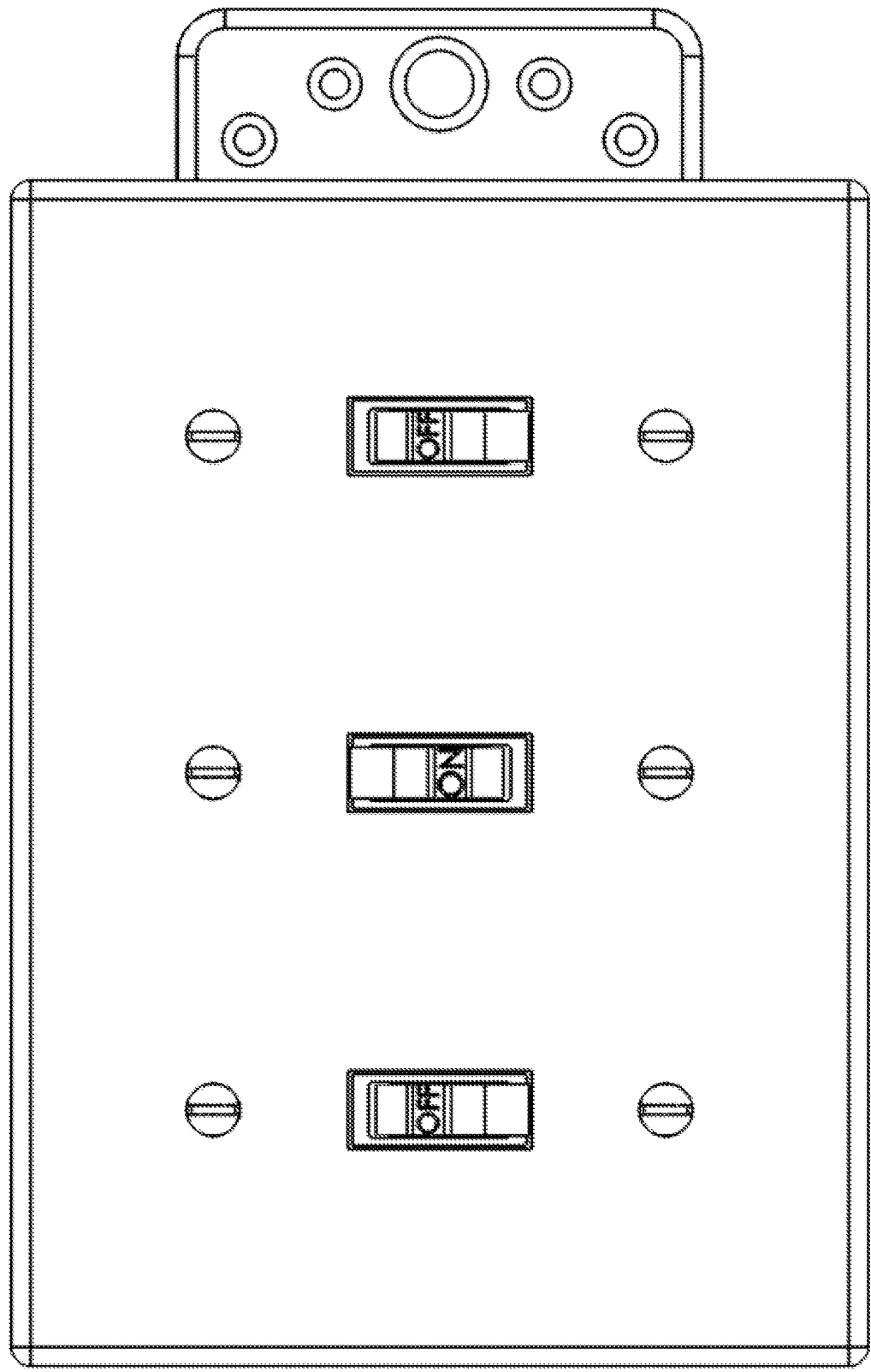
FIG. 1 illustrates a front view of a prior art toggle switch panel.
Figure 2:
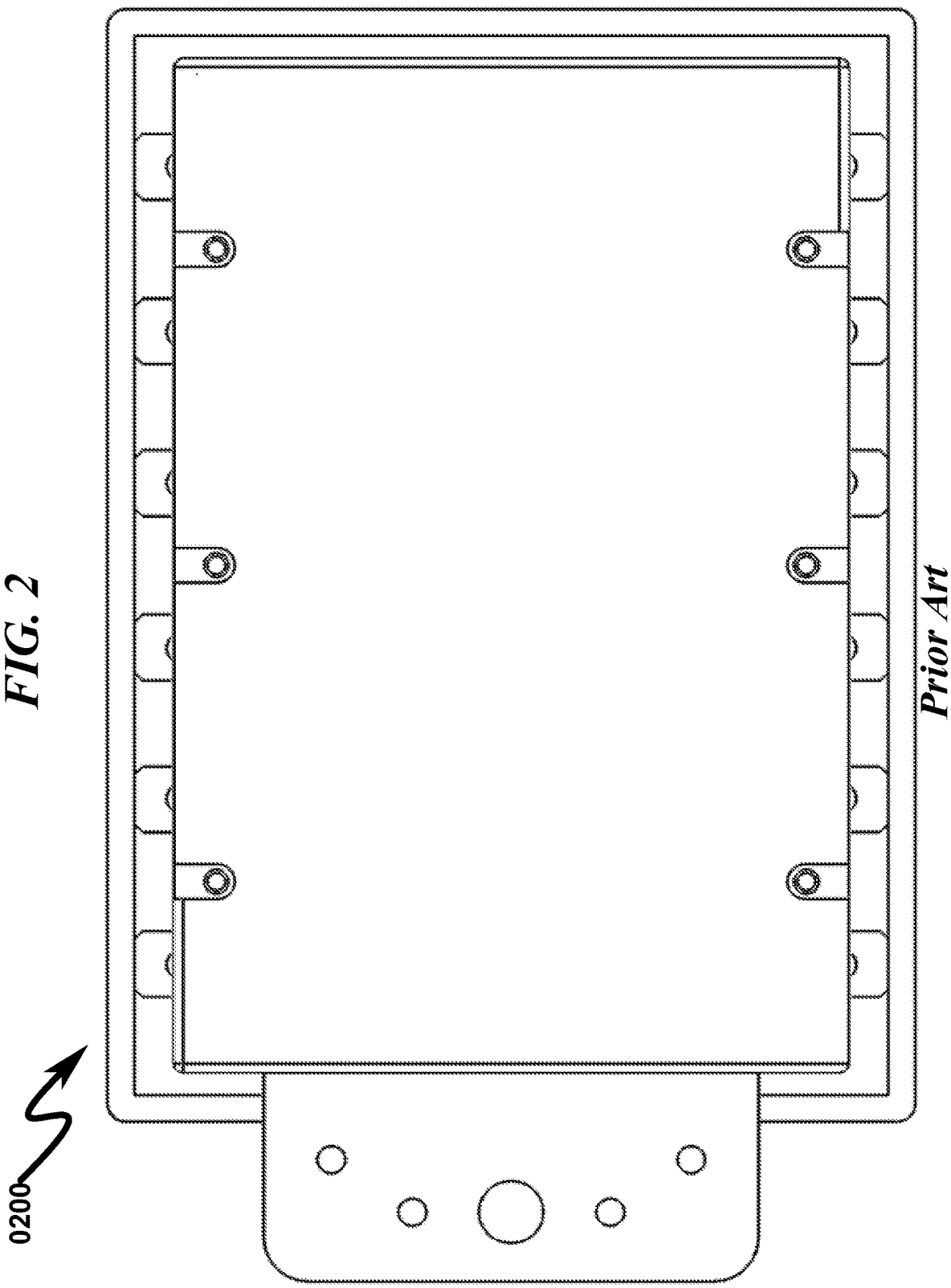
FIG. 2 illustrates a rear view of a prior art toggle switch panel.
Figure 3:
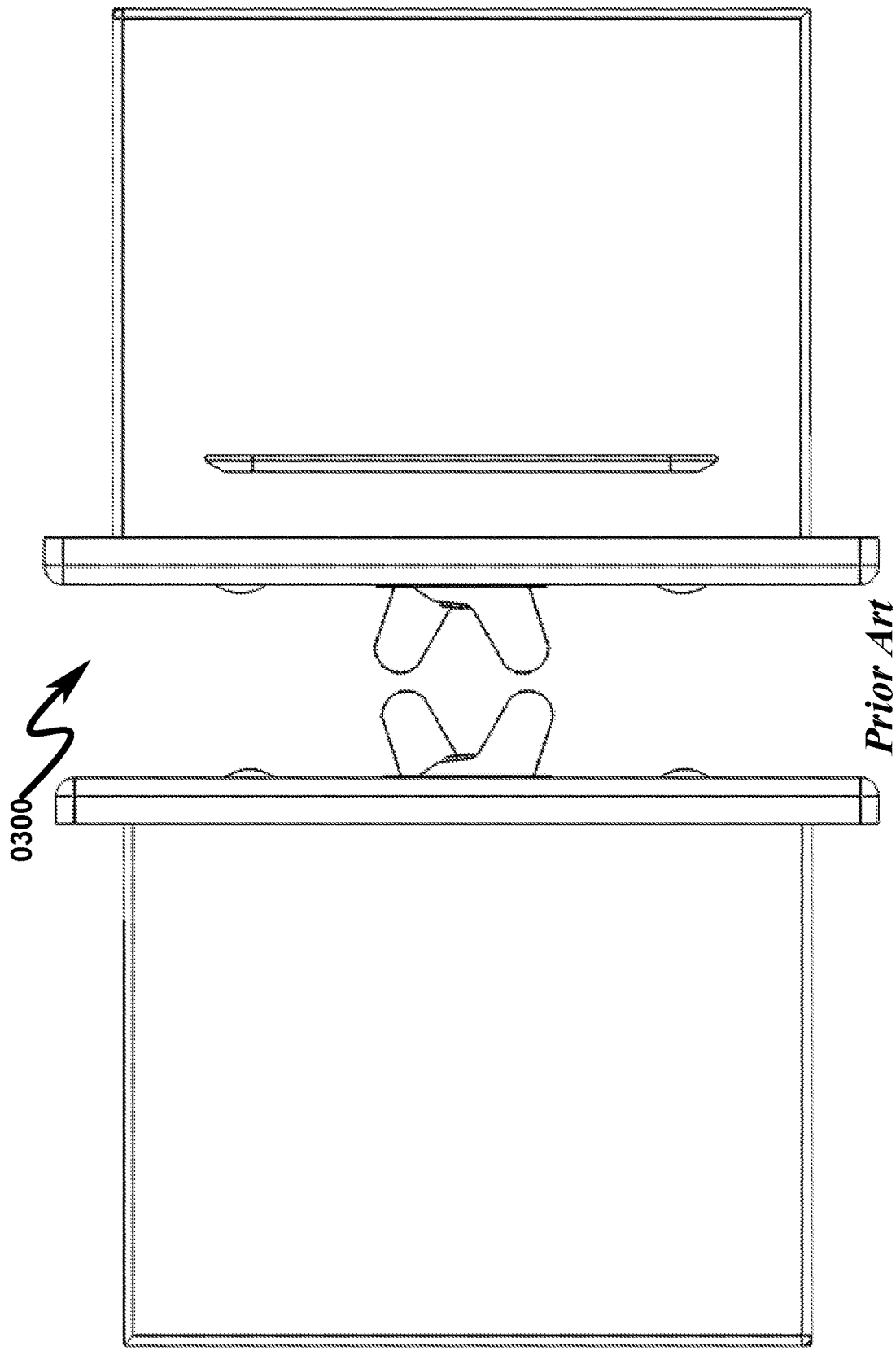
FIG. 3 illustrates a left and right views of a prior art toggle switch panel.
Figure 4:
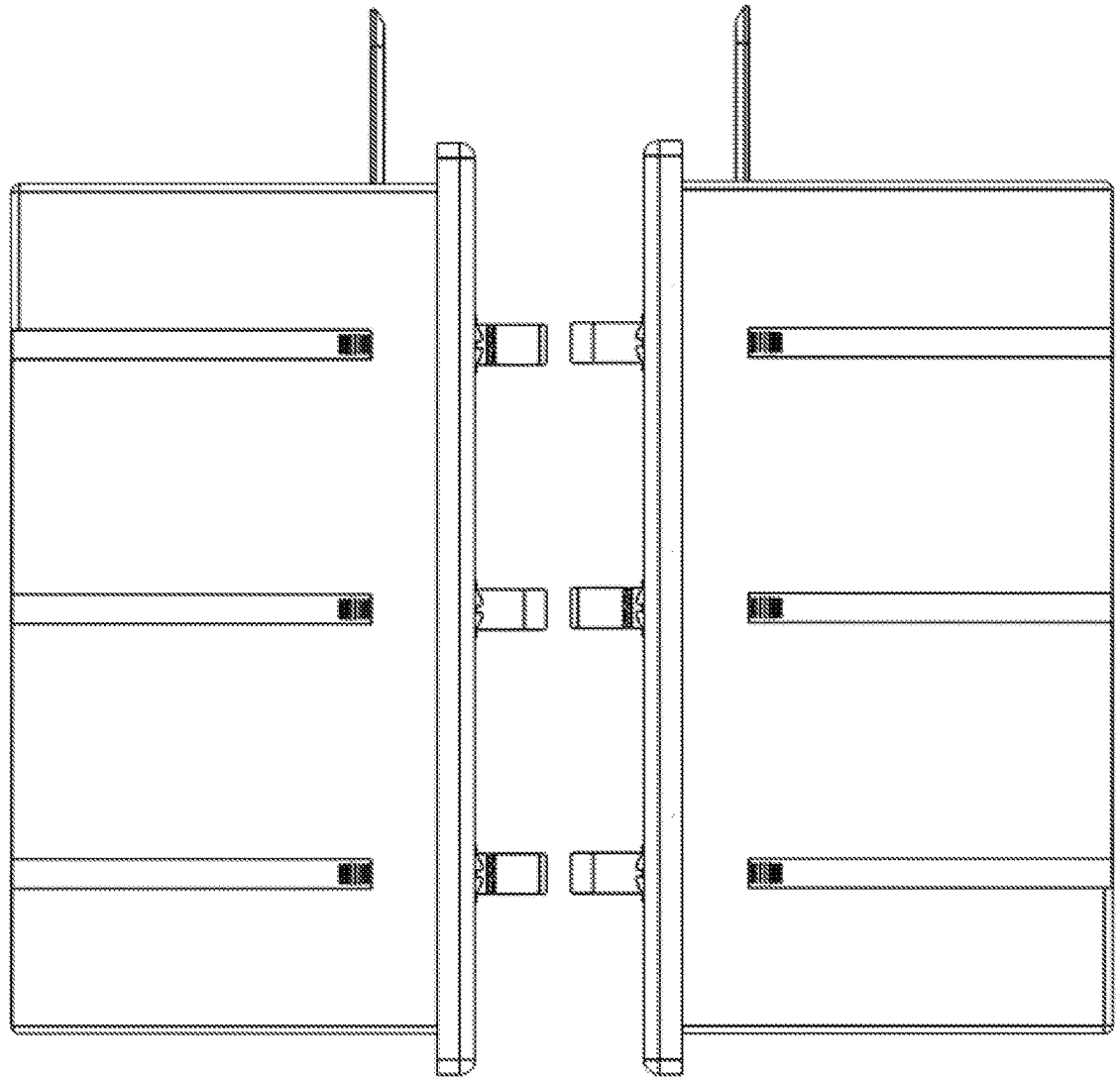
FIG. 4 illustrates a top and bottom views of a prior art toggle switch panel.
Figure 5:
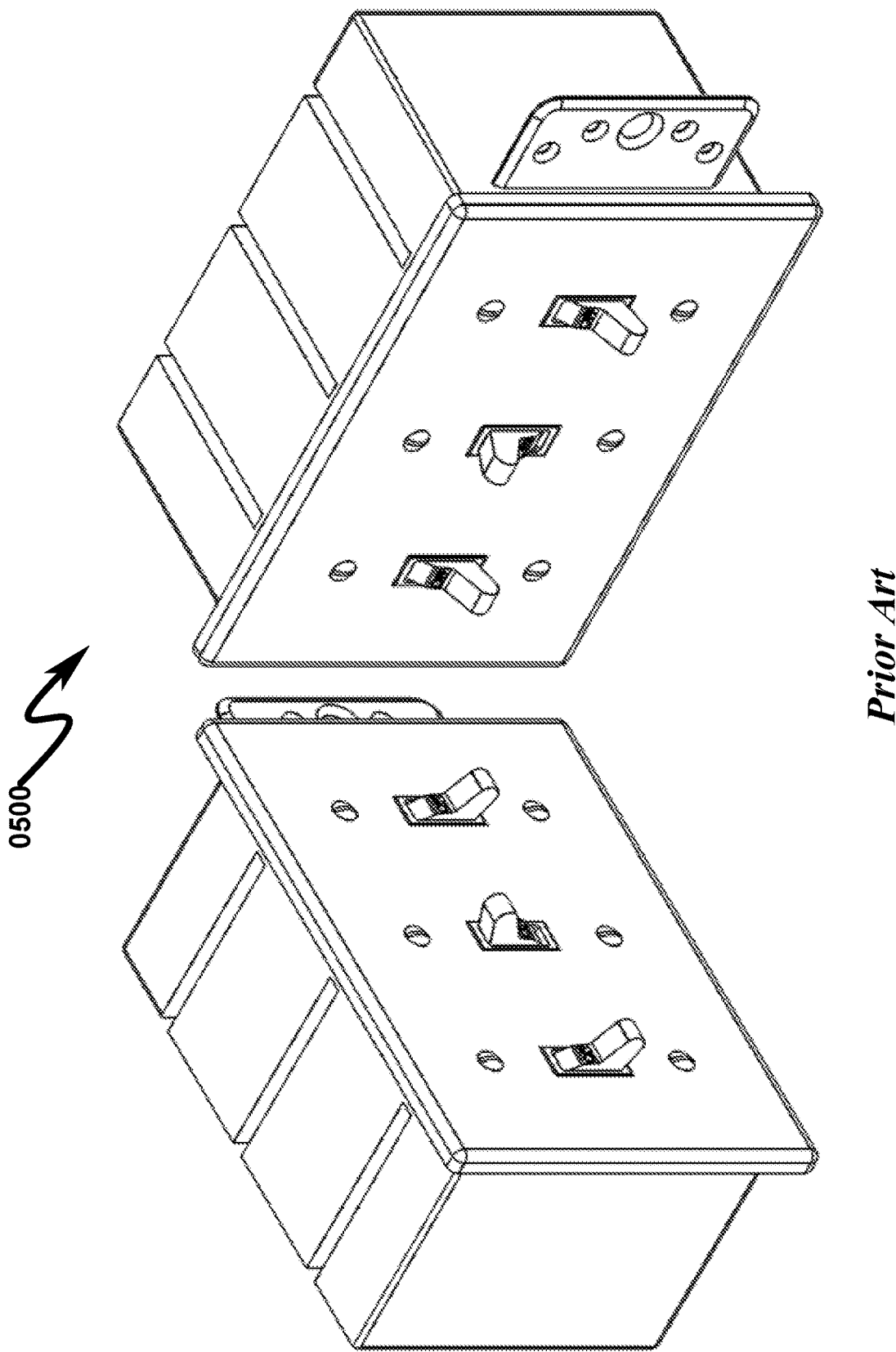
FIG. 5 illustrates front left top and front right top perspective views of a prior art toggle switch panel.
Figure 8:
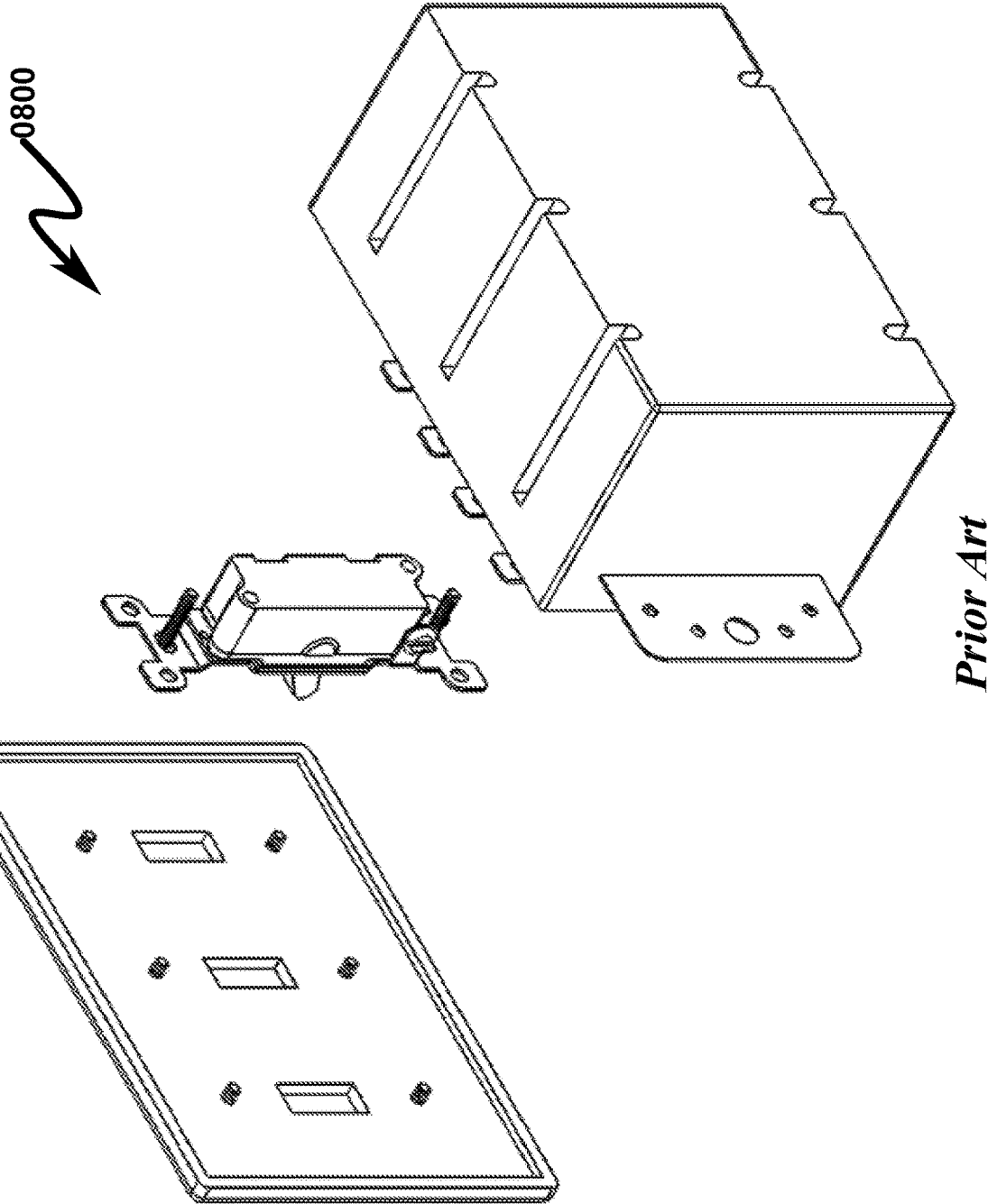
FIG. 8 illustrates a rear right top perspective assembly view of a prior art toggle switch panel.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an ANTIMICROBIAL SWITCH PANEL SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Antimicrobial Impregnation Not Limitive

The present invention anticipates that in many preferred embodiments the plastic utilized for construction of the component elements depicted herein will utilize copper or copper oxide impregnation. This impregnation typically utilizes cuprous oxide microparticles in a batch to a final concentration of 2.6% w/w but other antimicrobial additives having other concentrations also be may implemented in many invention embodiments.

Plastic Not Limitive

The specific type of plastic used in the construction of the present invention is not limited and may comprise any known plastic that is amenable to injection molding and/or extrusion.

Plastic Molded Extrusion (PME) Not Limitive

The present invention is described herein in terms of a plastic molded extrusion (PME). However, this term should be broadly interpreted to include any form of plastic injection molding (PIM) or similar manufacturing techniques where a plastic material is deformed or formed according to the shapes depicted herein and functionally equivalent forms. These fabrication techniques may also include milling/turning plastic material to conform to these shapes and their functional equivalents.

TSC Orientation Not Limitive

The exemplary TSC constructions depicted herein may be rotated in 90 degree increments and reinstalled on the TSL with no loss of generality in the scope of the claimed invention.

System Overview (0900)-(2400)

Figure 9:
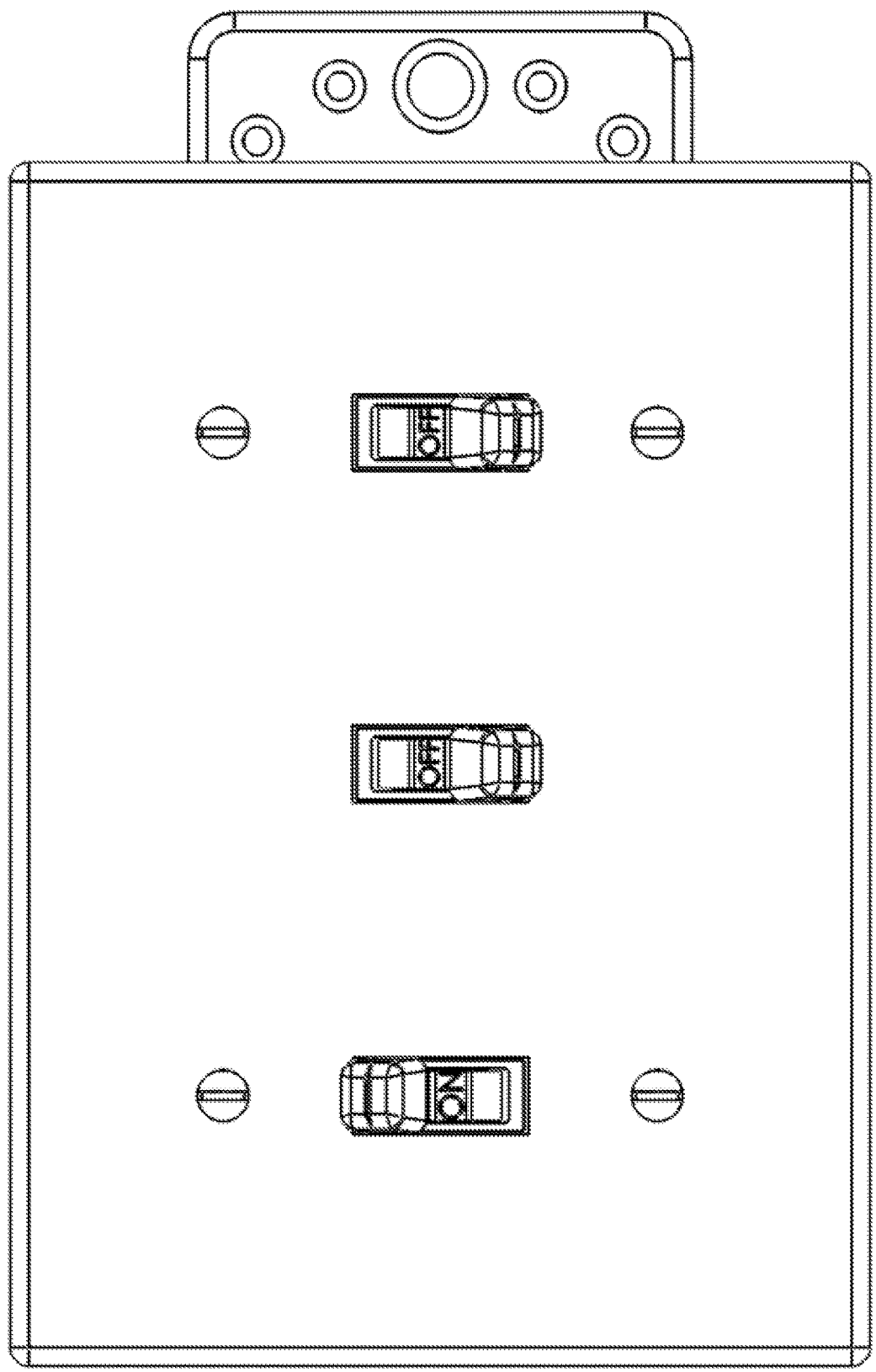
FIG. 9 illustrates a front view of a preferred exemplary embodiment of a toggle switch panel (TSP) incorporating toggle switch covers (TSC) over toggle switch levers (TSL)
Figure 10:
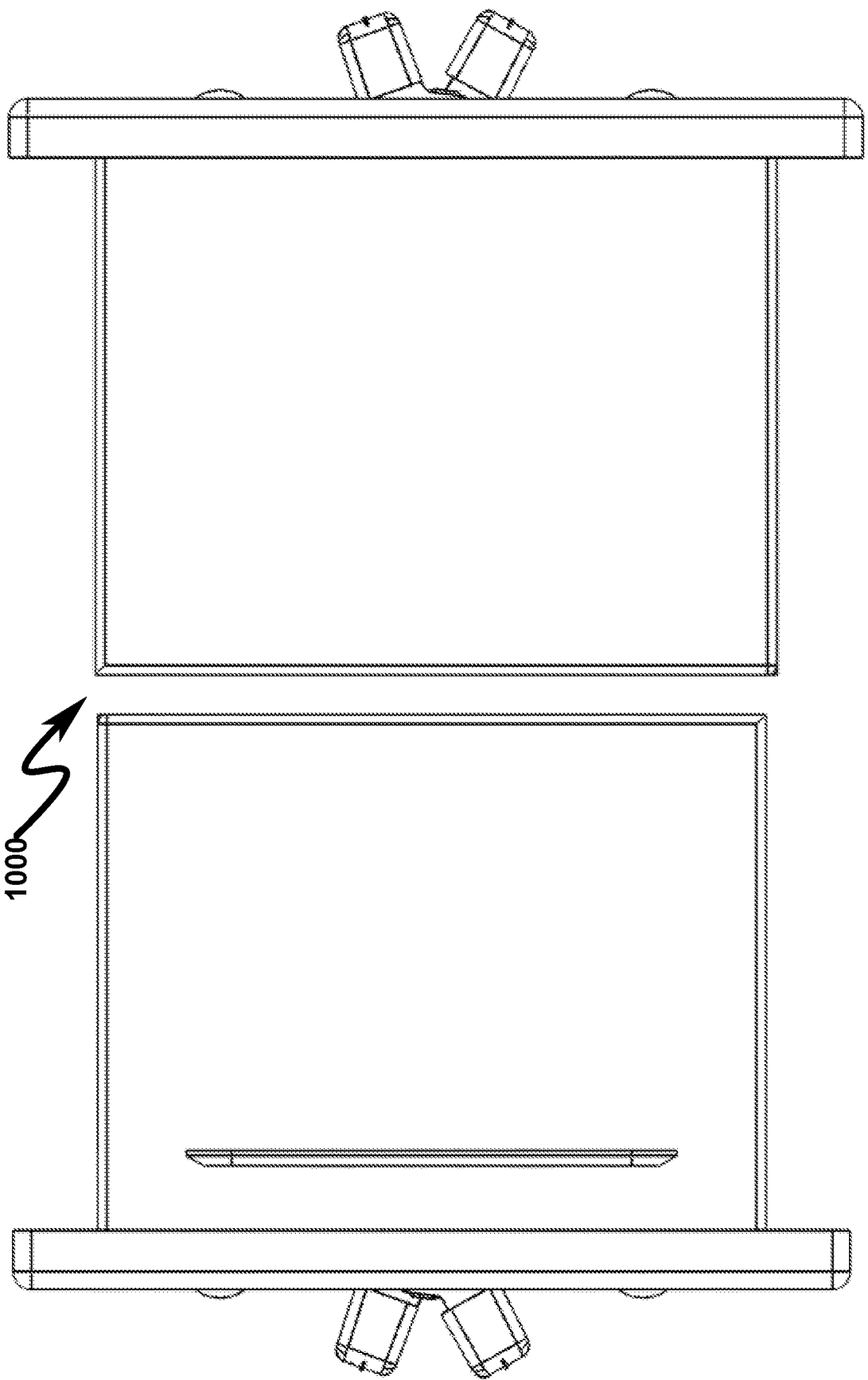
FIG. 10 illustrates right side and left side views of a preferred exemplary embodiment of a toggle switch panel (TSP) incorporating toggle switch covers (TSC) over toggle switch levers (TSL)
Figure 11:
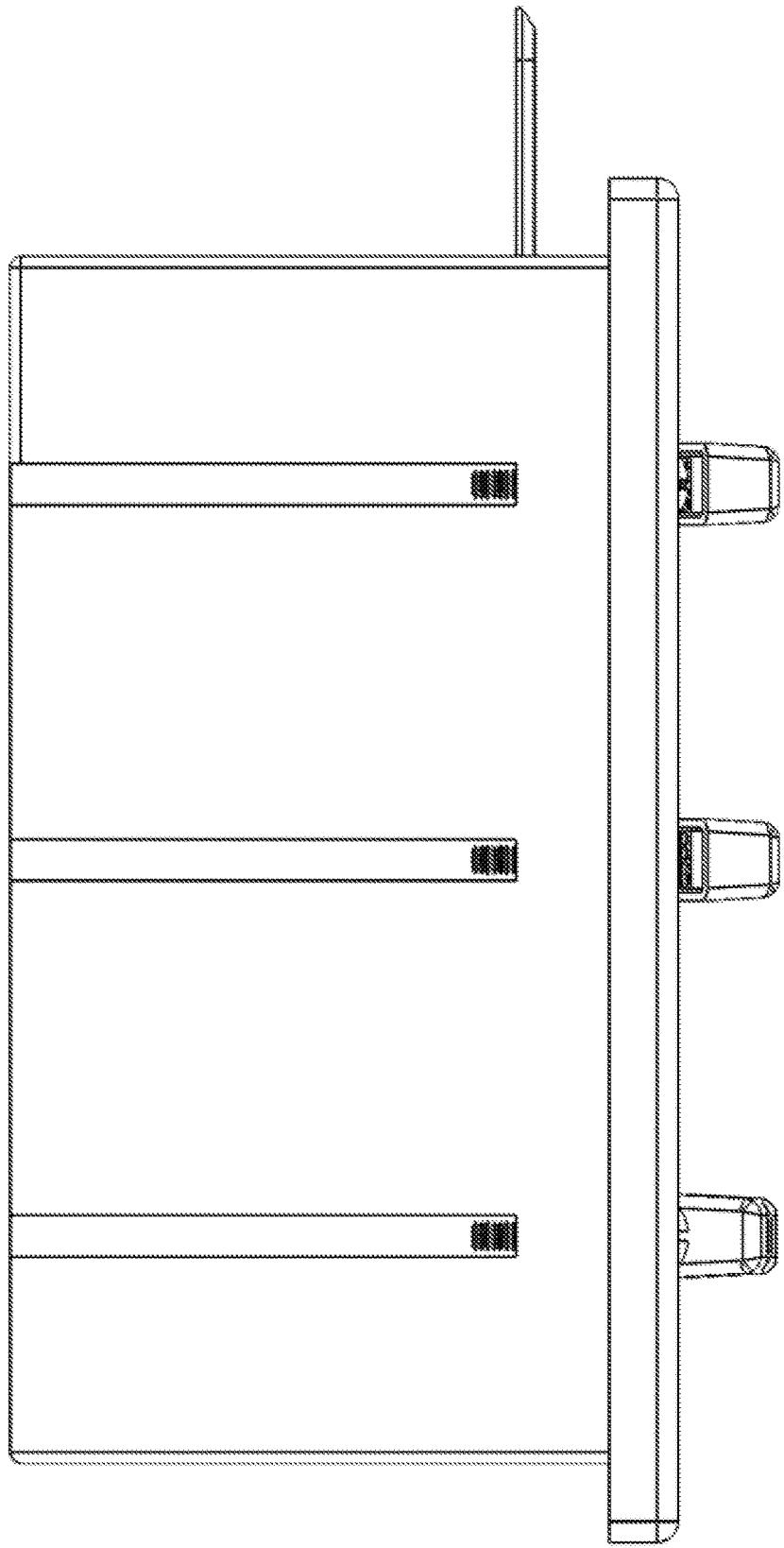
FIG. 11 illustrates a top view of a preferred exemplary embodiment of a toggle switch panel (TSP) incorporating toggle switch covers (TSC) over toggle switch levers (TSL)
Figure 12:
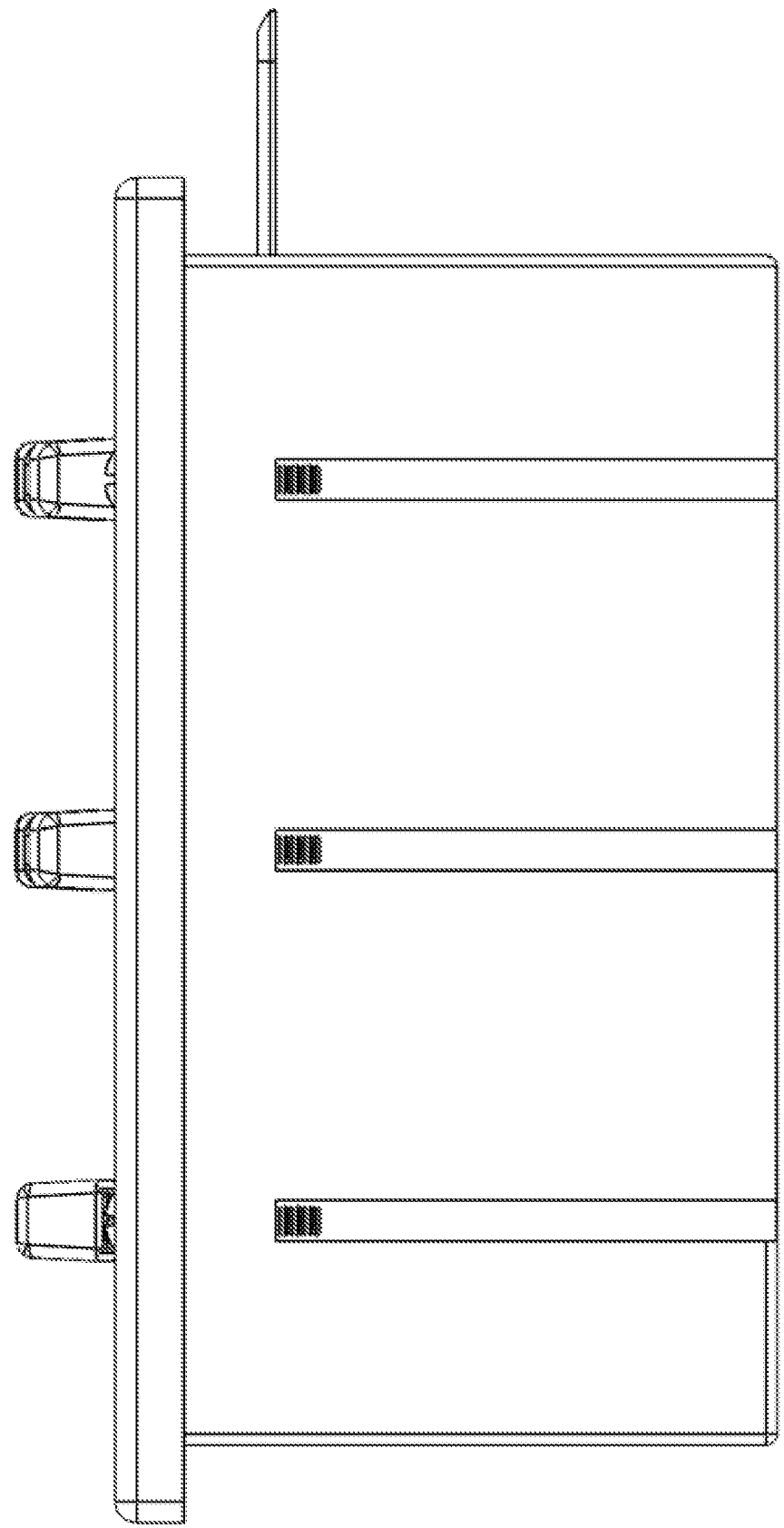
FIG. 12 illustrates a bottom view of a preferred exemplary embodiment of a toggle switch panel (TSP) incorporating toggle switch covers (TSC) over toggle switch levers (TSL)
Figure 13:
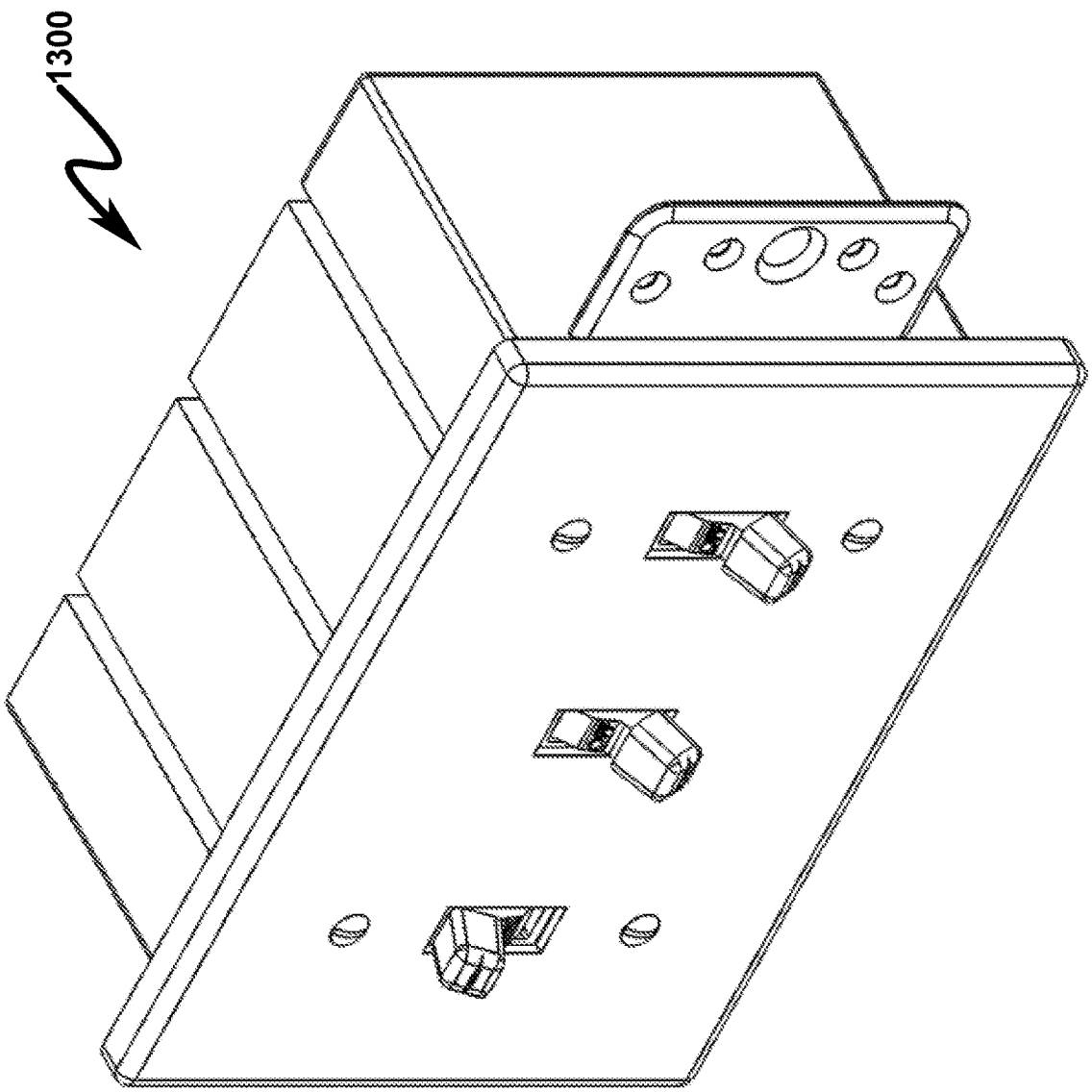
FIG. 13 illustrates a front top right perspective view of a preferred exemplary embodiment of a toggle switch panel (TSP) incorporating toggle switch covers (TSC) over toggle switch levers (TSL)
Figure 14:
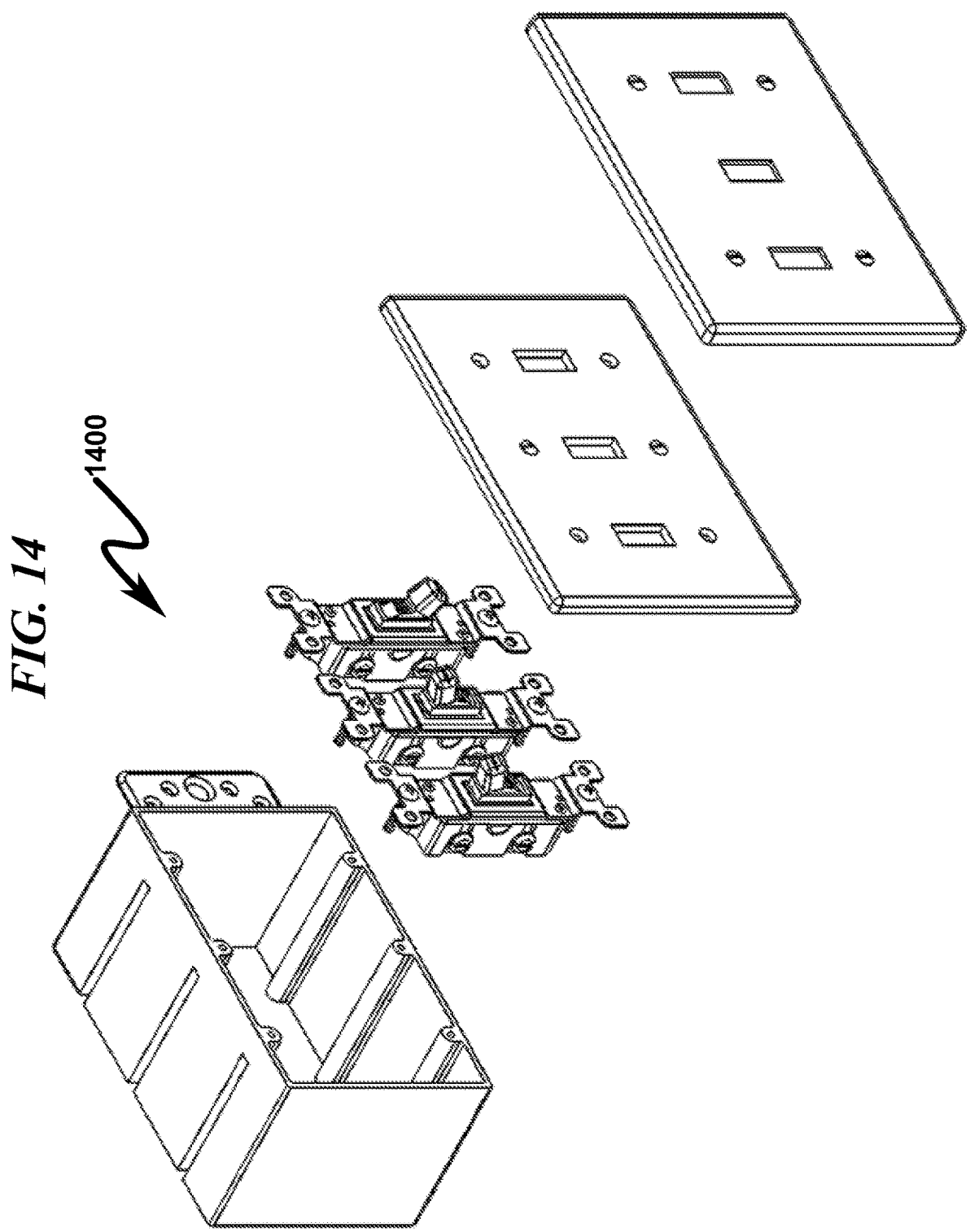
FIG. 14 illustrates a front top left assembly perspective view of a preferred exemplary embodiment of a toggle switch panel (TSP) incorporating toggle switch covers (TSC) over toggle switch levers (TSL)
Figure 15:
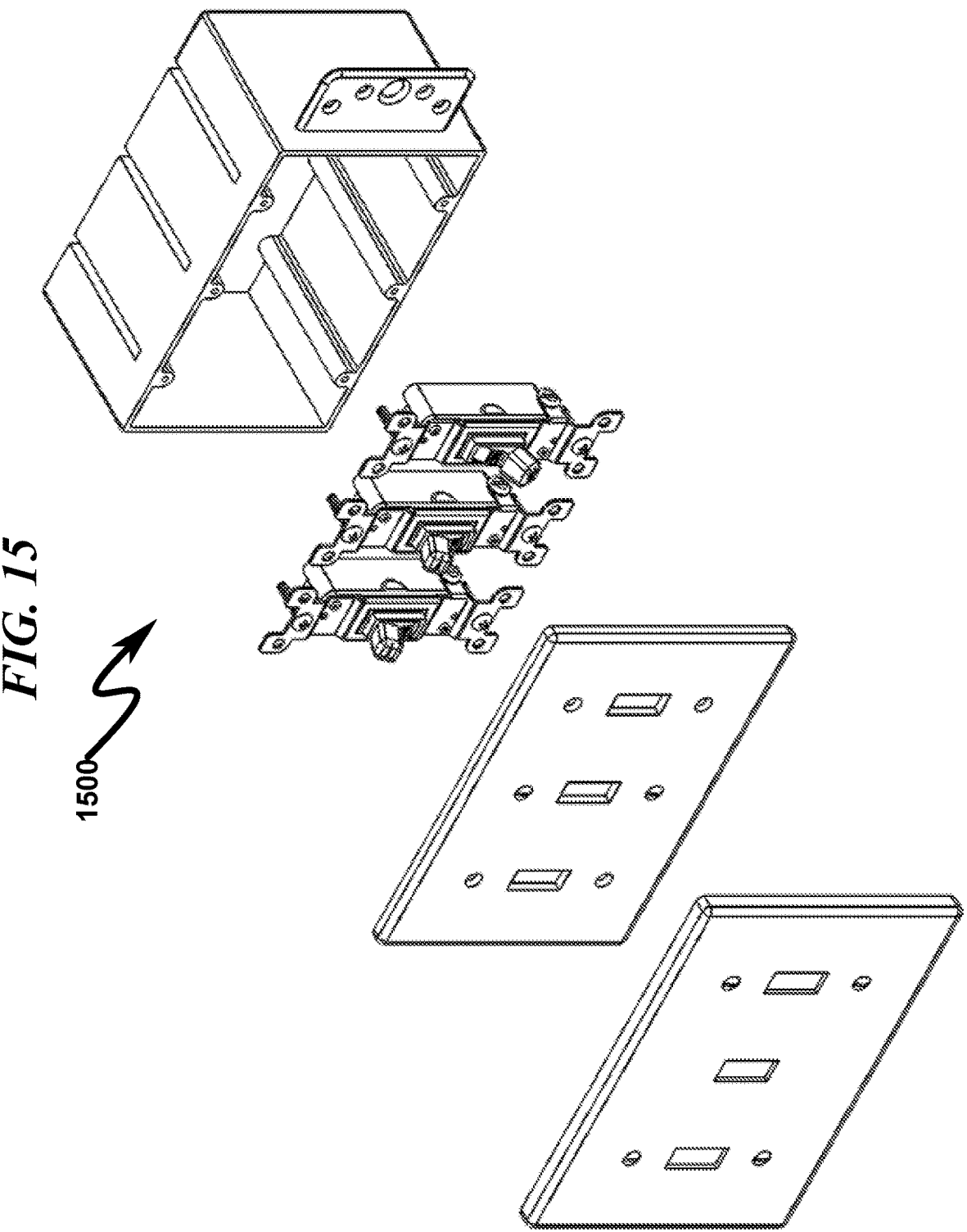
FIG. 15 illustrates a front top right assembly perspective view of a preferred exemplary embodiment of a toggle switch panel (TSP) incorporating toggle switch covers (TSC) over toggle switch levers (TSL)
Figure 16:
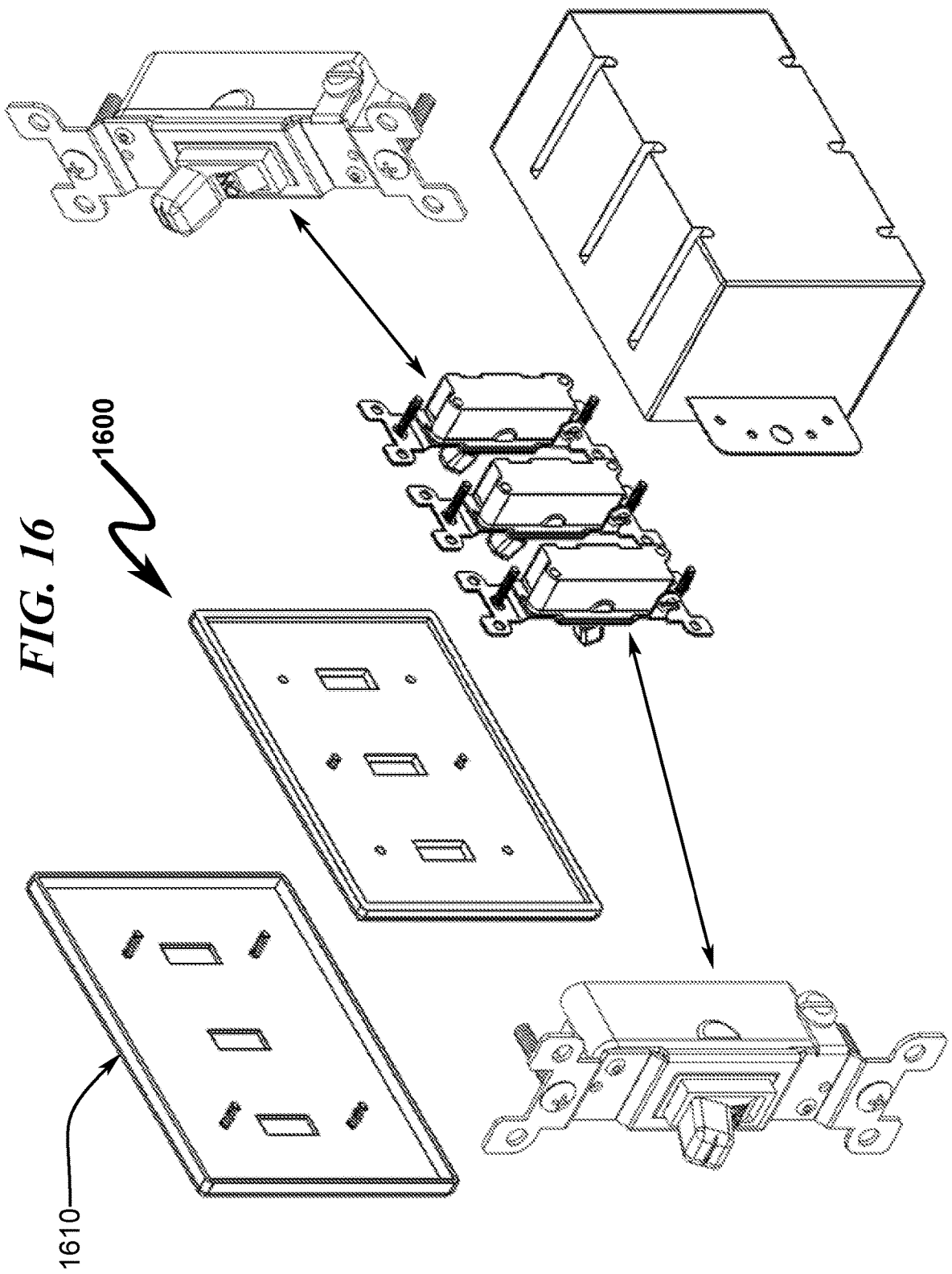
FIG. 16 illustrates a rear top right assembly perspective view of a preferred exemplary embodiment of a toggle switch panel (TSP) incorporating toggle switch covers (TSC) over toggle switch levers (TSL)
Figure 17:
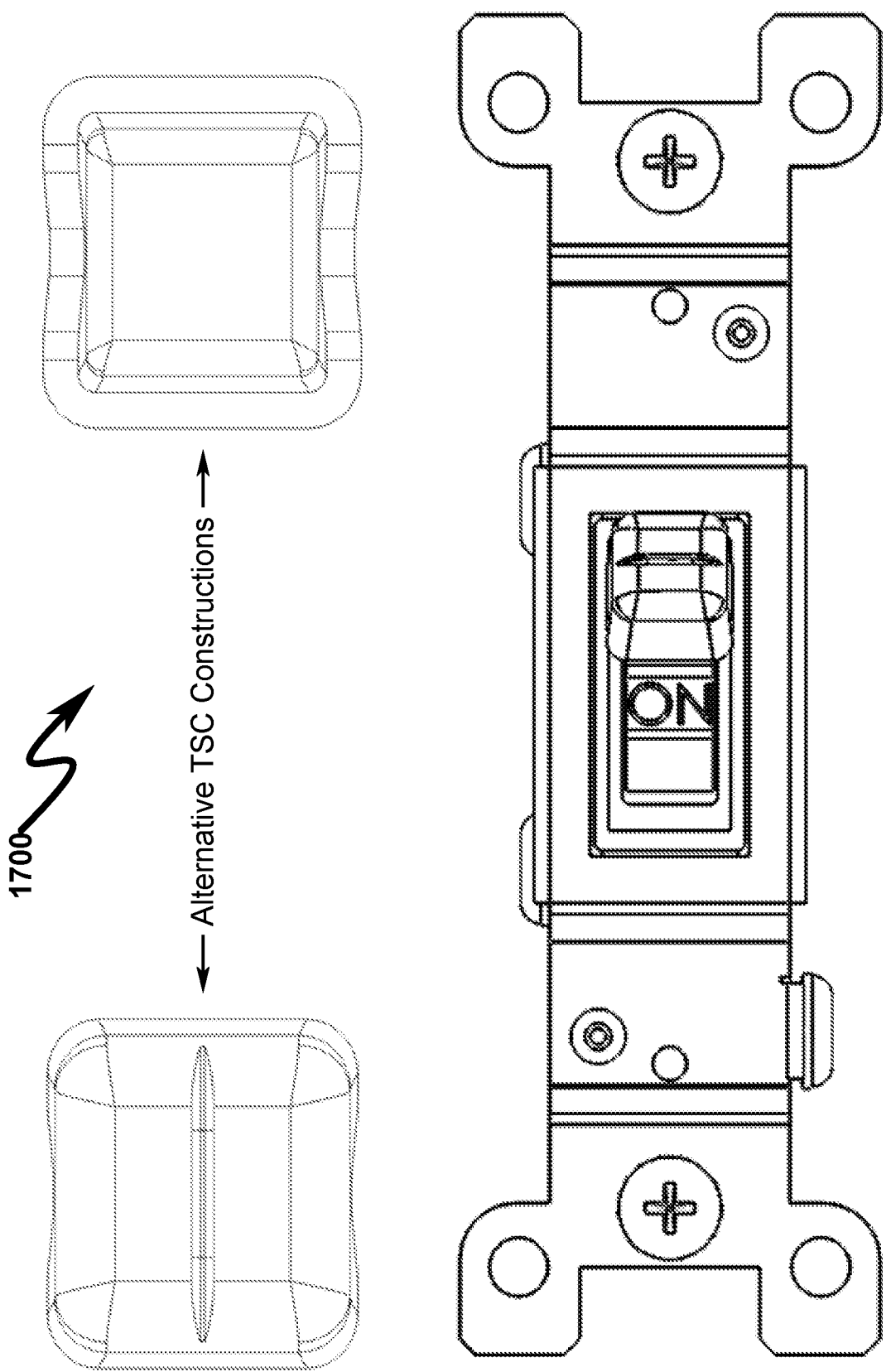
FIG. 17 illustrates a front view of a preferred exemplary embodiment of a toggle switch (TSW) incorporating a toggle switch cover (TSC) over the toggle switch lever (TSL) (also showing alternative TSC configurations)
Figure 19:
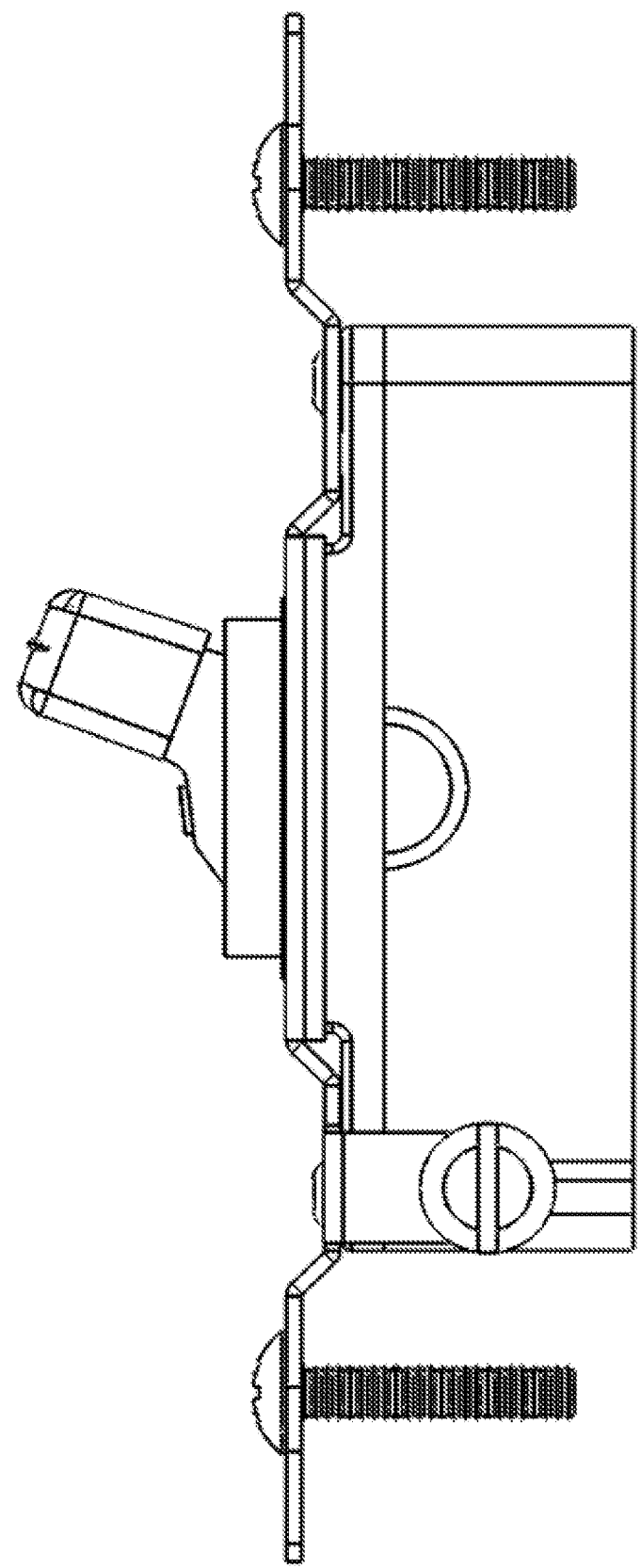
FIG. 19 illustrates a right side view of a preferred exemplary embodiment of a toggle switch (TSW) incorporating a toggle switch cover (TSC) over the toggle switch lever (TSL)
Figure 20:
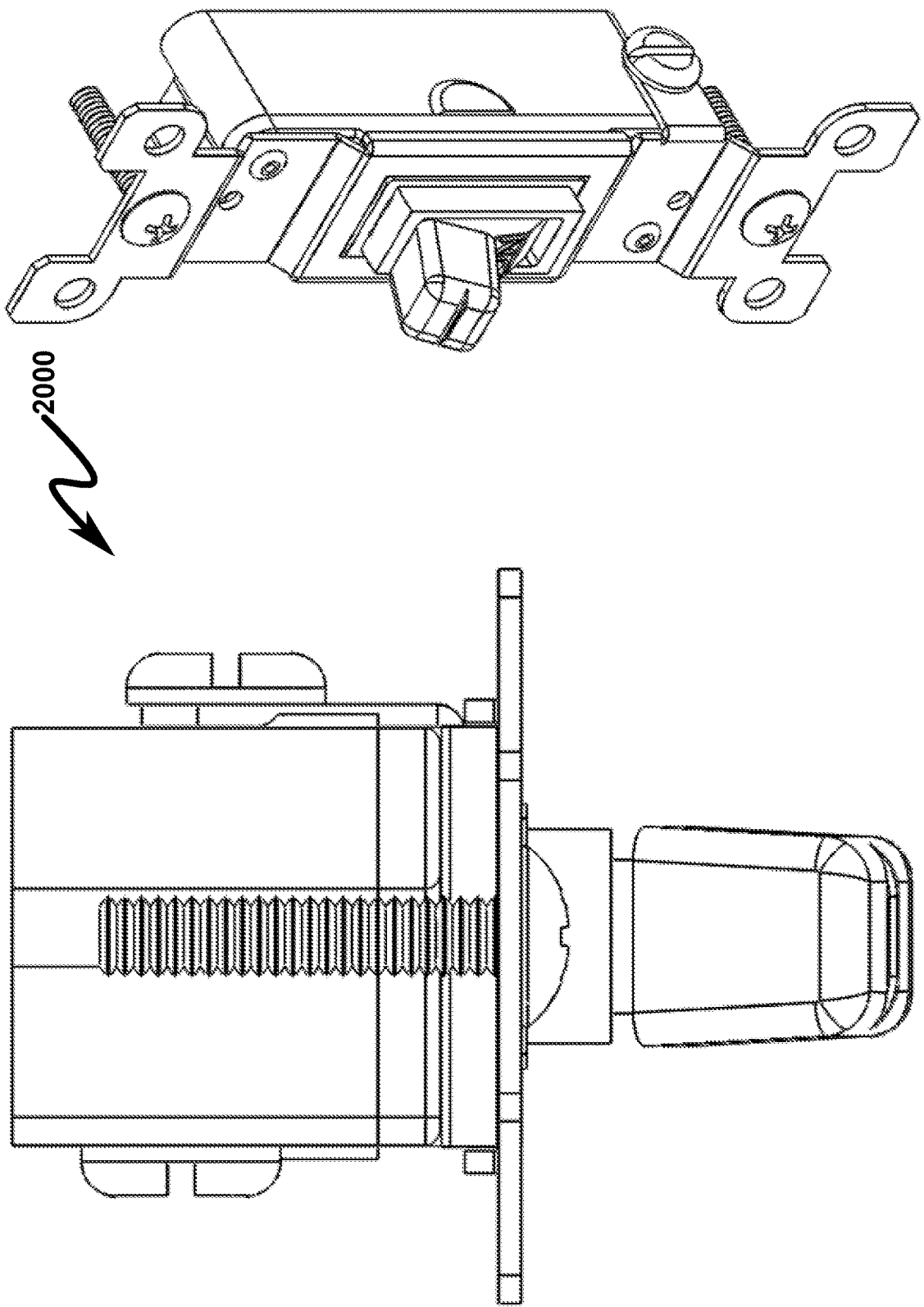
FIG. 20 illustrates top side and top right front perspective views of a preferred exemplary embodiment of a toggle switch (TSW) incorporating a toggle switch cover (TSC) over the toggle switch lever (TSL)
Figure 22:
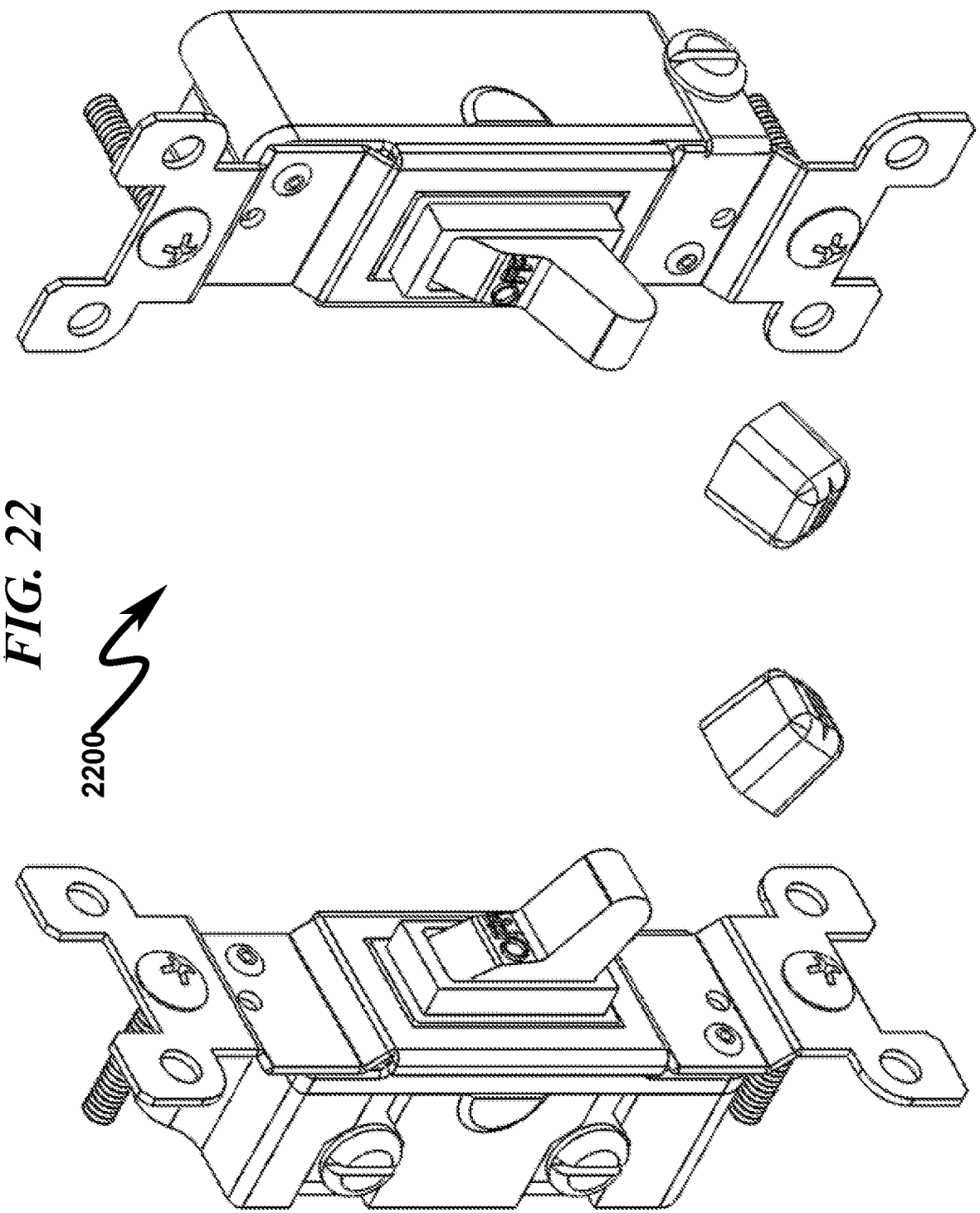
FIG. 22 illustrates top left front and top right front perspective assembly views of a preferred exemplary embodiment of a toggle switch (TSW) incorporating a toggle switch cover (TSC) over the toggle switch lever (TSL)

A typical present invention application context is generally presented in FIG. 9 (0900)-FIG. 24 (2400) wherein a multi-gang switch panel is presented depicting implementation of a preferred embodiment of the present invention.

Switch Panel Cover (SPC) Retrofit Operation

The switch panel cover (SPC) depicted in these diagrams may be specially constructed as an antimicrobial faceplate cover (AFC) (1610) as shown to allow for retrofit coverage of switch panel faceplates (SPF). In this preferred configuration as shown, the SPC is constructed with screw mounting holes at the corners of the faceplate such that the corresponding corner mounting screws associated with the SPF may be removed, the SPC placed over the SPF, and the mounting screws replaced with longer versions that project through the SPC, through the SPF, and into the corresponding threaded portions of the TSW.

In this manner, there is no need to actually remove the SPF to expose electrical wiring to implement an antimicrobial switch panel configuration as at least one of the remaining screws in the SPF F retains the SPF to the junction box prior to the introduction of the SPC over the SPF.

In some other preferred configurations the SPC may contain matching screw mounting holes as indicated by the SPF. In this configuration the retaining screws of the SPF are all removed, the SPC placed over and in contact with the SPF, and new mounting screws inserted into the mounting holes of the SPC, through the SPF, and into the TSW threaded mounting holes.

Toggle Switch Cover (TSC) Variants (2500)-(4800)

Figure 25:
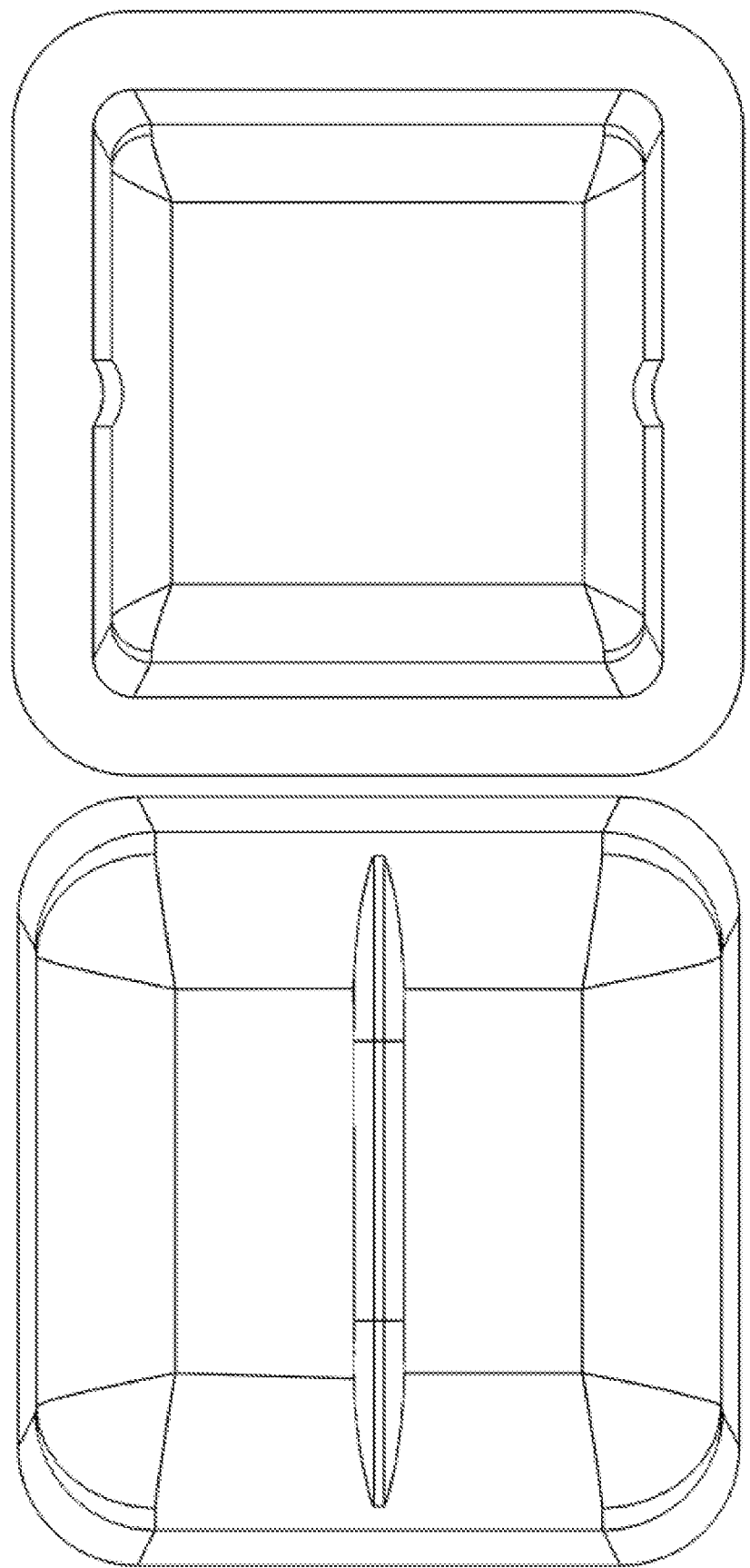
FIG. 25 illustrates front side and rear side views of a preferred exemplary embodiment of a toggle switch cover (TSC)
Figure 26:
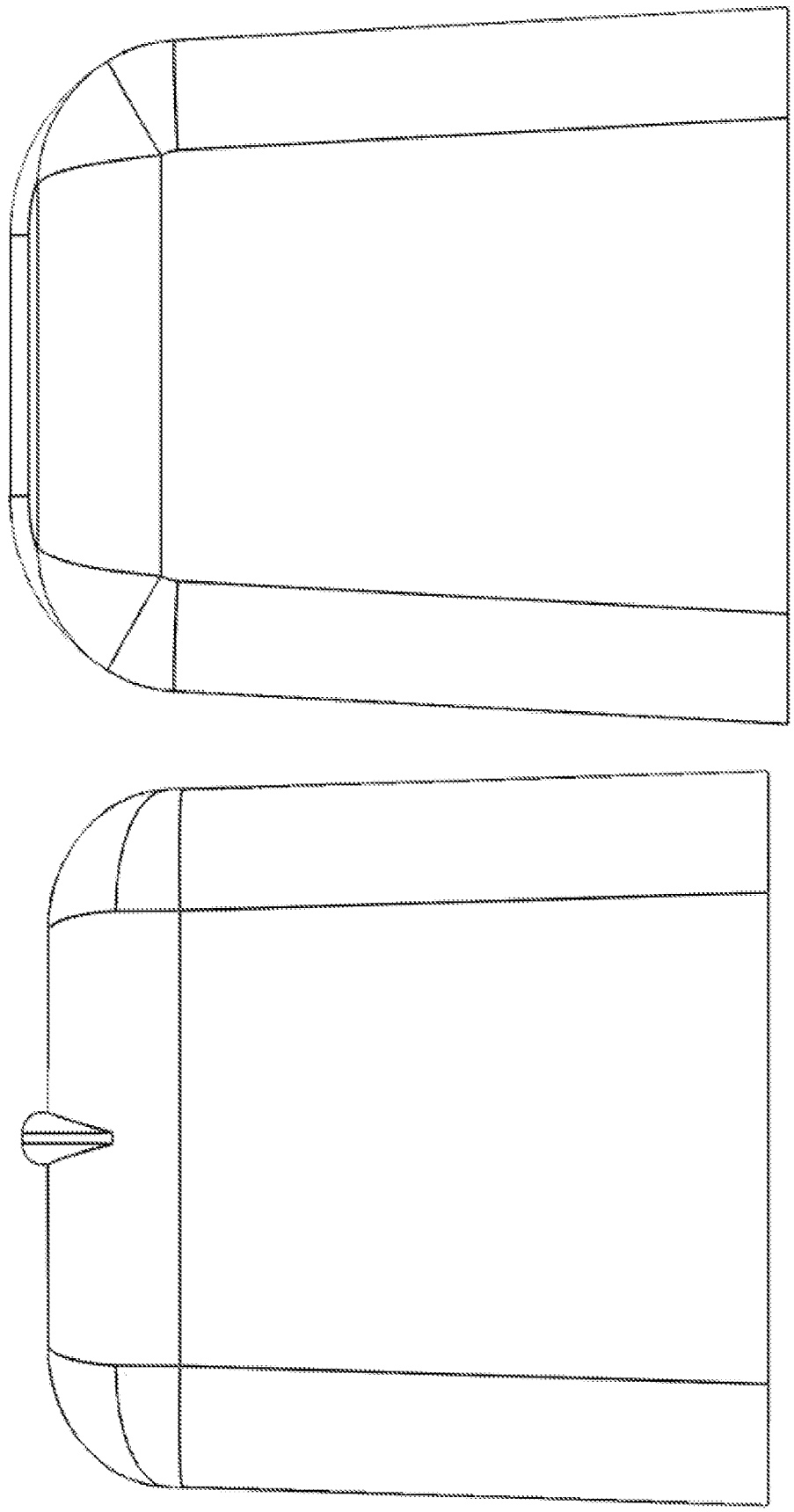
FIG. 26 illustrates left/right side and top/bottom side views of a preferred exemplary embodiment of a toggle switch cover (TSC)
Figure 27:
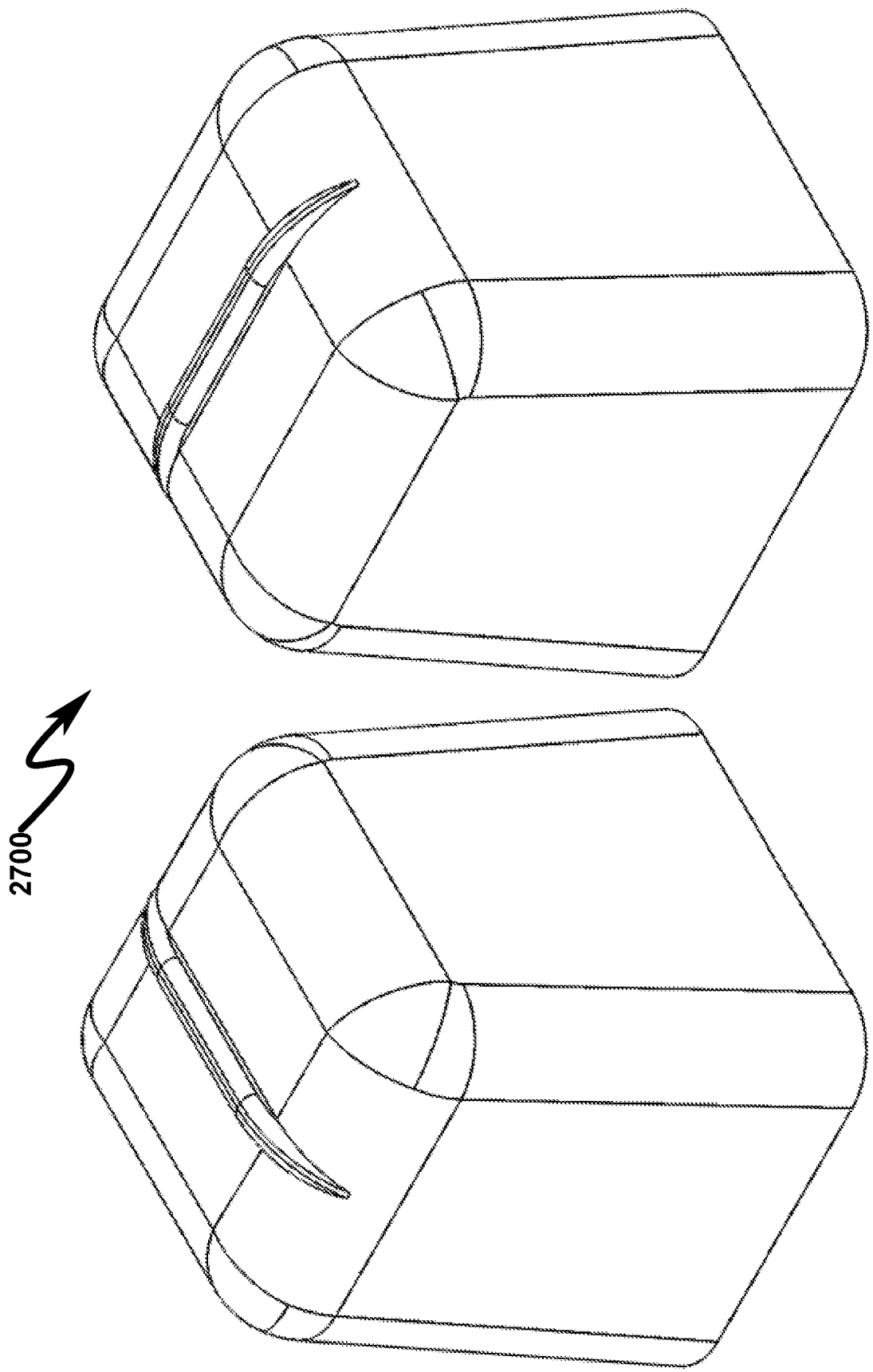
FIG. 27 illustrates top left front and top right front perspective views of a preferred exemplary embodiment of a toggle switch cover (TSC)
Figure 48:
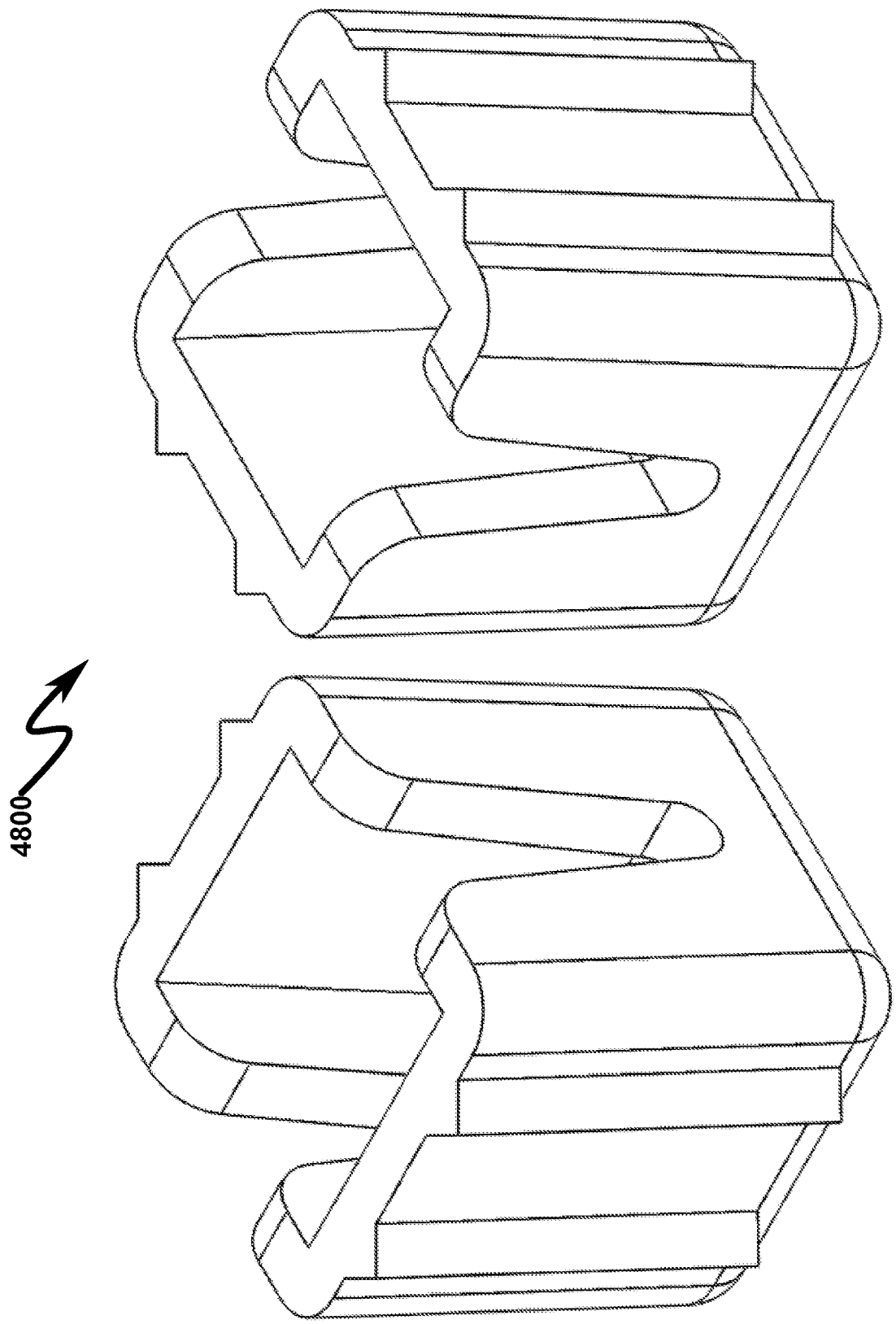
FIG. 48 illustrates bottom left front and bottom right front perspective views of a preferred exemplary embodiment of a toggle switch cover (TSC) (depicting external surface texture (EST) comprising one or more triangular surface protrusions)

While the toggle switch cover (TSC) may have many forms, a few preferred exemplary embodiments are generally depicted in FIG. 25 (2500)-FIG. 48 (4800).

Figure 28:
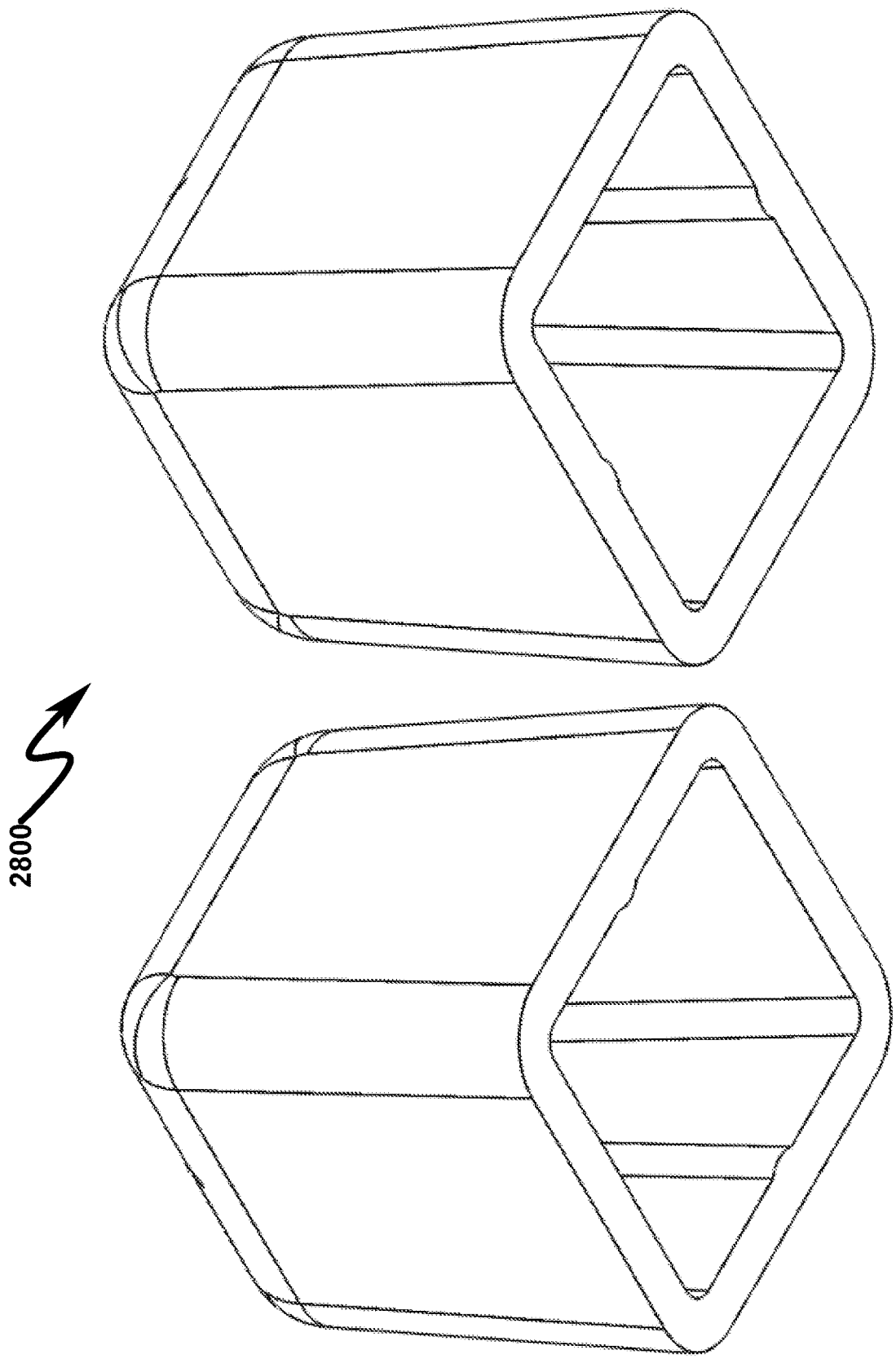
FIG. 28 illustrates bottom left front and bottom right front perspective views of a preferred exemplary embodiment of a toggle switch cover (TSC)

FIG. 25 (2500)-FIG. 28 (2800) depict a preferred exemplary embodiment of a general toggle switch cover (TSC).

Figure 29:
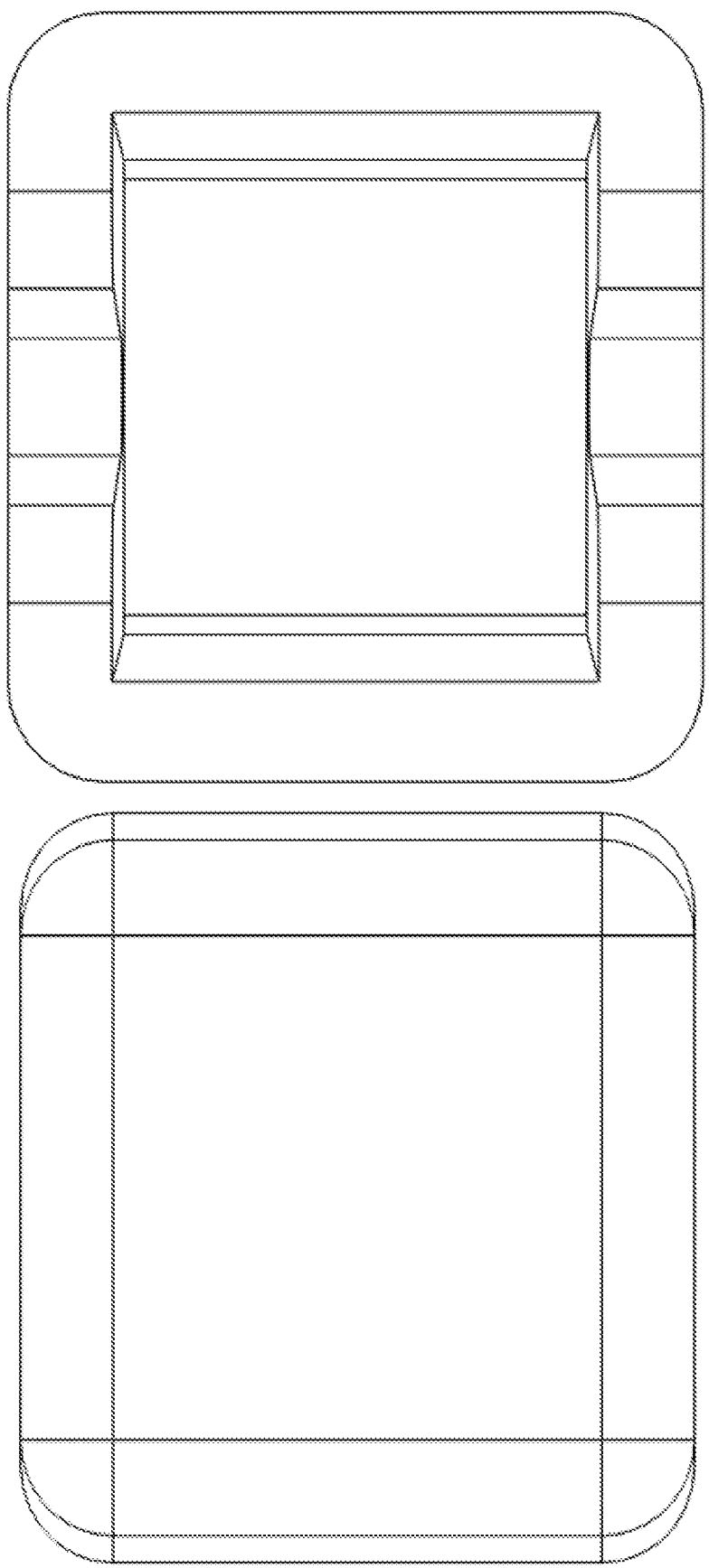
FIG. 29 illustrates front side and rear side views of a preferred exemplary embodiment of a toggle switch cover (TSC) (depicting optional side void construction)
Figure 30:
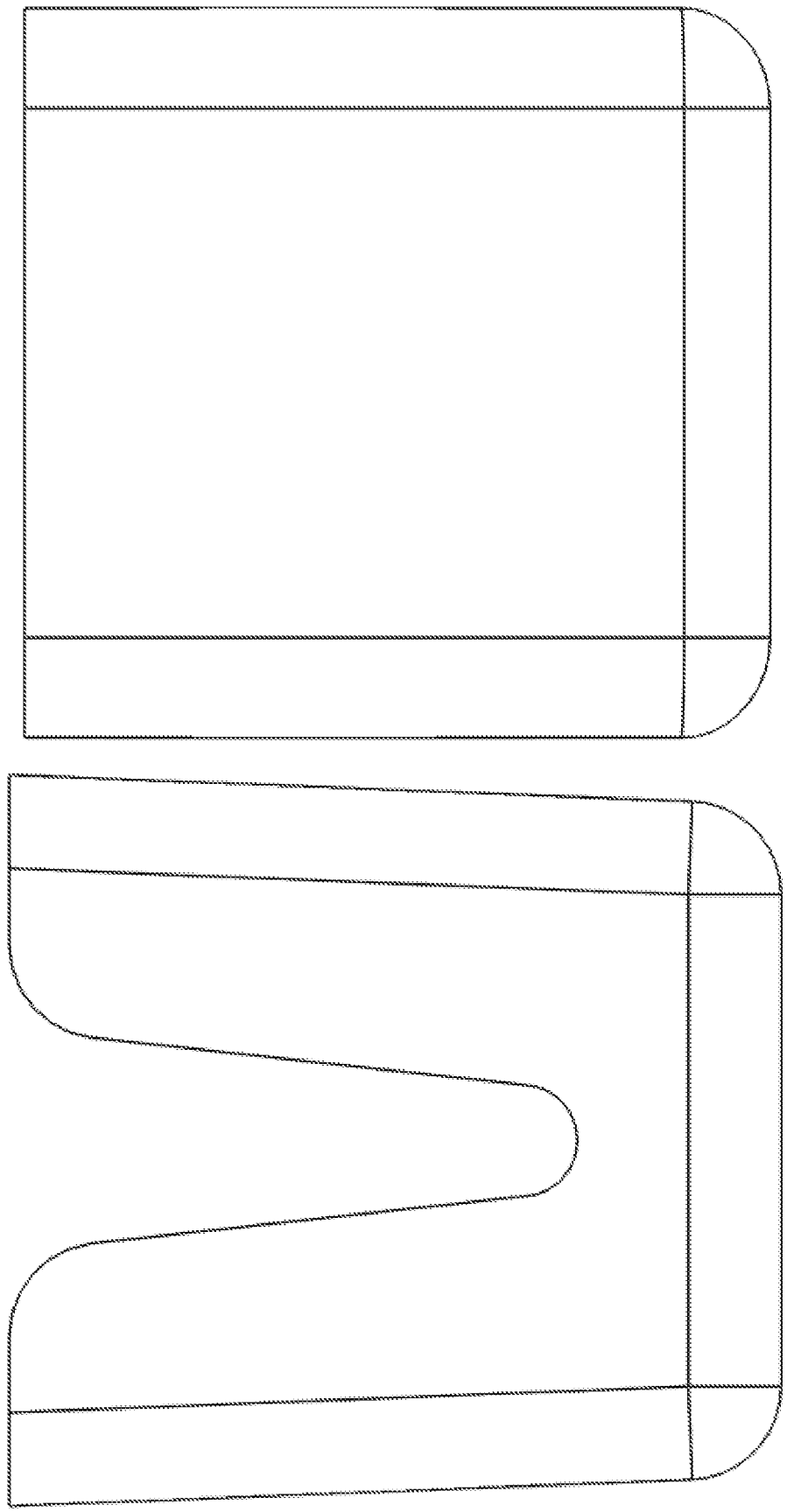
FIG. 30 illustrates left/right side and top/bottom side views of a preferred exemplary embodiment of a toggle switch cover (TSC) (depicting optional side void construction)
Figure 31:
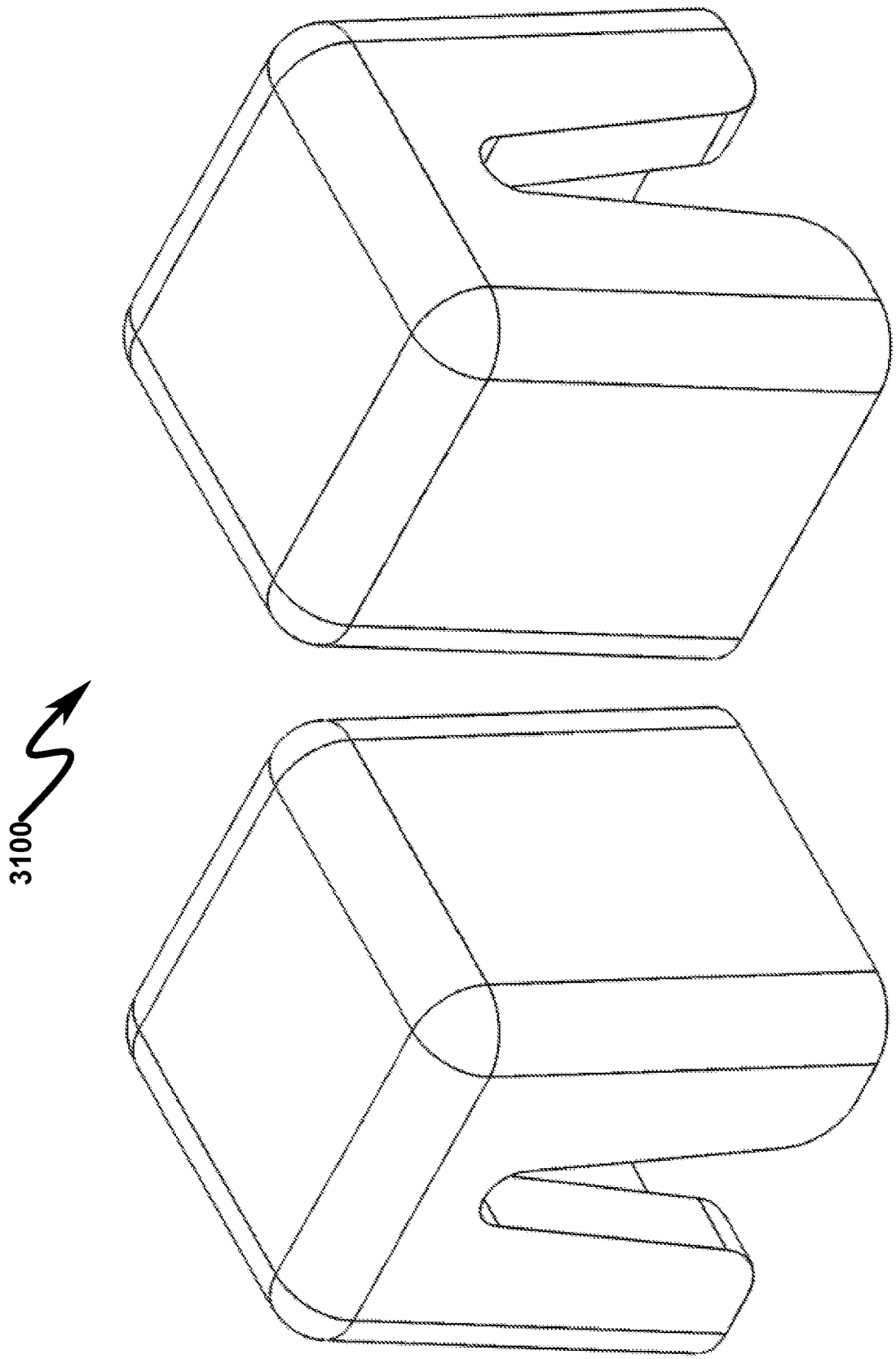
FIG. 31 illustrates top left front and top right front perspective views of a preferred exemplary embodiment of a toggle switch cover (TSC) (depicting optional side void construction)
Figure 32:
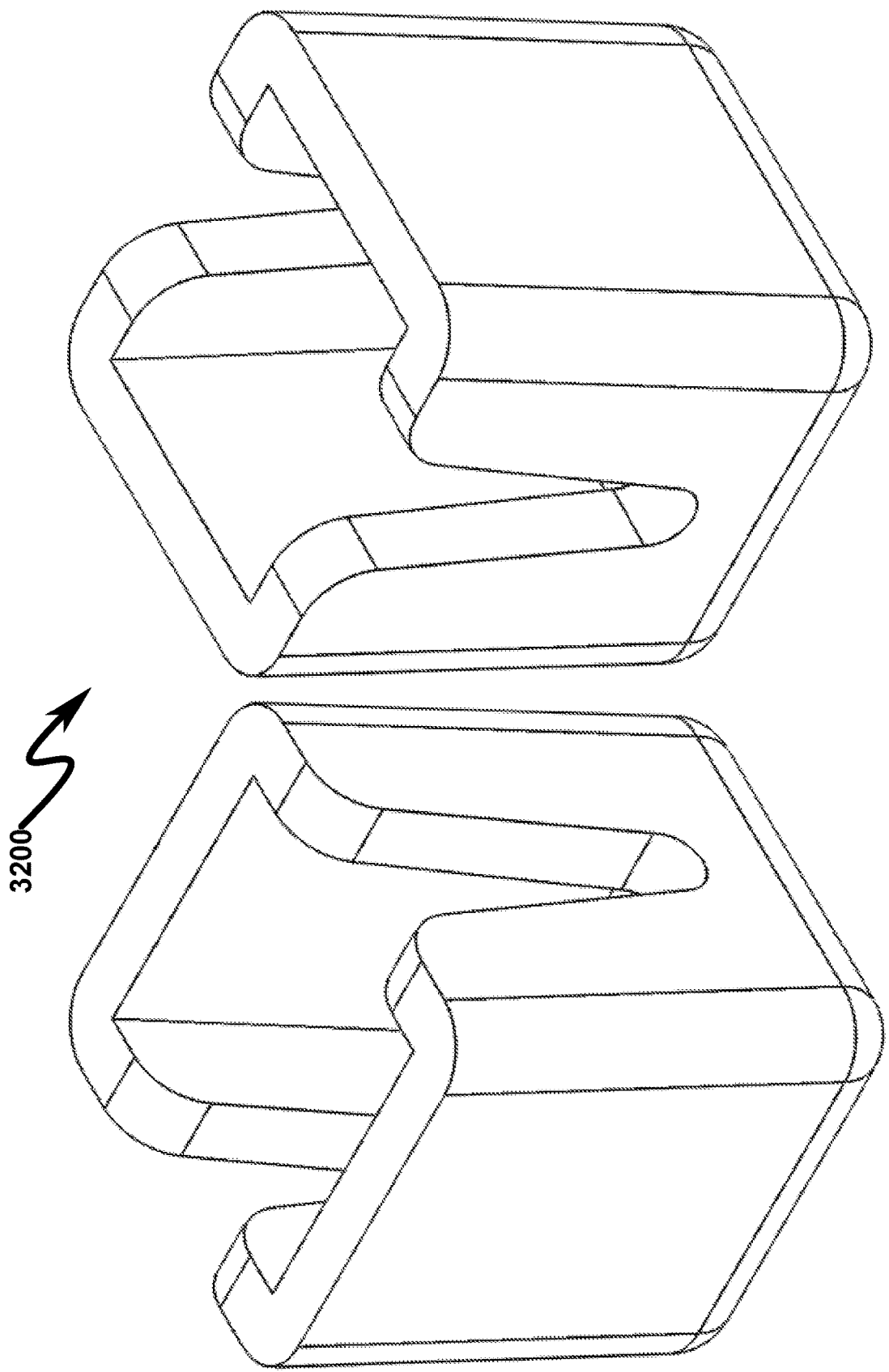
FIG. 32 illustrates bottom left front and bottom right front perspective views of a preferred exemplary embodiment of a toggle switch cover (TSC) (depicting optional side void construction)

FIG. 29 (2900)-FIG. 32 (3200) depict a preferred exemplary embodiment of a toggle switch cover (TSC) having optional side void construction.

Figure 33:
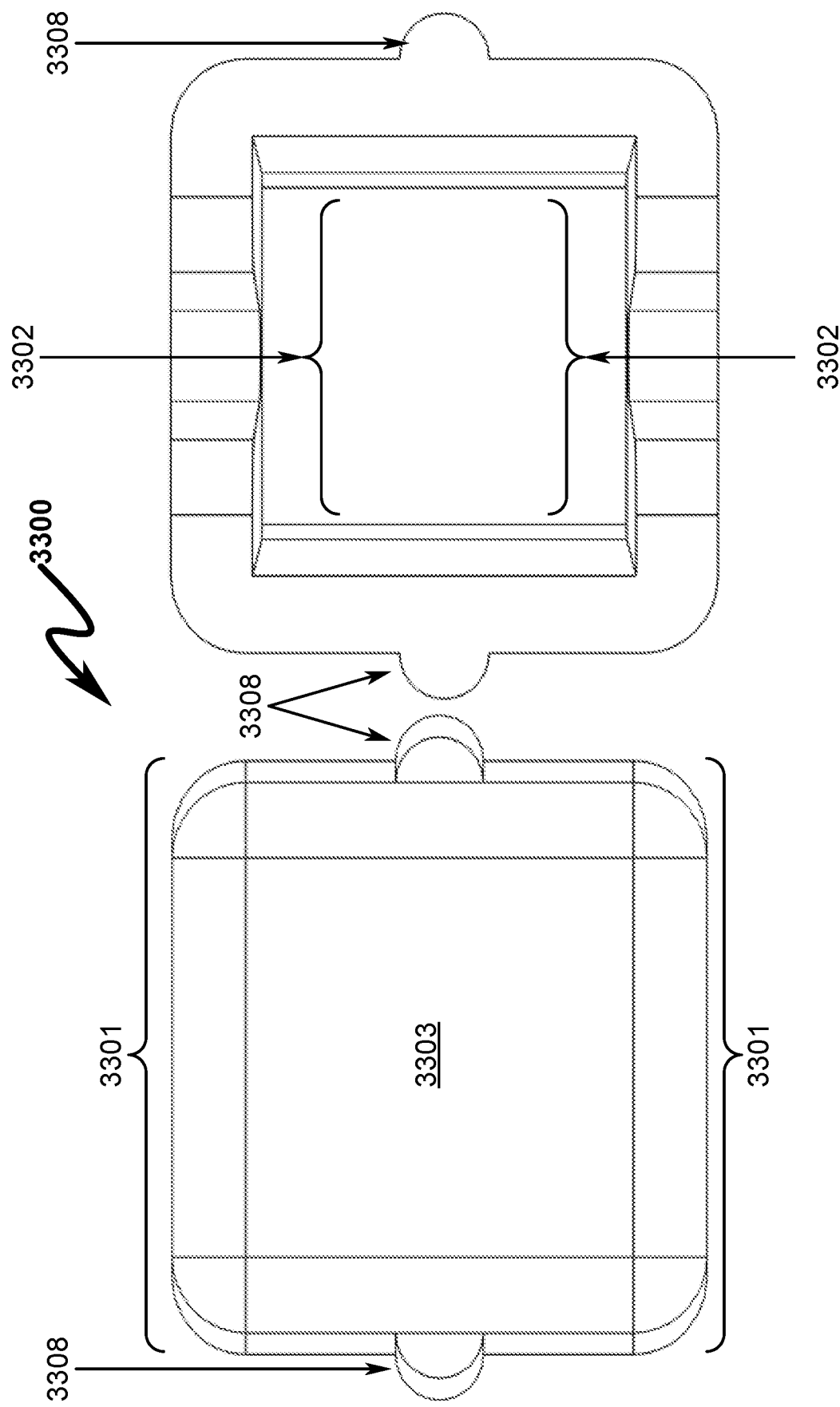
FIG. 33 illustrates front side and rear side views of a preferred exemplary embodiment of a toggle switch cover (TSC) (depicting external surface texture (EST) comprising one or more half-cylinder surface protrusions)
Figure 34:
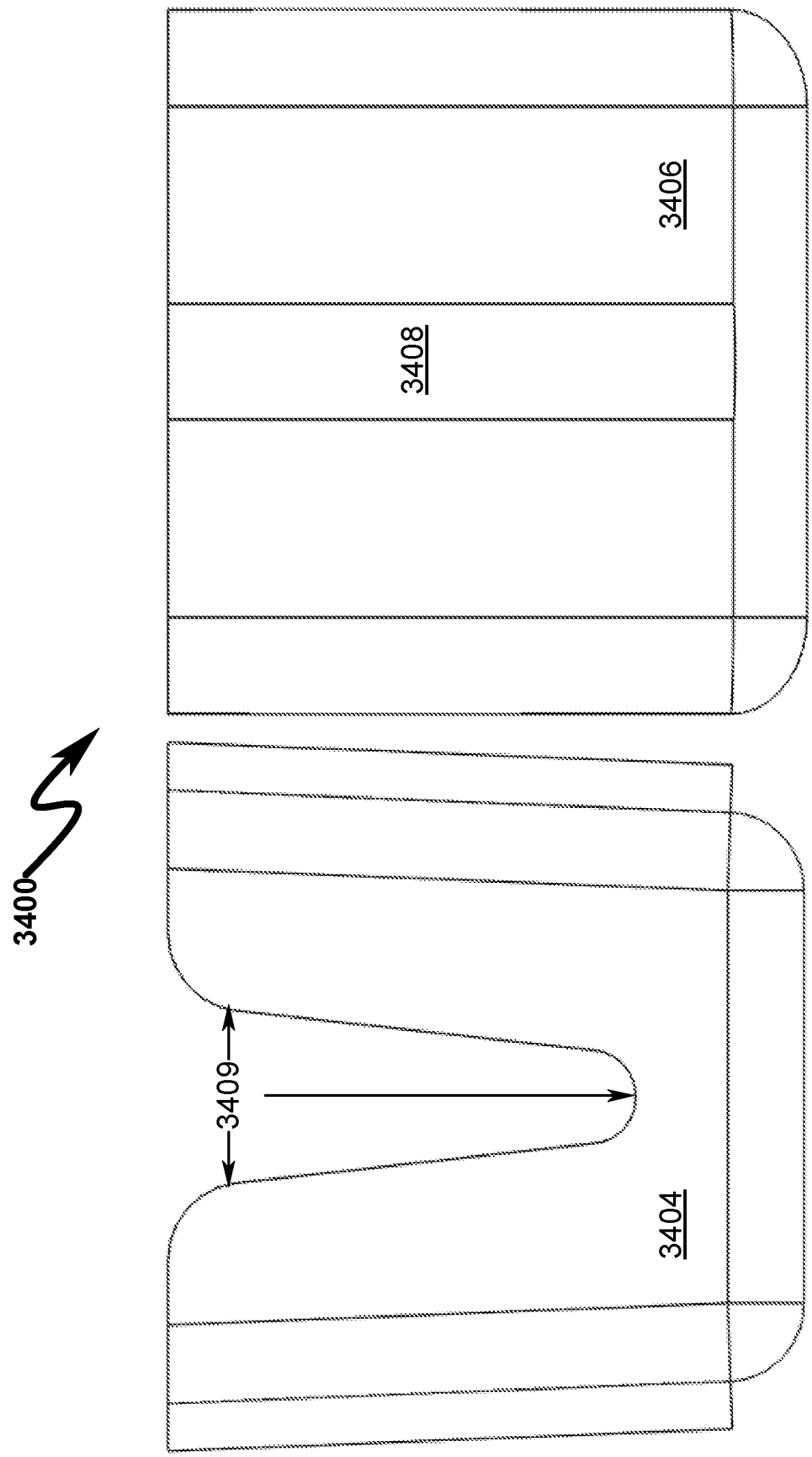
FIG. 34 illustrates left/right side and top/bottom side views of a preferred exemplary embodiment of a toggle switch cover (TSC) (depicting external surface texture (EST) comprising one or more half-cylinder surface protrusions)
Figure 35:
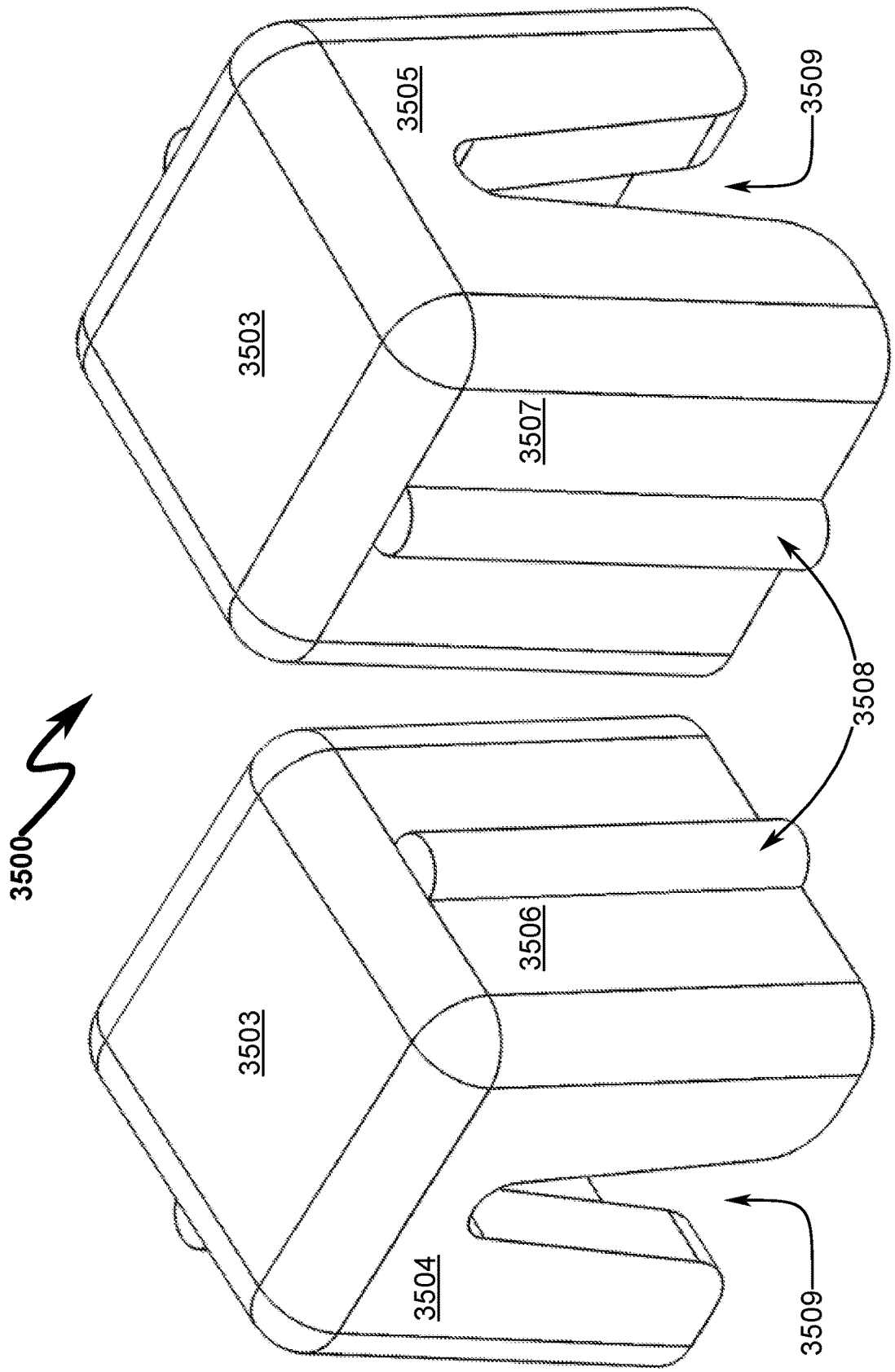
FIG. 35 illustrates top left front and top right front perspective views of a preferred exemplary embodiment of a toggle switch cover (TSC) (depicting external surface texture (EST) comprising one or more half-cylinder surface protrusions)
Figure 36:
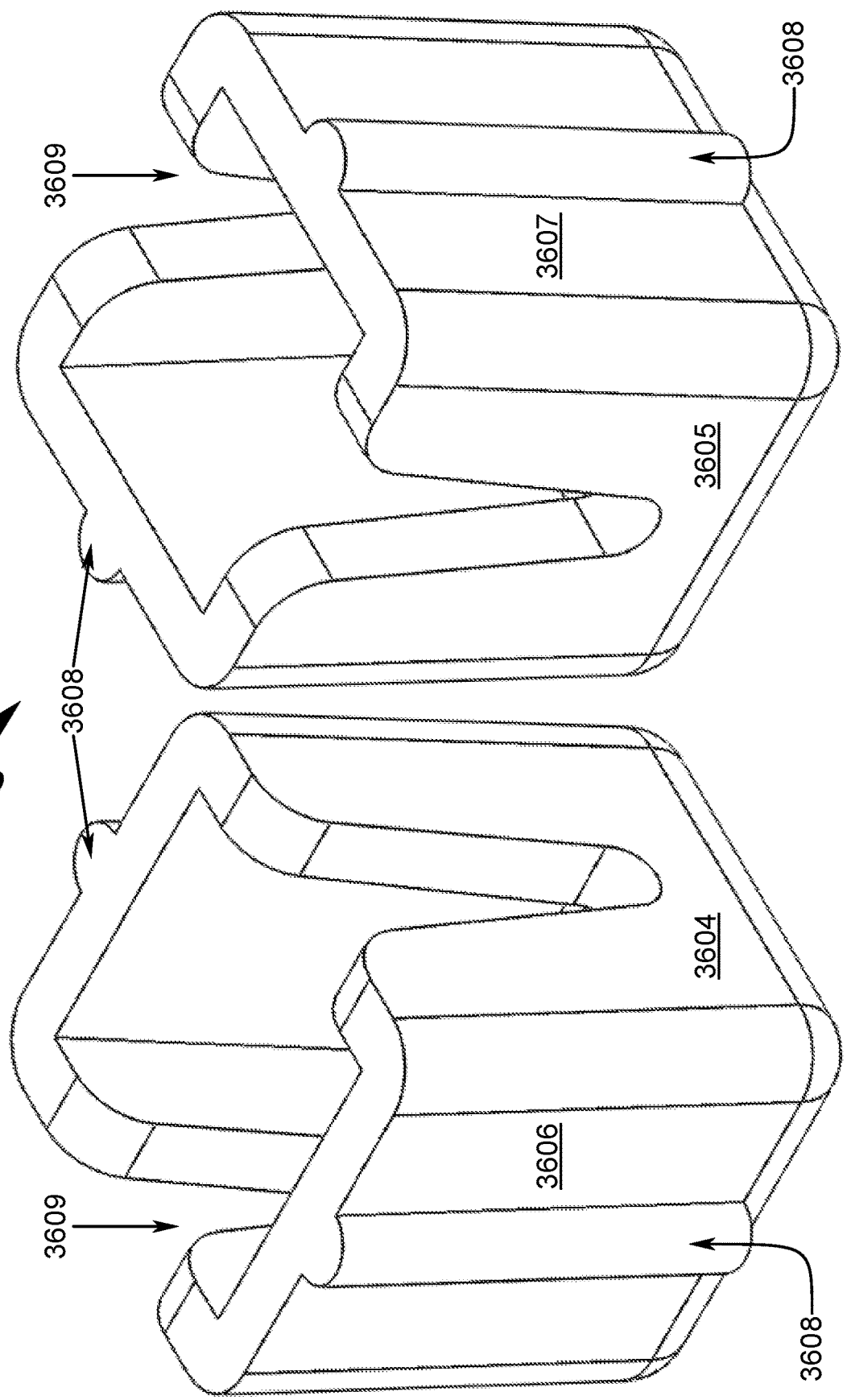
FIG. 36 illustrates bottom left front and bottom right front perspective views of a preferred exemplary embodiment of a toggle switch cover (TSC) (depicting external surface texture (EST) comprising one or more half-cylinder surface protrusions)

FIG. 33 (3300)-FIG. 36 (3600) depict a preferred exemplary embodiment of a toggle switch cover (TSC) having external surface texture (EST) comprising one or more half-cylinder surface protrusions.

Figure 37:
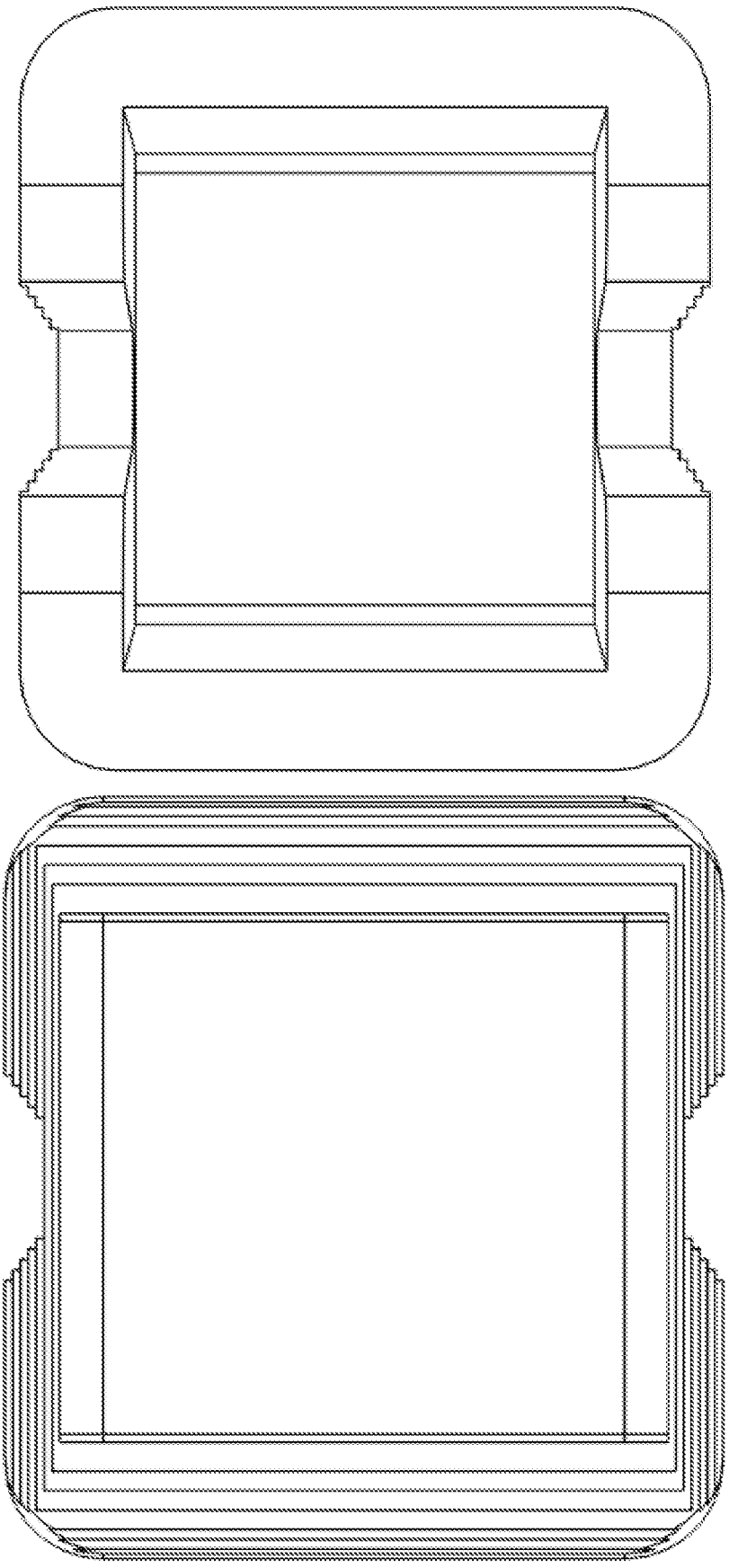
FIG. 37 illustrates front side and rear side views of a preferred exemplary embodiment of a toggle switch cover (TSC) (depicting external surface texture (EST) comprising one or more perimeter surface ridge protrusions)
Figure 38:
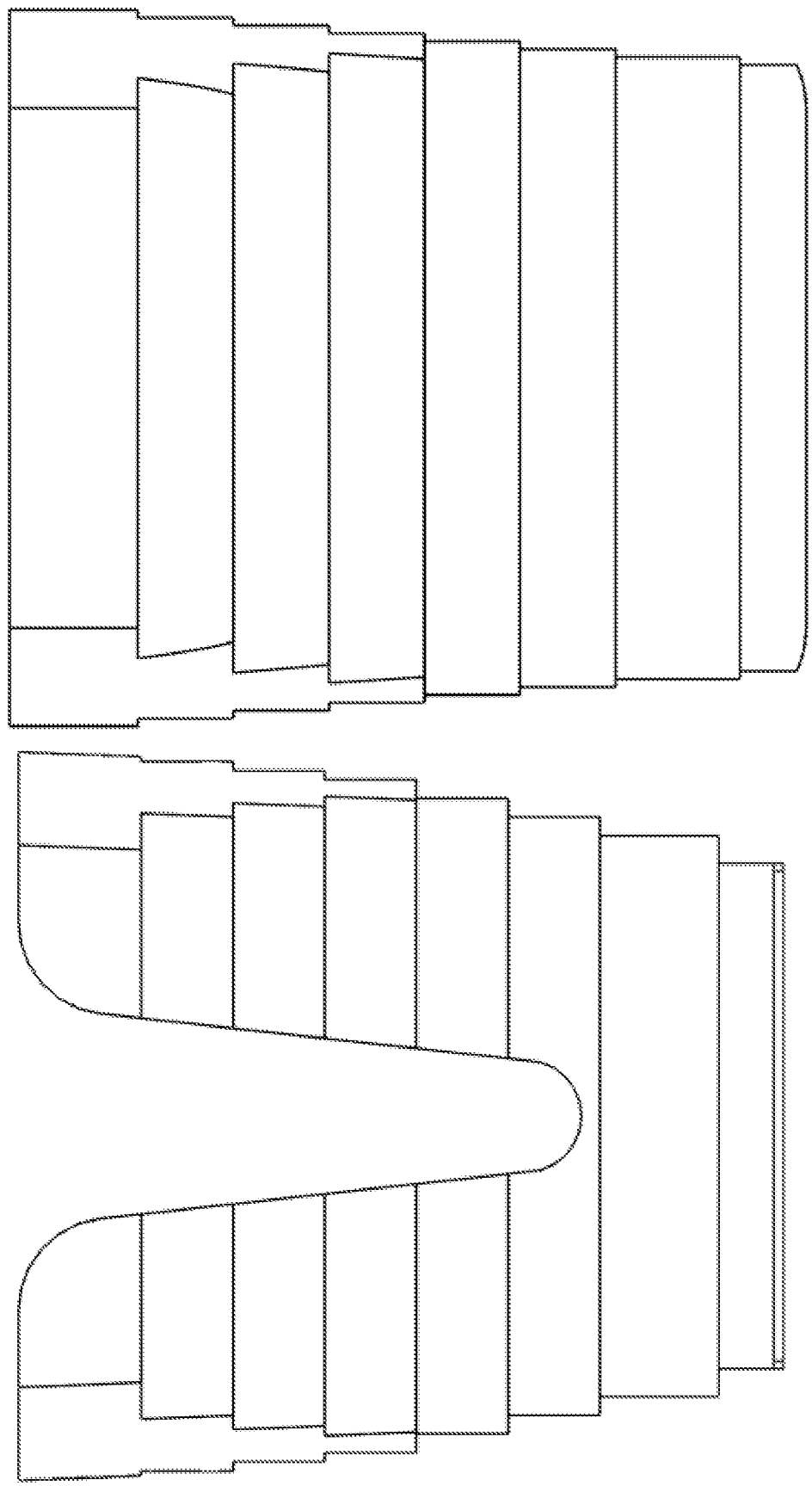
FIG. 38 illustrates left/right side and top/bottom side views of a preferred exemplary embodiment of a toggle switch cover (TSC) (depicting external surface texture (EST) comprising one or more perimeter surface ridge protrusions)
Figure 39:
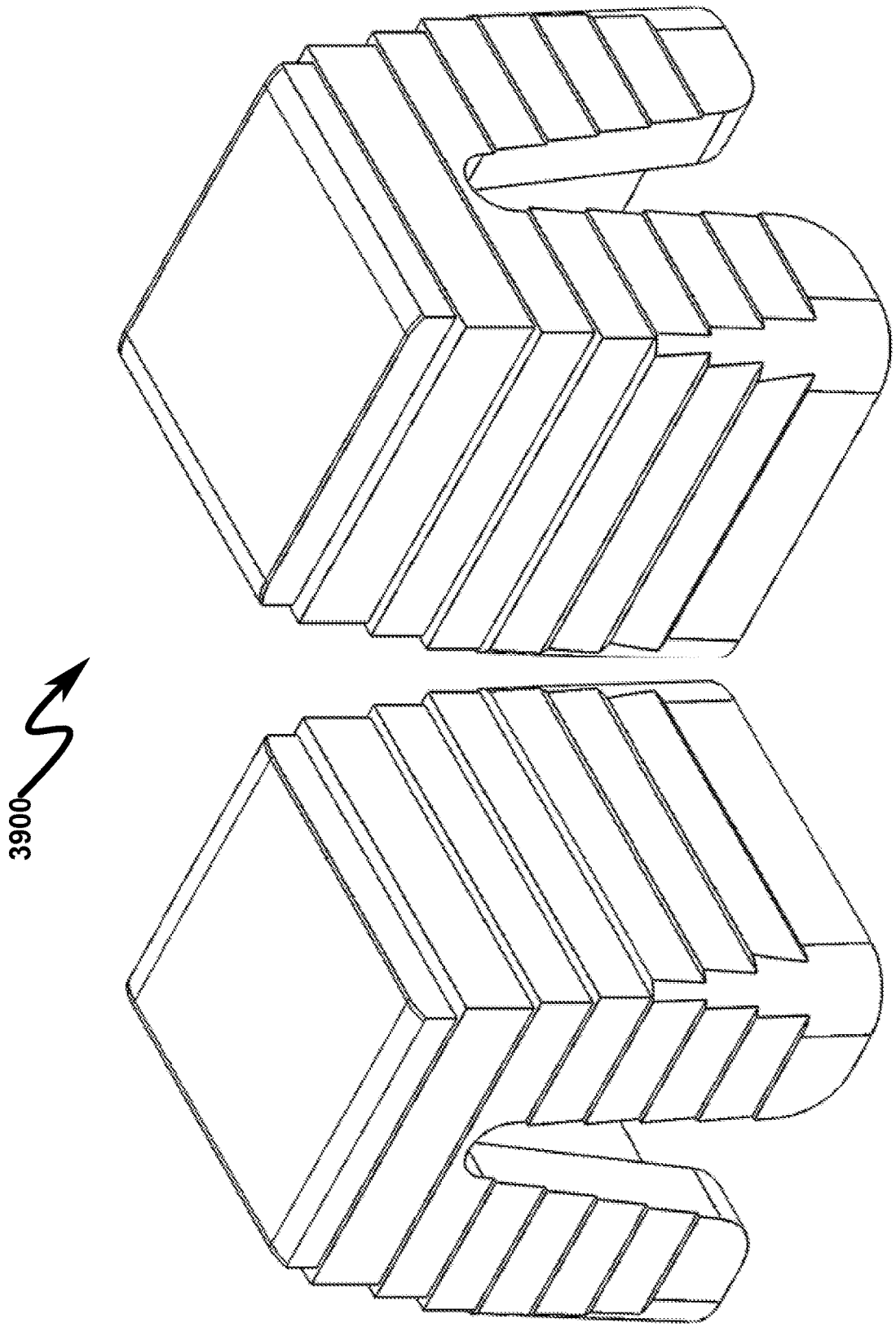
FIG. 39 illustrates top left front and top right front perspective views of a preferred exemplary embodiment of a toggle switch cover (TSC) (depicting external surface texture (EST) comprising one or more perimeter surface ridge protrusions)
Figure 40:
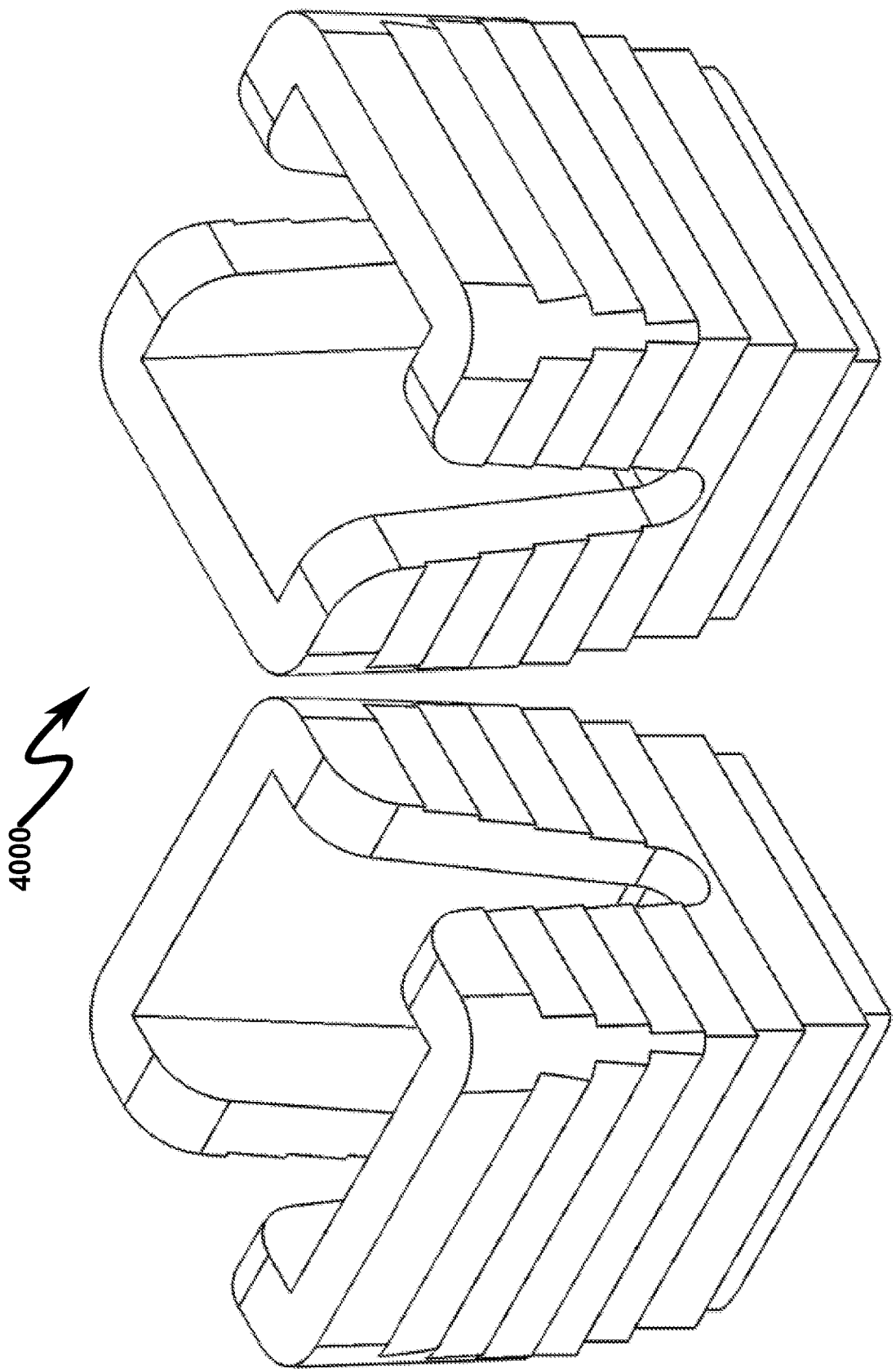
FIG. 40 illustrates bottom left front and bottom right front perspective views of a preferred exemplary embodiment of a toggle switch cover (TSC) (depicting external surface texture (EST) comprising one or more perimeter surface ridge protrusions)

FIG. 37 (3700)-FIG. 40 (4000) depict a preferred exemplary embodiment of a toggle switch cover (TSC) having external surface texture (EST) comprising one or more perimeter surface ridge protrusions.

Figure 41:
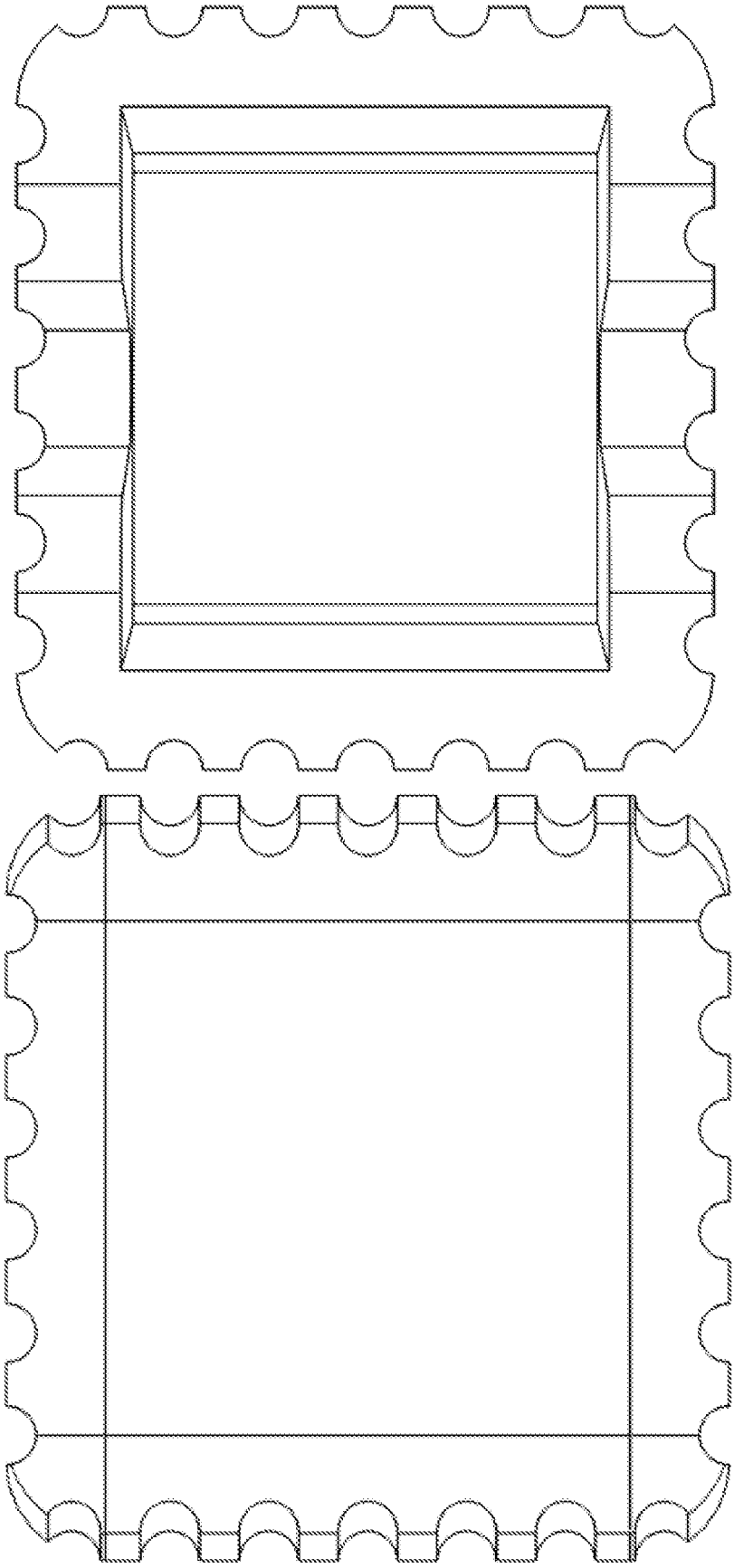
FIG. 41 illustrates front side and rear side views of a preferred exemplary embodiment of a toggle switch cover (TSC) (depicting external surface texture (EST) comprising one or more half-cylinder surface indentions)
Figure 42:
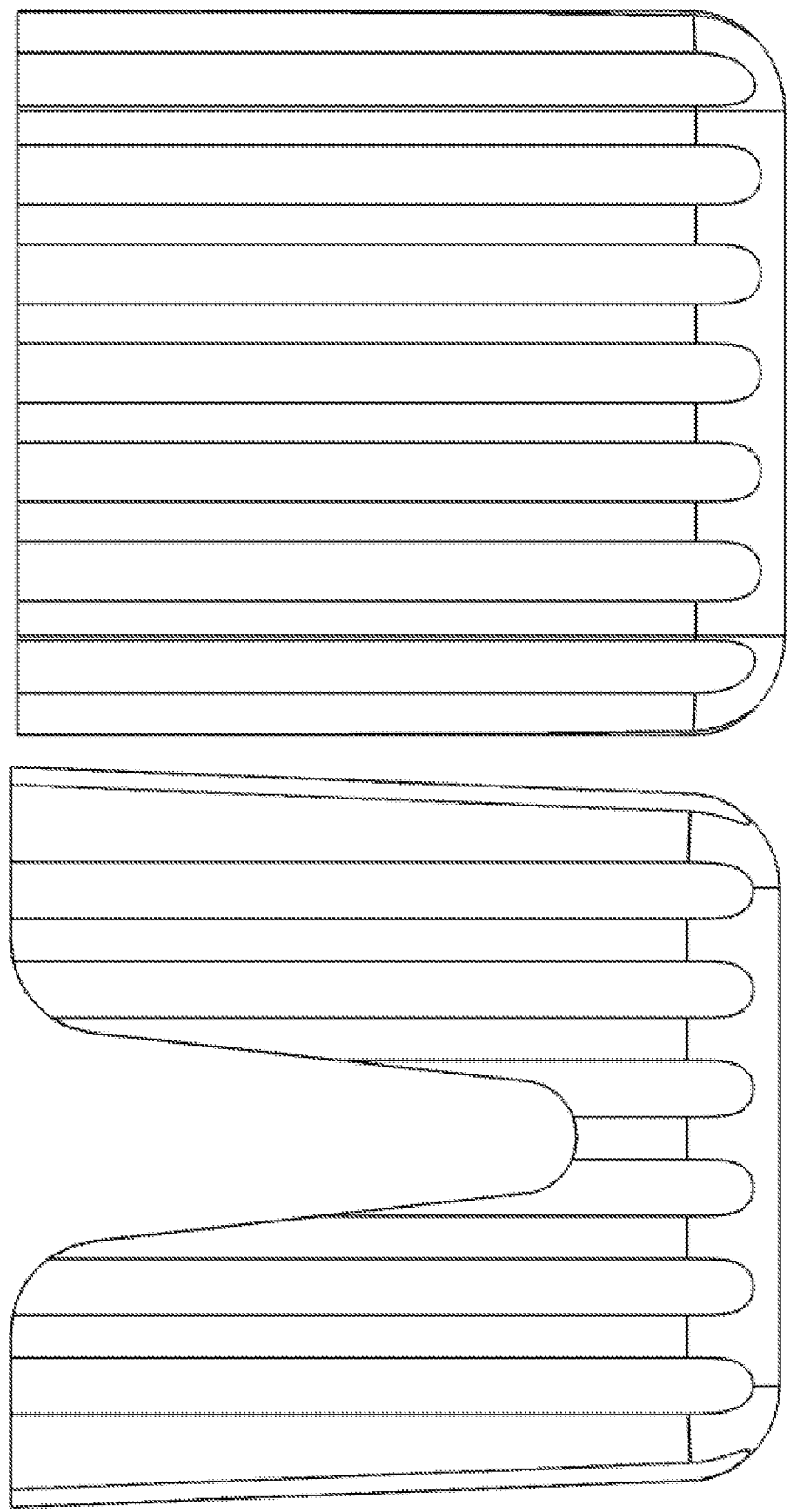
FIG. 42 illustrates left/right side and top/bottom side views of a preferred exemplary embodiment of a toggle switch cover (TSC) (depicting external surface texture (EST) comprising one or more half-cylinder surface indentions)
Figure 43:
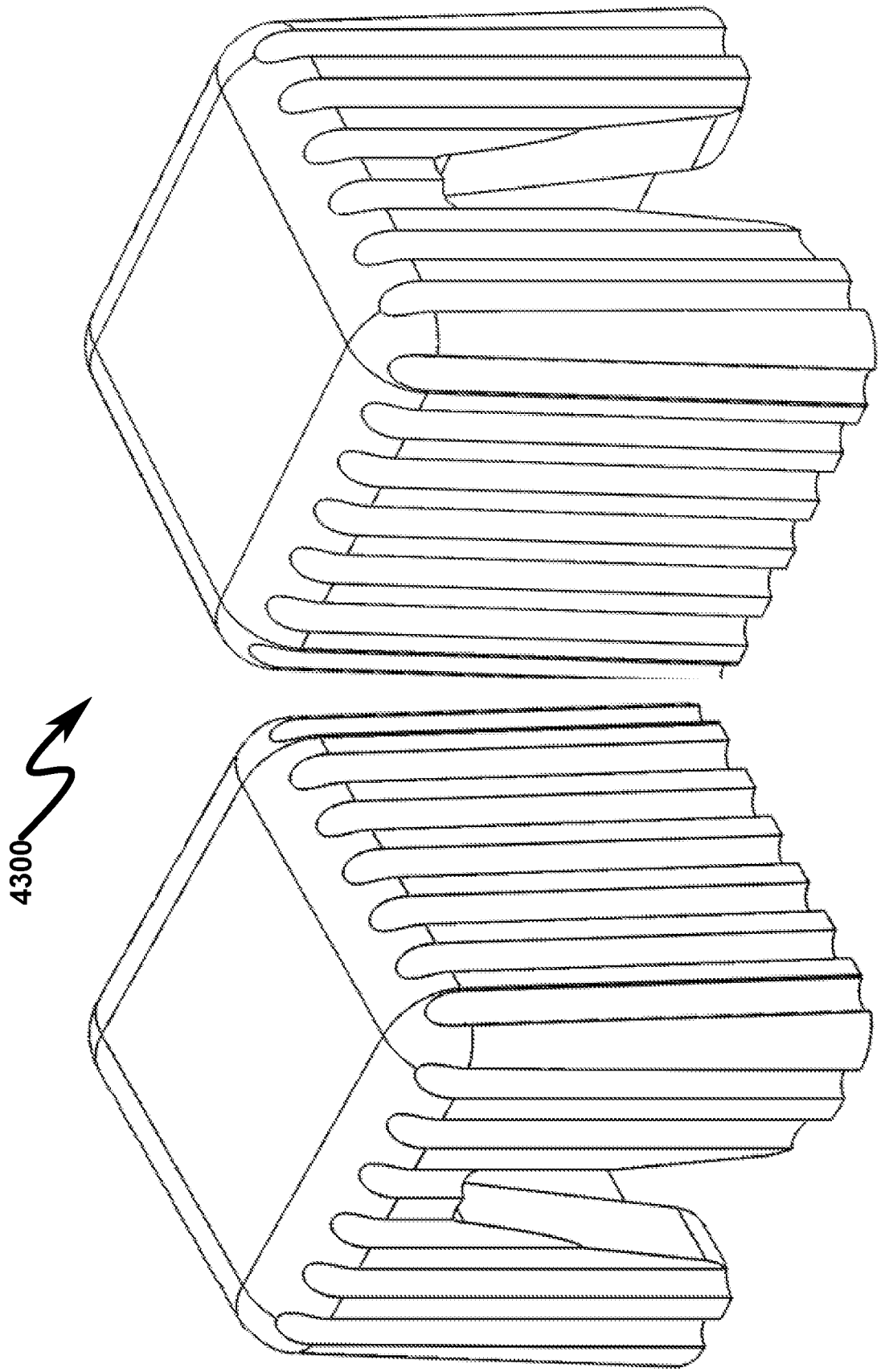
FIG. 43 illustrates top left front and top right front perspective views of a preferred exemplary embodiment of a toggle switch cover (TSC) (depicting external surface texture (EST) comprising one or more half-cylinder surface indentions)
Figure 44:
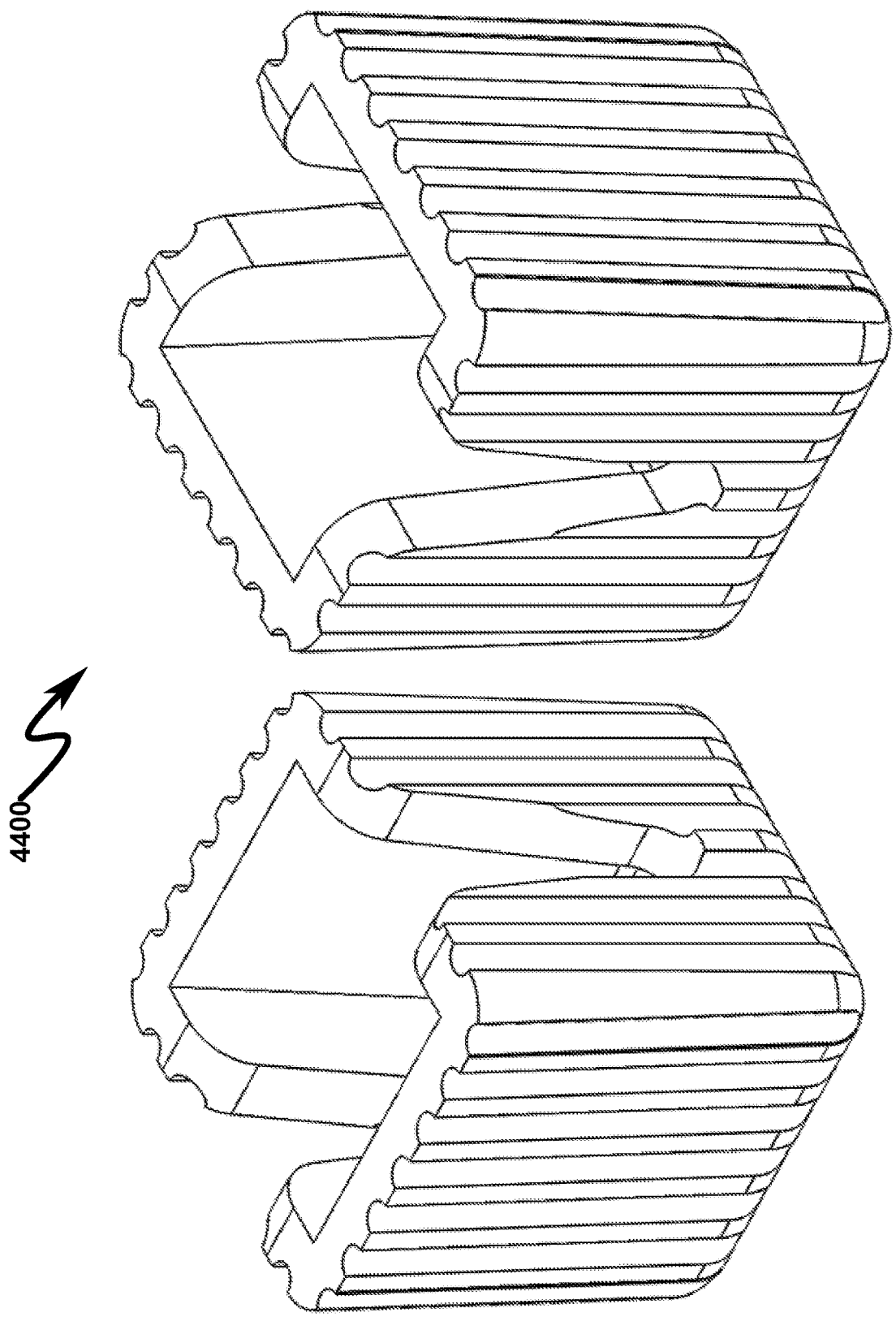
FIG. 44 illustrates bottom left front and bottom right front perspective views of a preferred exemplary embodiment of a toggle switch cover (TSC) (depicting external surface texture (EST) comprising one or more half-cylinder surface indentions)

FIG. 41 (4100)-FIG. 44 (4400) depict a preferred exemplary embodiment of a toggle switch cover (TSC) having external surface texture (EST) comprising one or more half-cylinder surface indentions.

Figure 45:
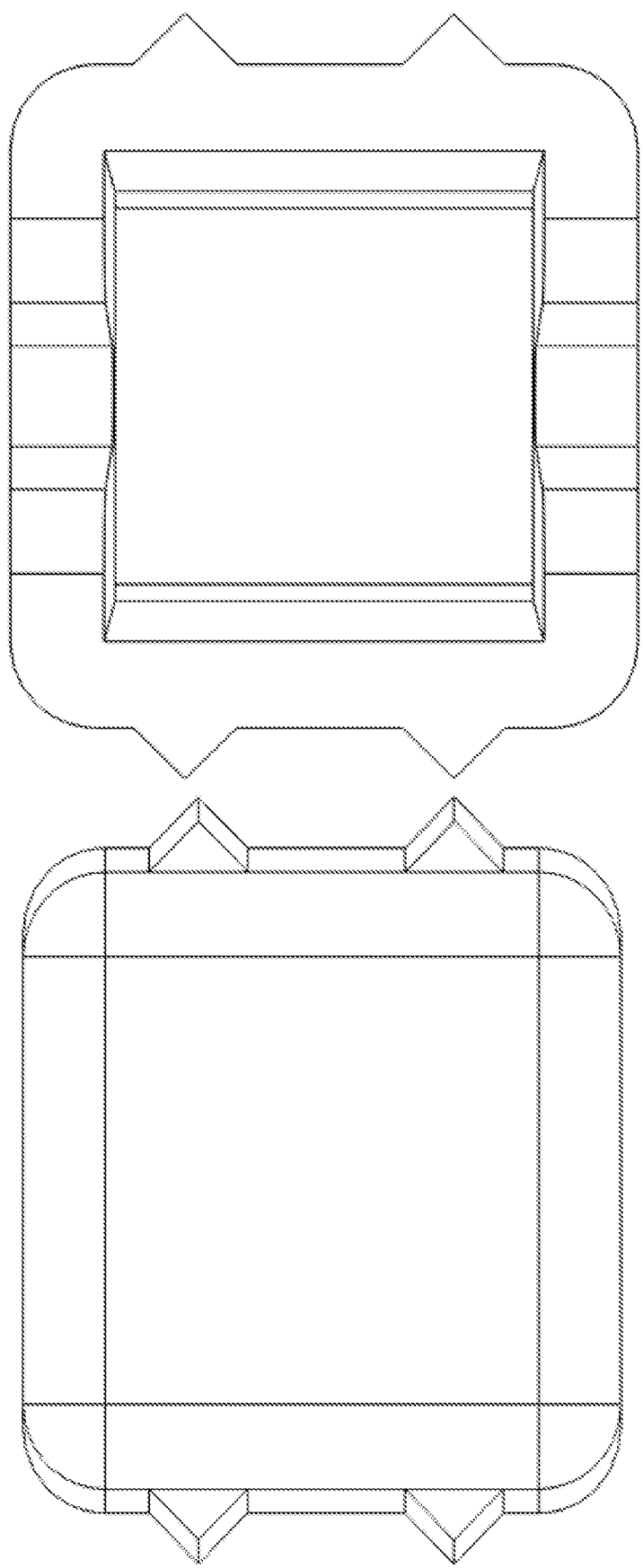
FIG. 45 illustrates front side and rear side views of a preferred exemplary embodiment of a toggle switch cover (TSC) (depicting external surface texture (EST) comprising one or more triangular surface protrusions)
Figure 46:
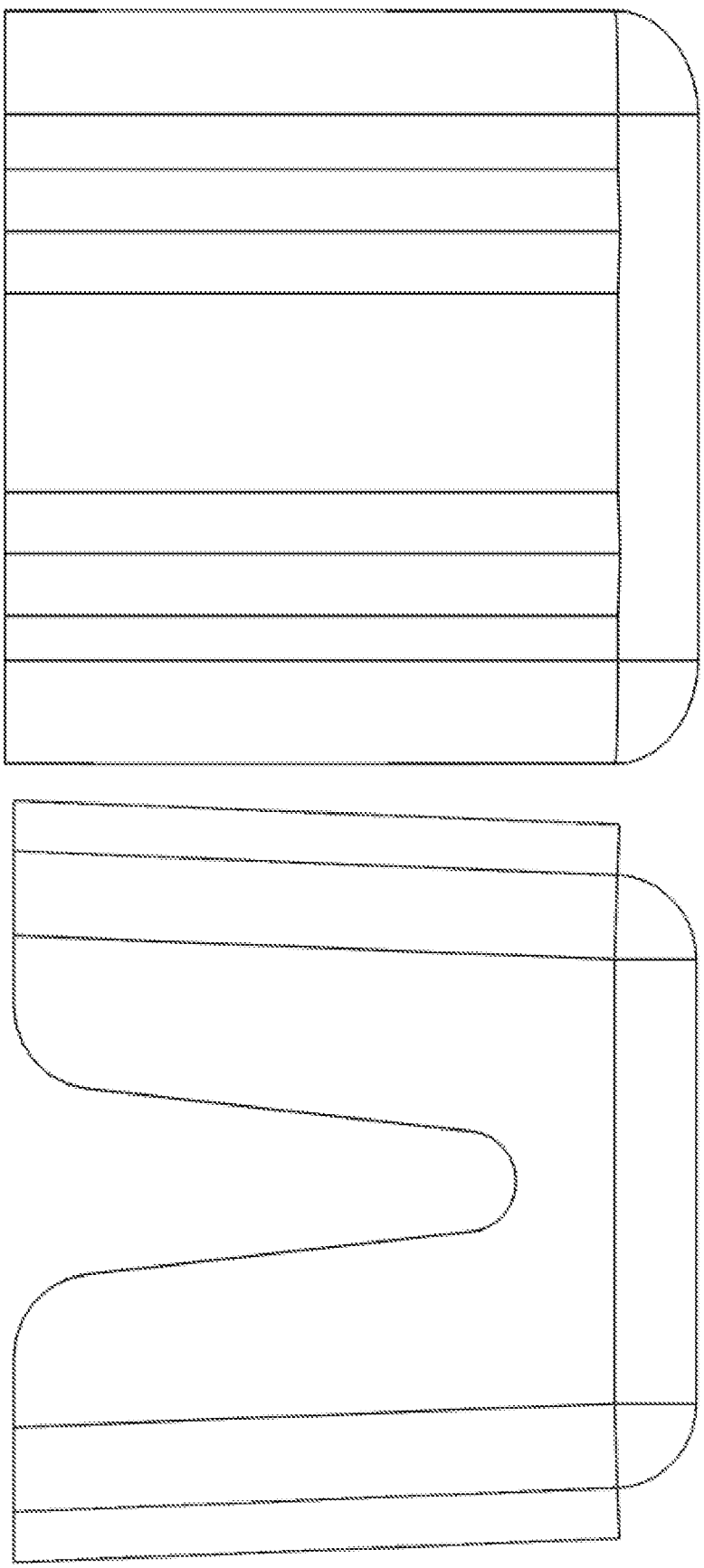
FIG. 46 illustrates left/right side and top/bottom side views of a preferred exemplary embodiment of a toggle switch cover (TSC) (depicting external surface texture (EST) comprising one or more triangular surface protrusions)
Figure 47:
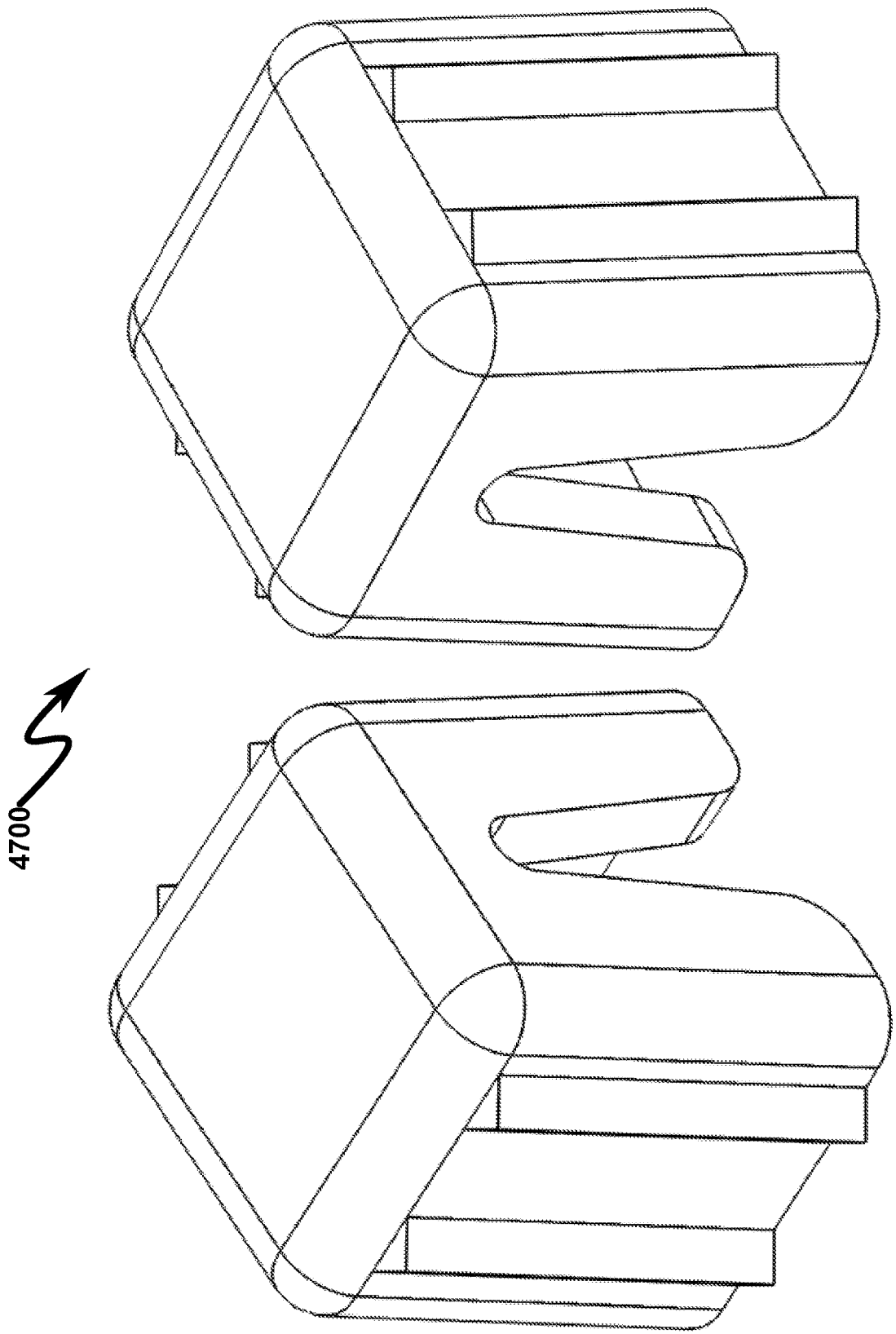
FIG. 47 illustrates top left front and top right front perspective views of a preferred exemplary embodiment of a toggle switch cover (TSC) (depicting external surface texture (EST) comprising one or more triangular surface protrusions)

FIG. 45 (4500)-FIG. 48 (4800) depict a preferred exemplary embodiment of a toggle switch cover (TSC) having external surface texture (EST) comprising one or more triangular surface protrusions).

One skilled in the art will recognize that there are many other possible variations of the TSC that may be constructed to conform to the TSL and function to operate the TSW without allowing human contact with the TSL.

Switch Panel Screw (SPS) Replacement (4900)-(5600)

Figure 49:
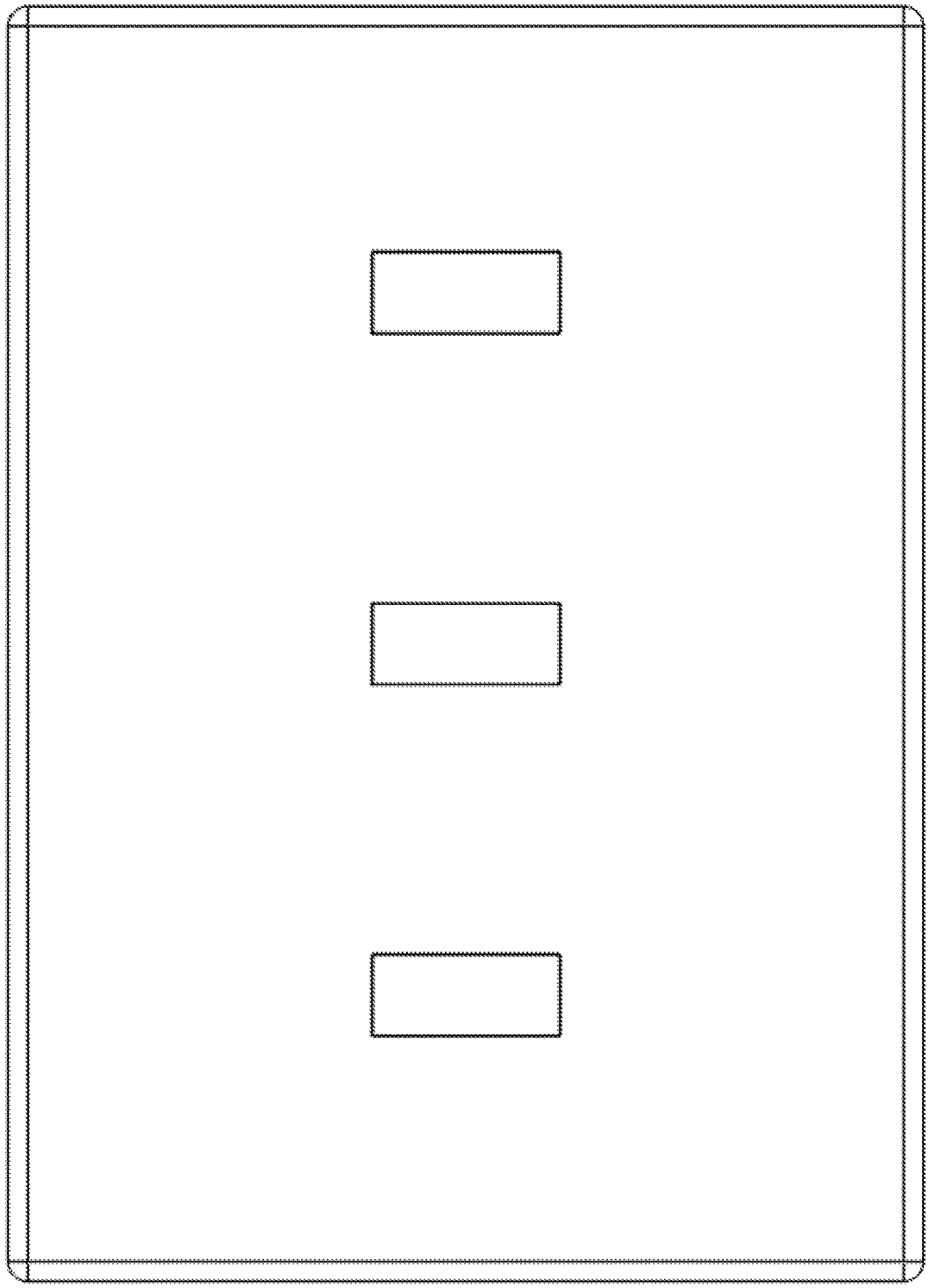
FIG. 49 illustrates a front view of a preferred exemplary invention switch panel screw (SPS) replacement configuration.
Figure 50:
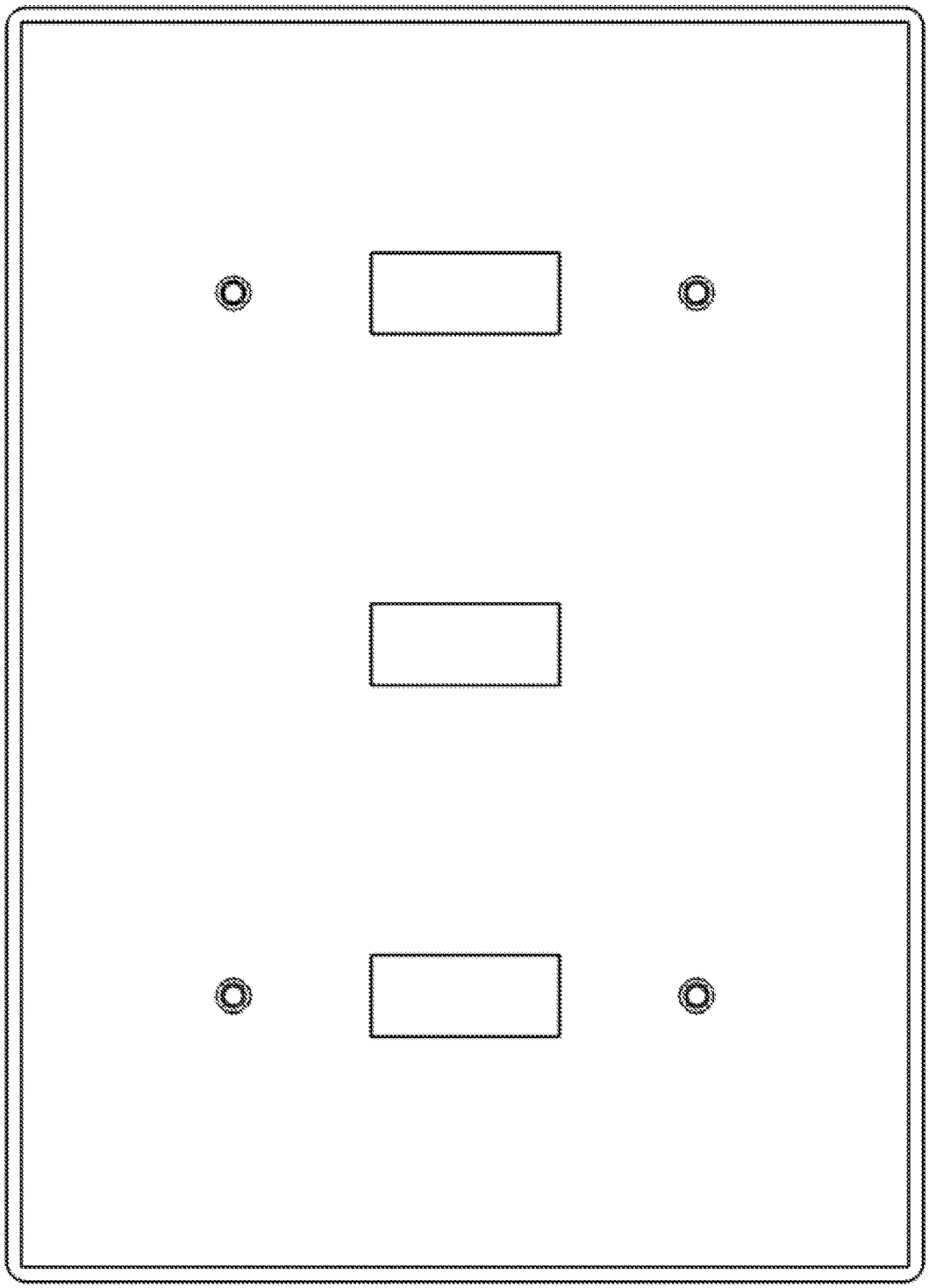
FIG. 50 illustrates a rear view of a preferred exemplary invention switch panel screw (SPS) replacement configuration.
Figure 53:
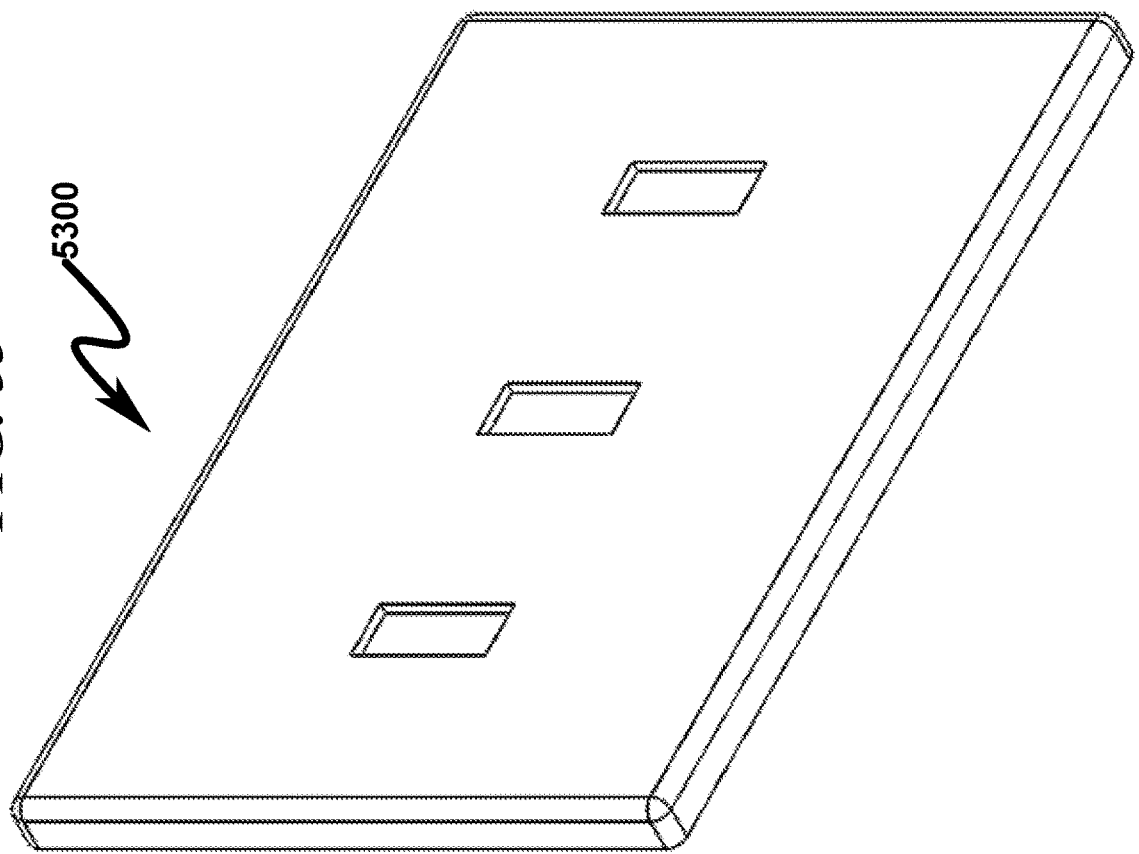
FIG. 53 illustrates a front bottom left perspective view of a preferred exemplary invention switch panel screw (SPS) replacement configuration.
Figure 54:
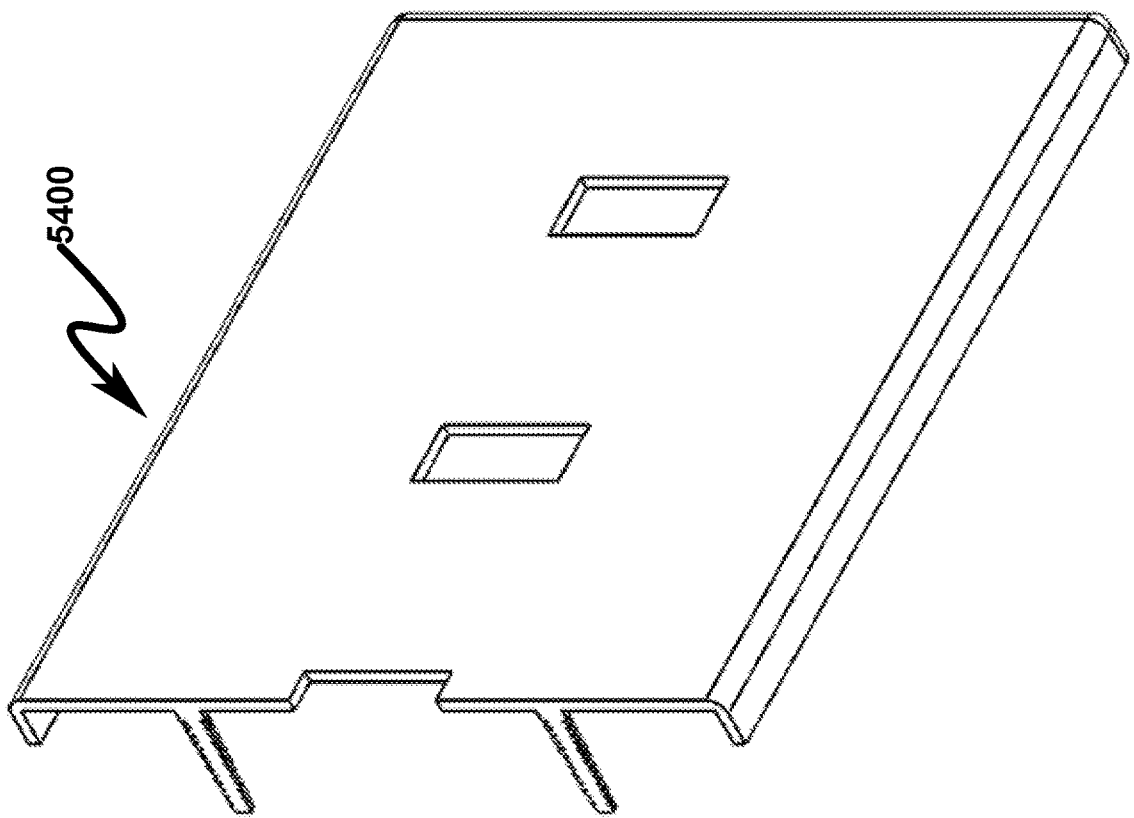
FIG. 54 illustrates a front bottom left perspective section view of a preferred exemplary invention switch panel screw (SPS) replacement configuration.
Figure 55:
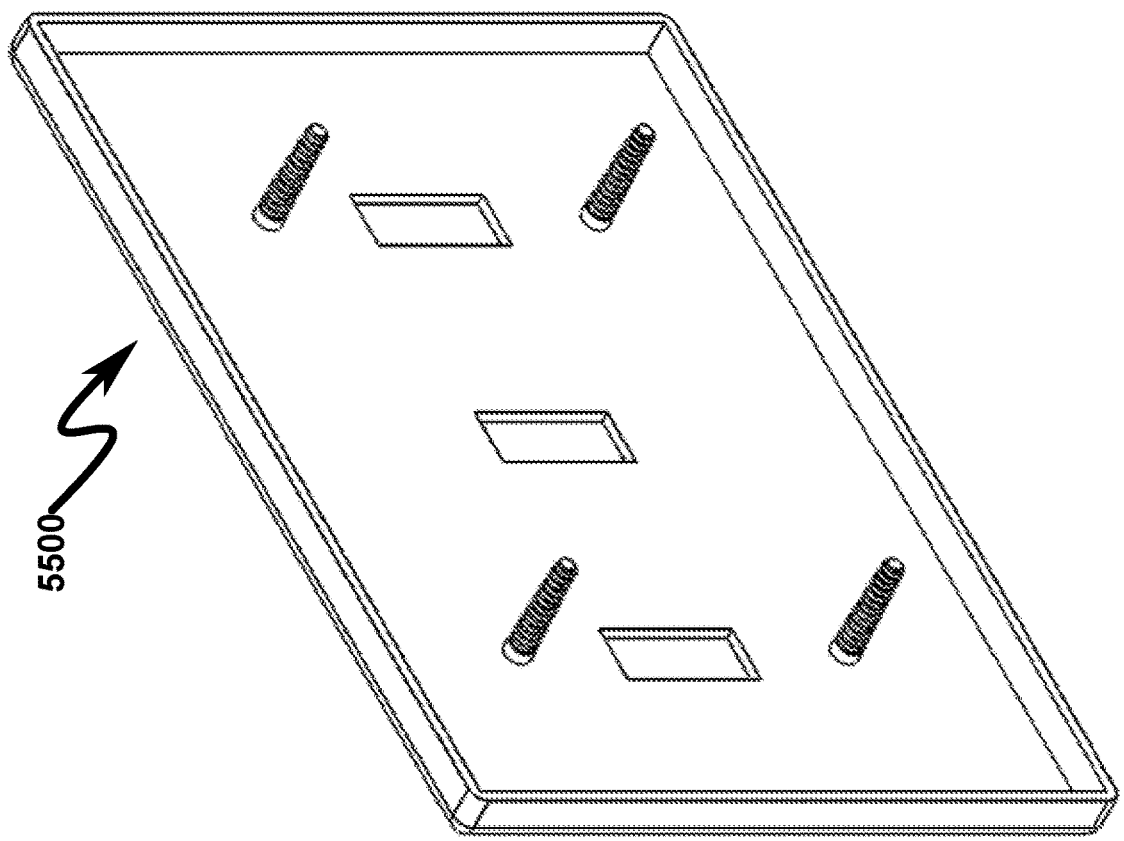
FIG. 55 illustrates a rear top right perspective view of a preferred exemplary invention switch panel screw (SPS) replacement configuration.
Figure 56:
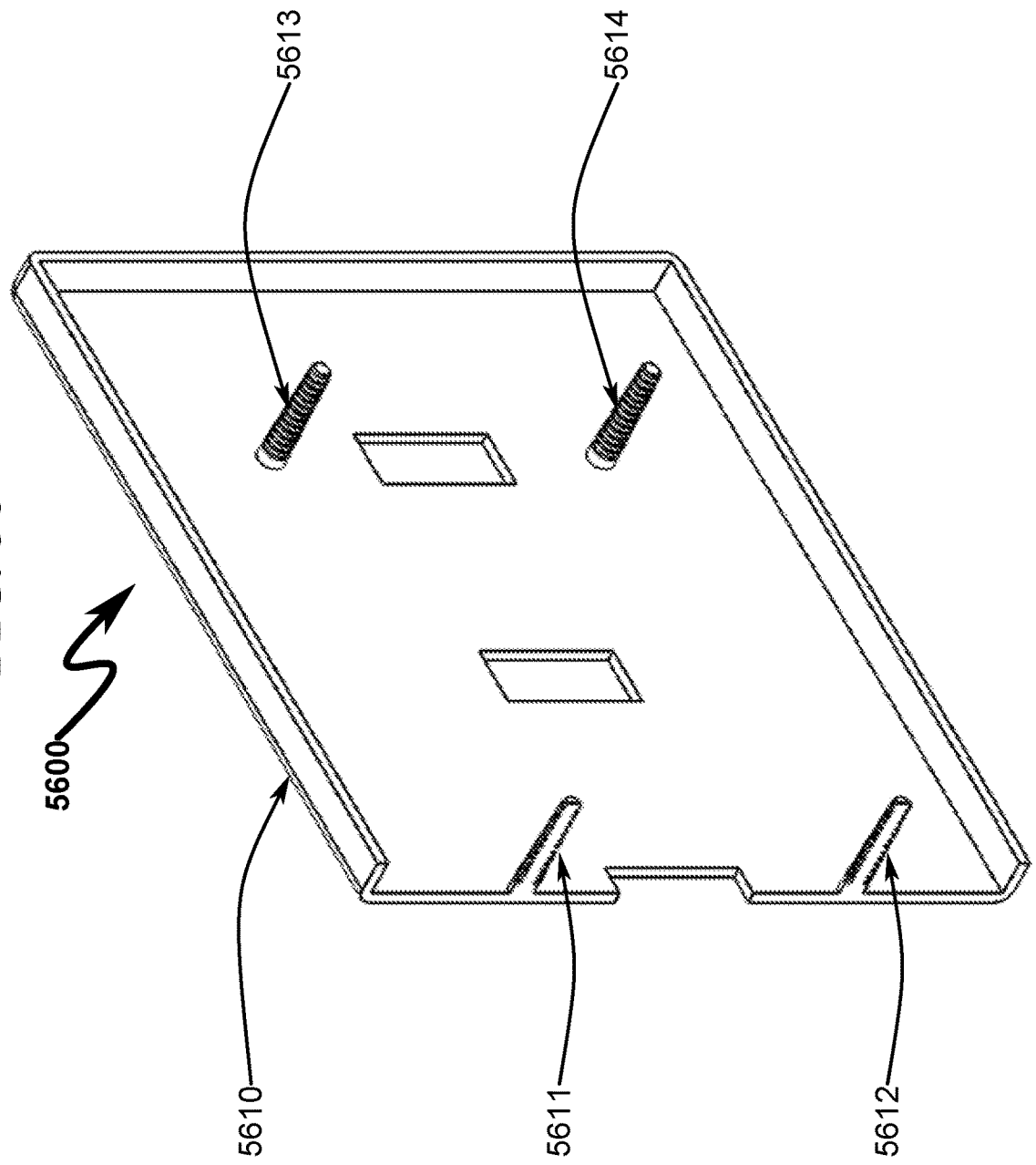
FIG. 56 illustrates a rear top right perspective section view of a preferred exemplary invention switch panel screw (SPS) replacement configuration.

One aspect of traditional switch panel systems currently in use is the fact that the switch panel screws (SPS) represent a potential contamination point wherein they may be contaminated on contact by an initial switch panel operator (SPO) and transfer this contamination to a subsequent SPO. The present invention may addresses this potential contamination point by replacing the switch panel screws (SPS) as depicted in FIG. 49 (4900)-FIG. 56 (5600) with one or more antimicrobial faceplate cover (AFC) (5610) screw panel extrusions (SPE) (5611, 5612, 5613, 5614) that mate with corresponding screw holes in the toggle switches mounted to the junction box.

As noted in the diagrams, the SPE (5611, 5612, 5613, 5614) may be configured so as to have "feathered" and "tapered" projections that achieve a locking action when inserted into a threaded hole provided within the metallic frame of the toggle switch (TSW). Since a common SPS configuration is a #6 screw having a nominal thread diameter of 0.138 inches, the SPE (5611, 5612, 5613, 5614) may be configured as a tapered pin having feathers that engage this diameter but also allow the AFC to be press fit over an existing faceplate with these SPE (5611, 5612, 5613, 5614) engaging the underlying threaded holes in the toggle switch frame so as to secure the AFC over the existing toggle switch faceplate. In this manner, no SPS are exposed thus preventing cross contamination due to SPS contamination by the switch panel operator (s).

Switch Panel Screw (SPS) Antimicrobial Protection (5700)-(6400)

The present invention may incorporate antimicrobial protection with respect to switch panel screws (SPS) that are used to attach an antimicrobial faceplate covering to and existing switch panel faceplate that has no antimicrobial protection. Examples of this configuration are provided as depicted in FIG. 57 (5700)-FIG. 64 (6400).

Here it can be seen that the switch panel screws (SPS) (6401) are contained within a domed countersunk receptacle (DCR) (6402) that recesses the screw head (6403) of the SPS (6401) from the surface of the faceplate (6404). In this manner, the SPS (6401) is prevented from contacting any operator of the switch panel and thus antimicrobial protection is achieved for any contact between an operator and any component of the switch panel.

Figure 57:
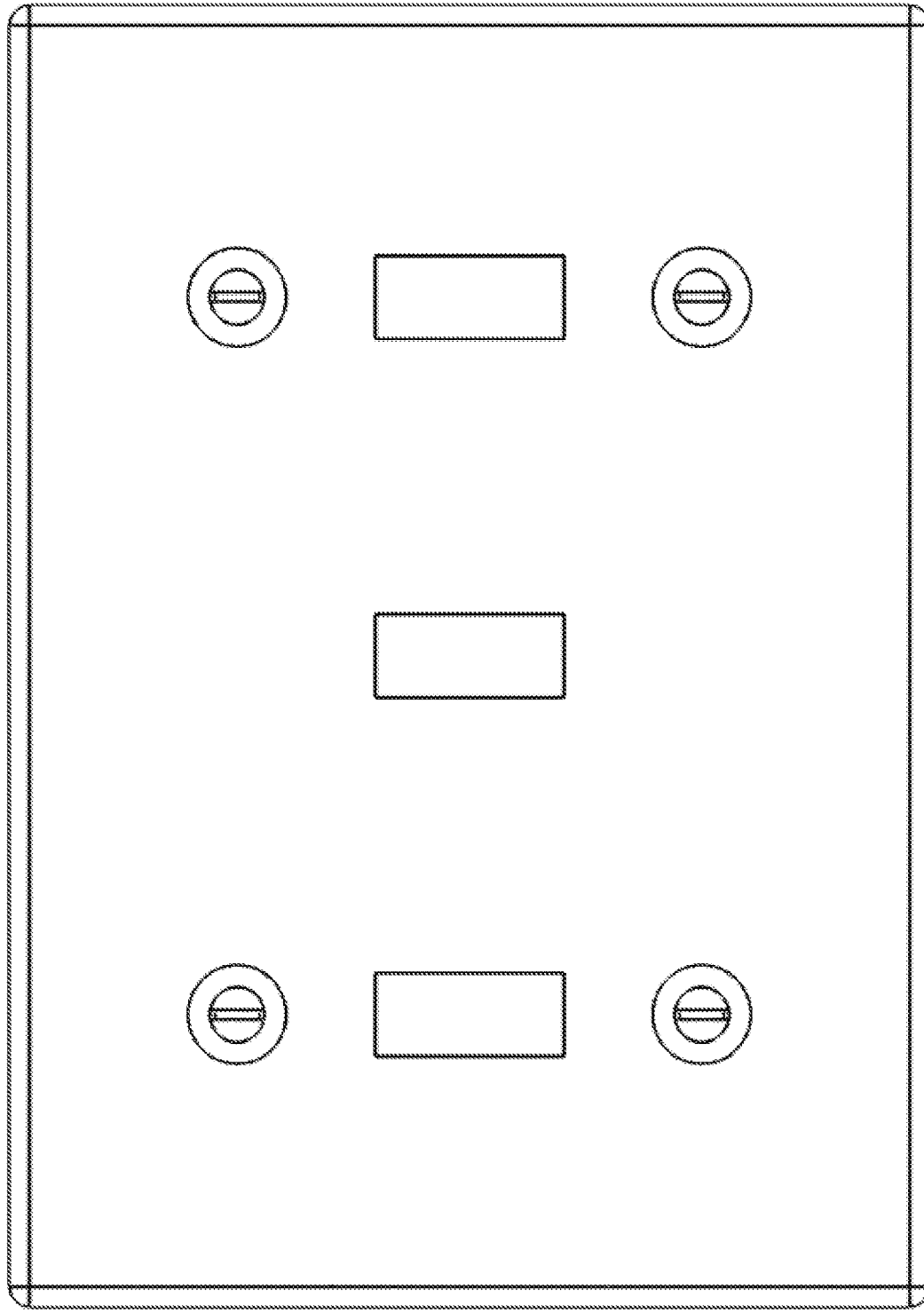
FIG. 57 illustrates a front view of a preferred exemplary invention switch panel screw (SPS) antimicrobial protection configuration.
Figure 58:
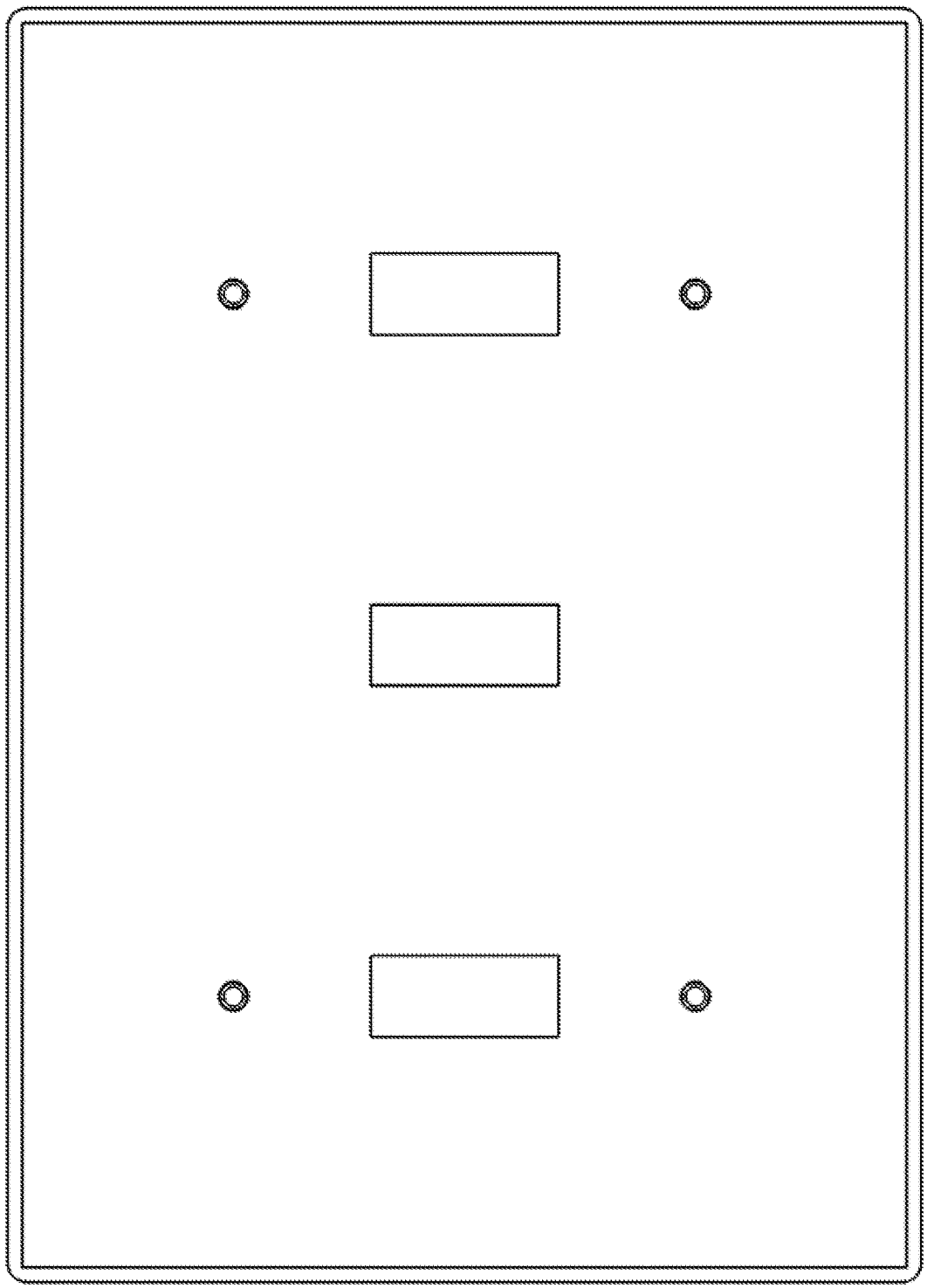
FIG. 58 illustrates a rear view of a preferred exemplary invention switch panel screw (SPS) antimicrobial protection configuration.
Figure 61:
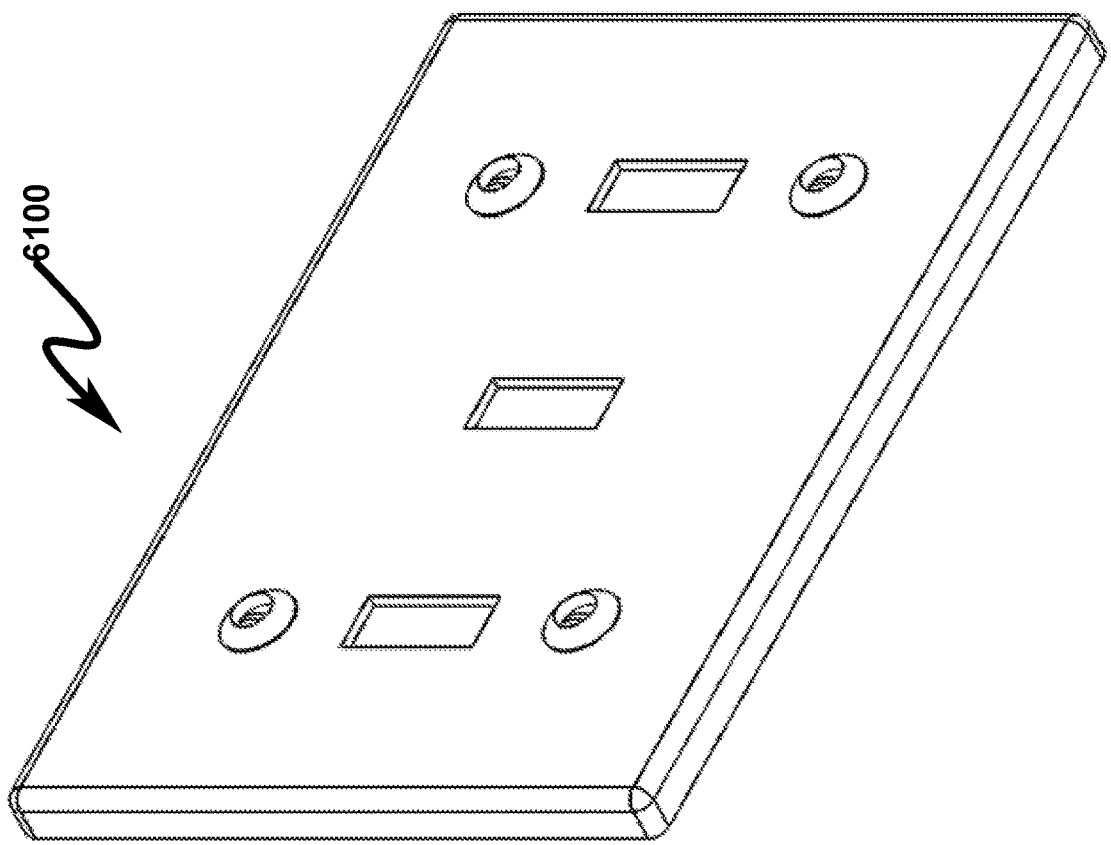
FIG. 61 illustrates a front bottom left perspective view of a preferred exemplary invention switch panel screw (SPS) antimicrobial protection configuration.
Figure 62:
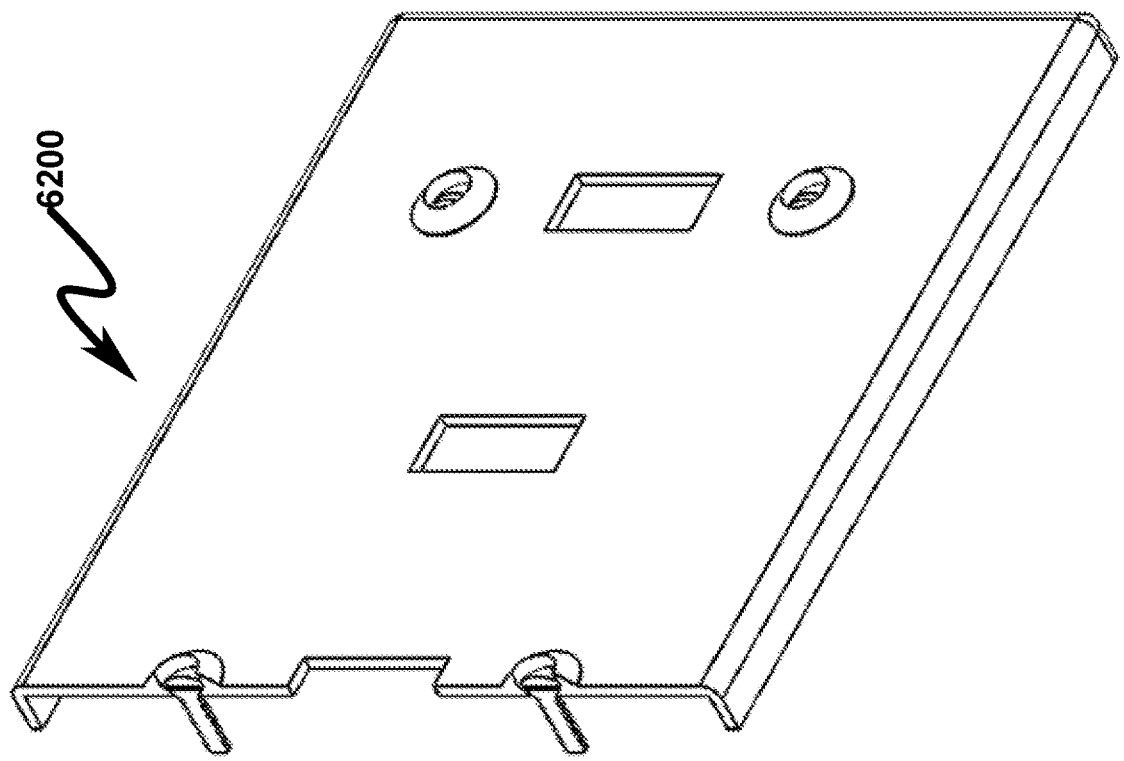
FIG. 62 illustrates a front bottom left perspective section view of a preferred exemplary invention switch panel screw (SPS) antimicrobial protection configuration.
Figure 63:
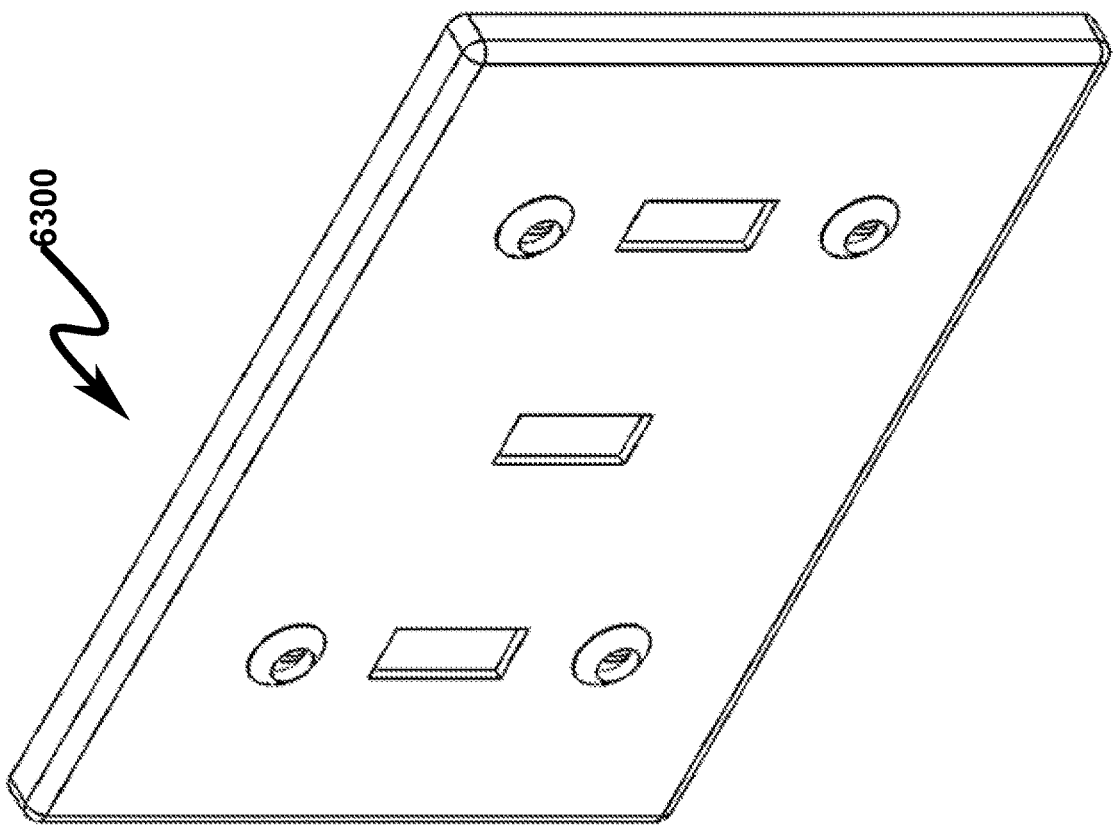
FIG. 63 illustrates a front top right perspective view of a preferred exemplary invention switch panel screw (SPS) antimicrobial protection configuration.
Figure 64:
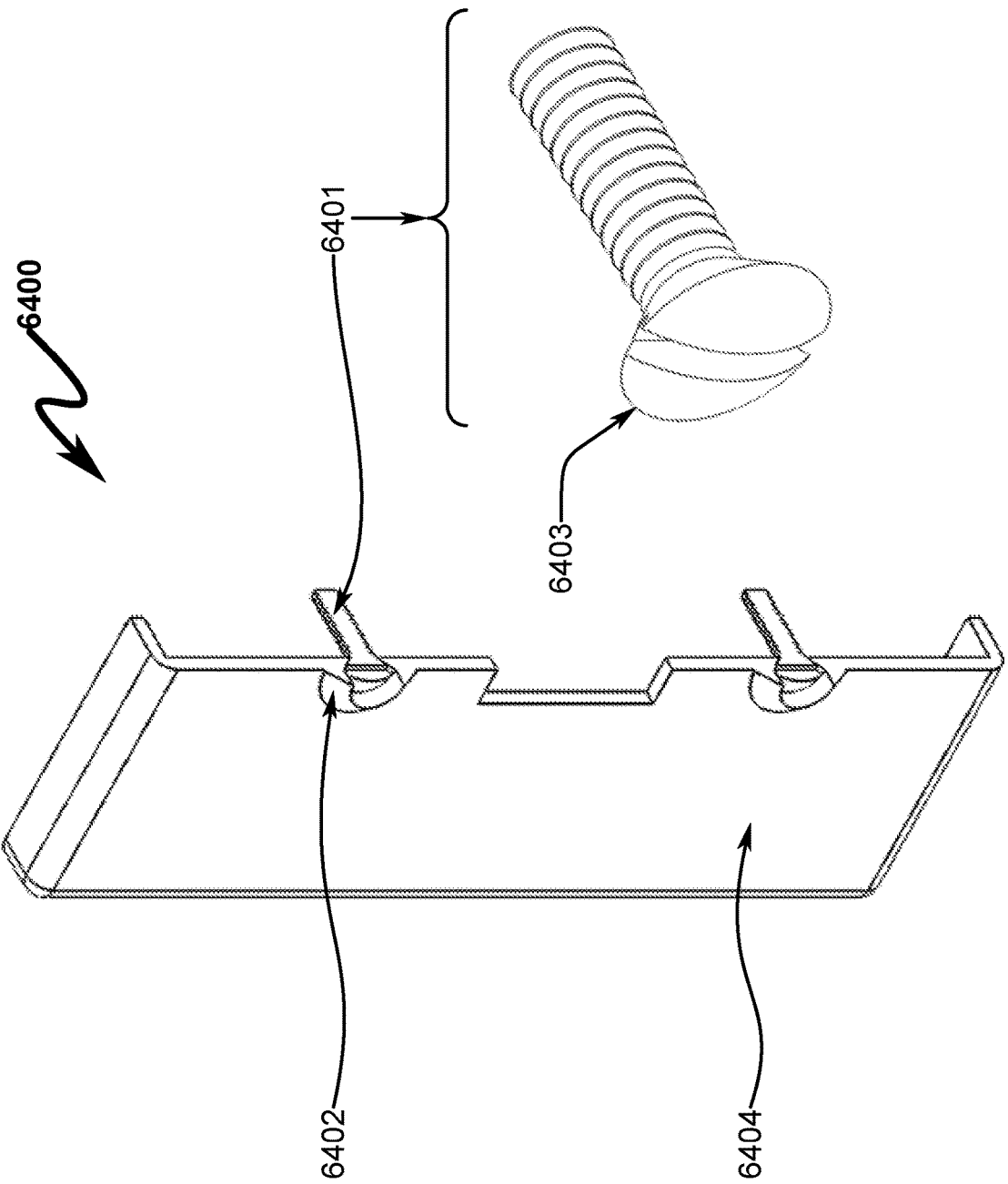
FIG. 64 illustrates a front top right perspective section view of a preferred exemplary invention switch panel screw (SPS) antimicrobial protection configuration.

While this SPS antimicrobial protection is illustrated with a toggle switch panel in FIG. 57 (5700)-FIG. 64 (6400), the concept may be applied to any type of switch panel or switch panel cover described herein.

Rocker Switch Embodiment (6500)-(7900)

Figure 65:
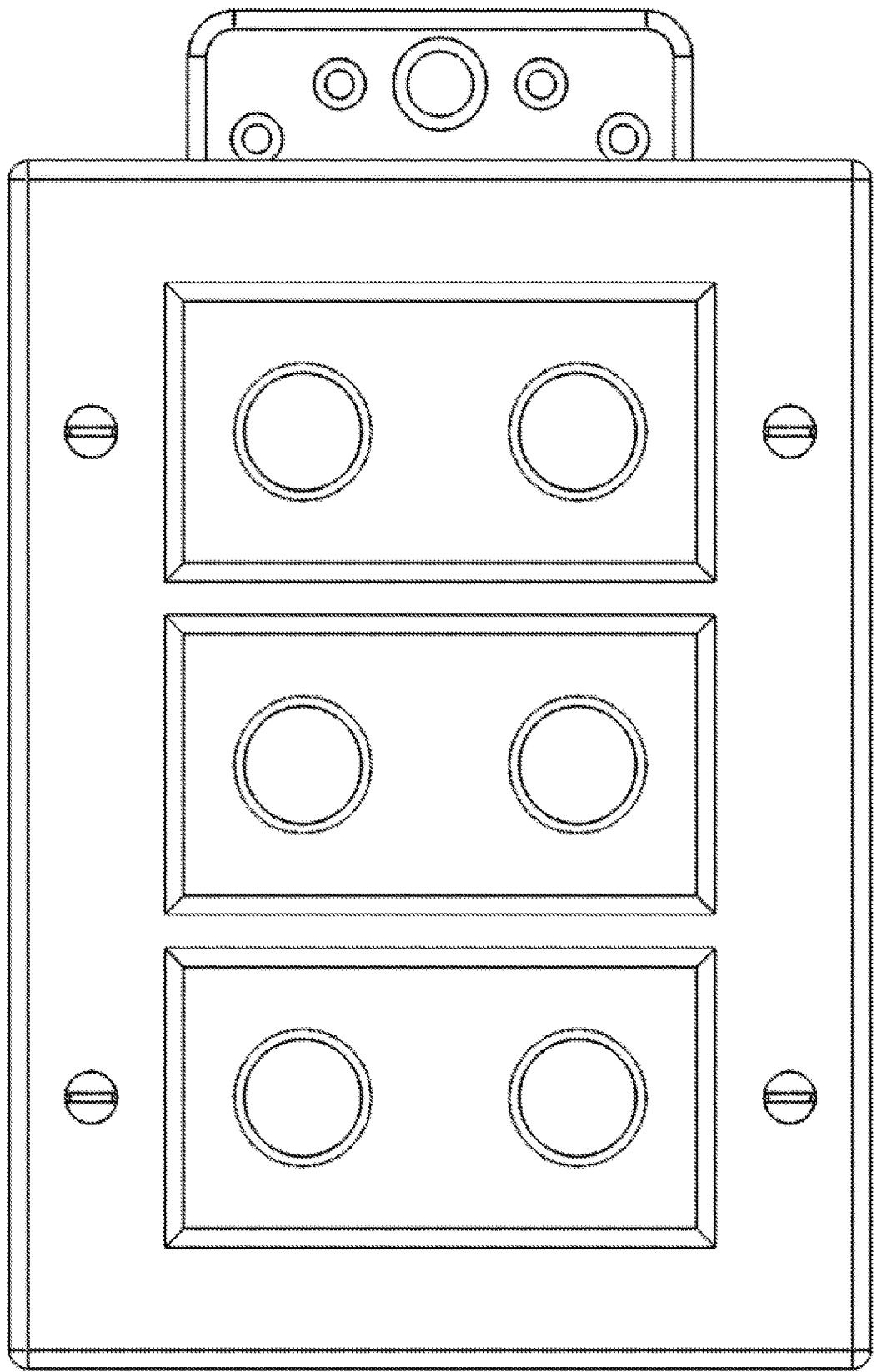
FIG. 65 illustrates a front view of a preferred exemplary embodiment of a rocker switch panel (RSP) embodiment of the present invention.
Figure 66:
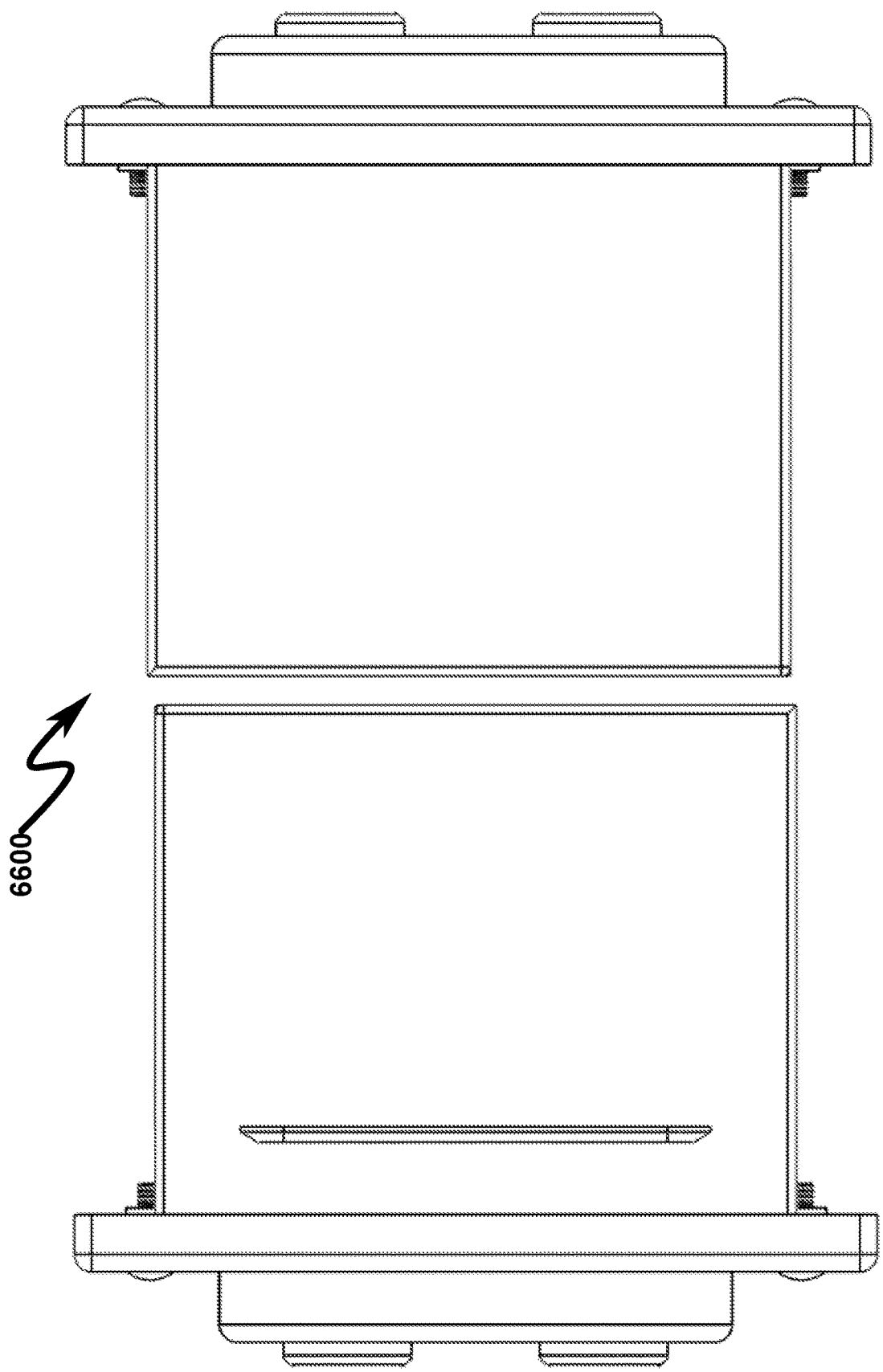
FIG. 66 illustrates left and right side views of a preferred exemplary embodiment of a rocker switch panel (RSP) embodiment of the present invention.
Figure 67:
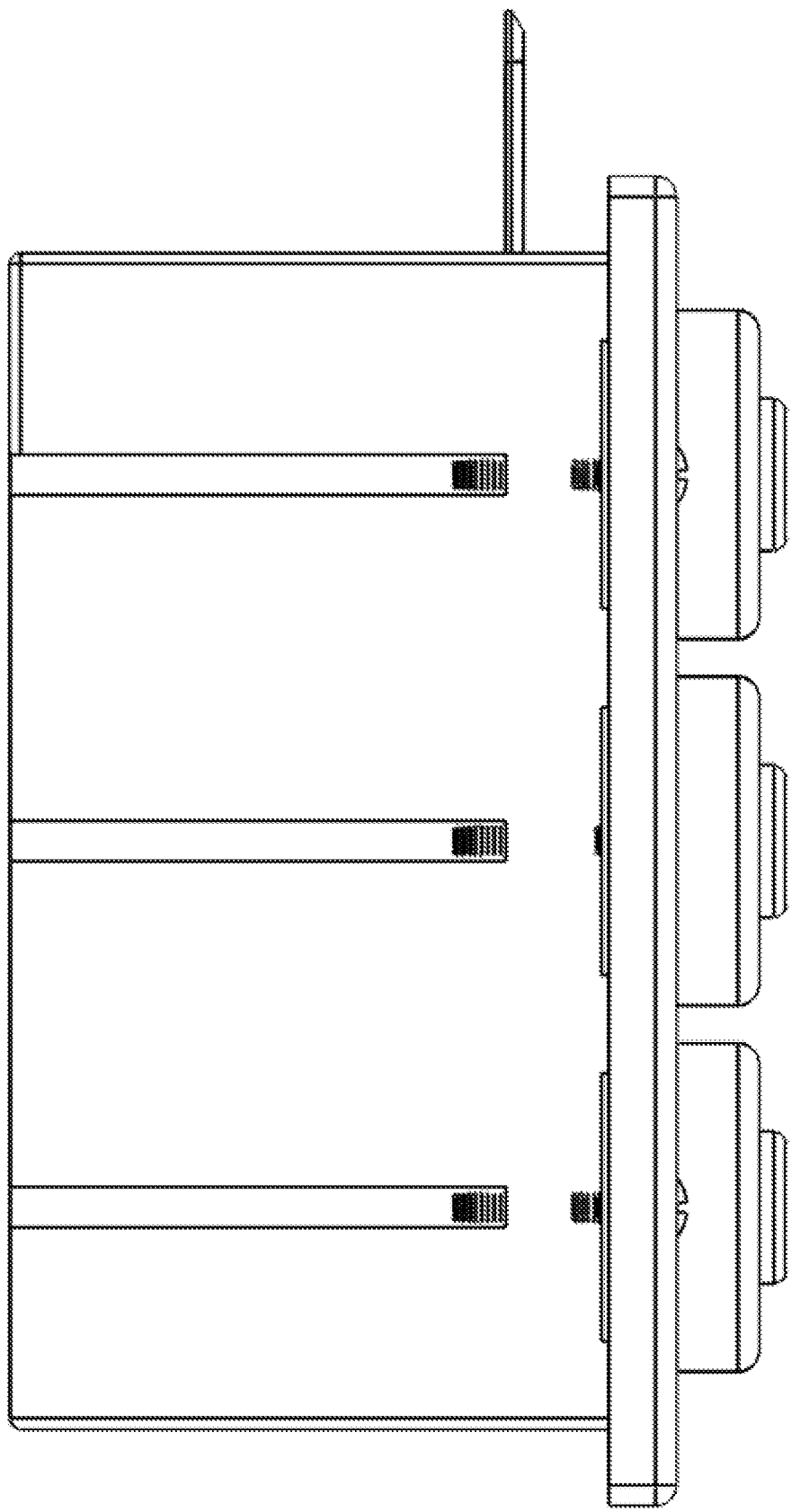
FIG. 67 illustrates a top view of a preferred exemplary embodiment of a rocker switch panel (RSP) embodiment of the present invention.
Figure 68:
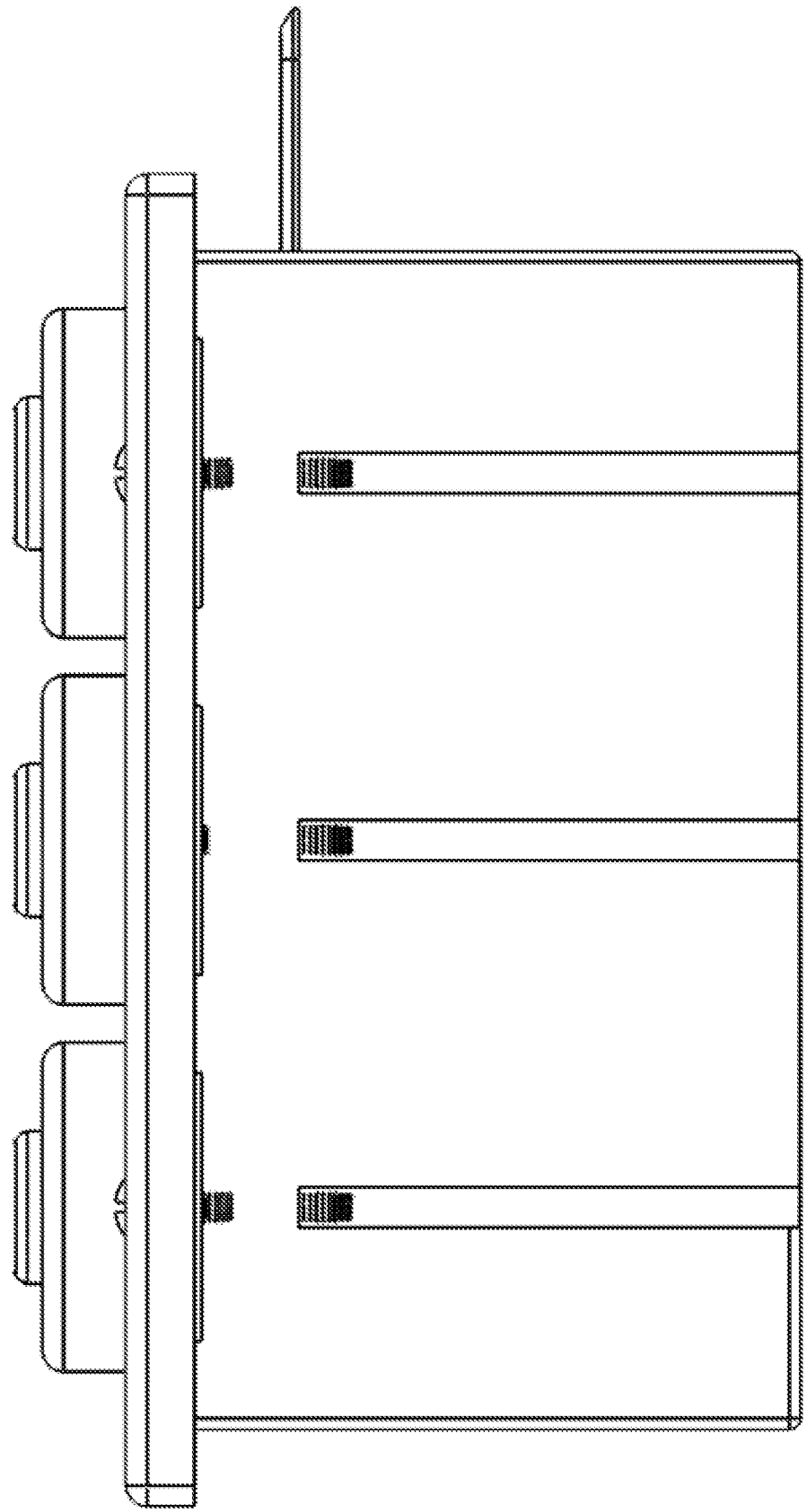
FIG. 68 illustrates a bottom view of a preferred exemplary embodiment of a rocker switch panel (RSP) embodiment of the present invention.
Figure 69:
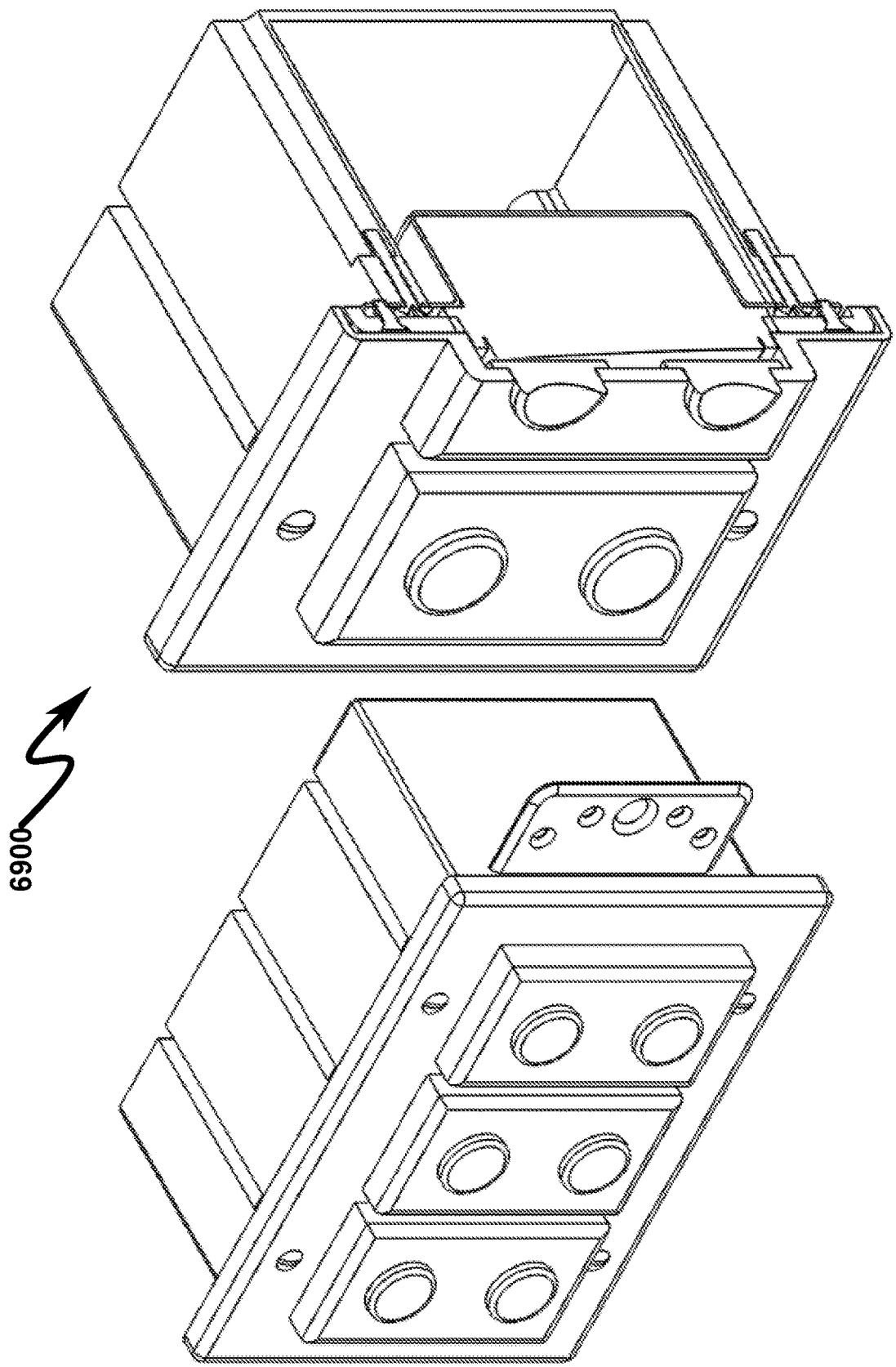
FIG. 69 illustrates front top right perspective and front top right perspective section views of a preferred exemplary embodiment of a rocker switch panel (RSP) embodiment of the present invention.
Figure 70:
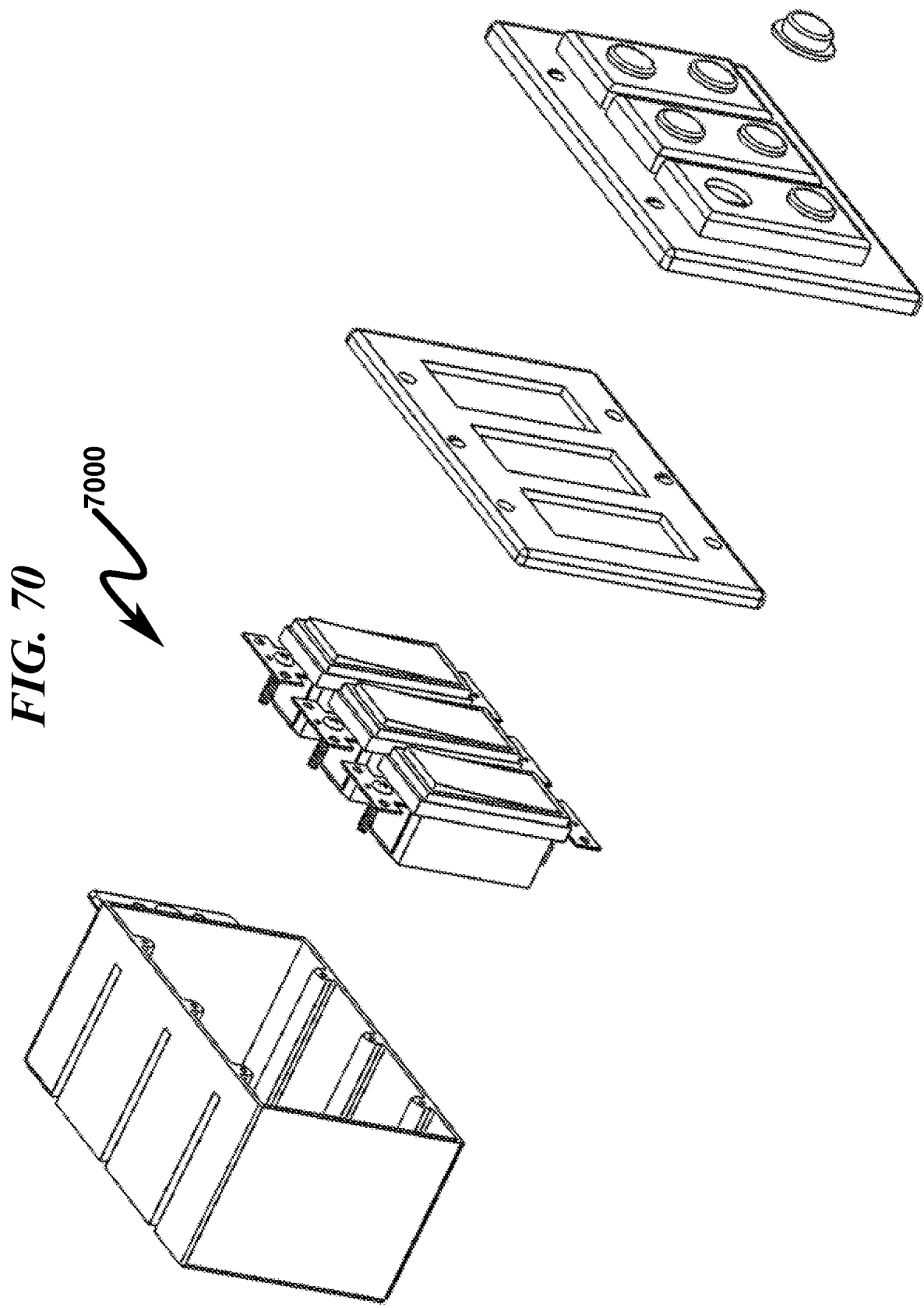
FIG. 70 illustrates a front top left perspective assembly view of a preferred exemplary embodiment of a rocker switch panel (RSP) embodiment of the present invention.
Figure 71:
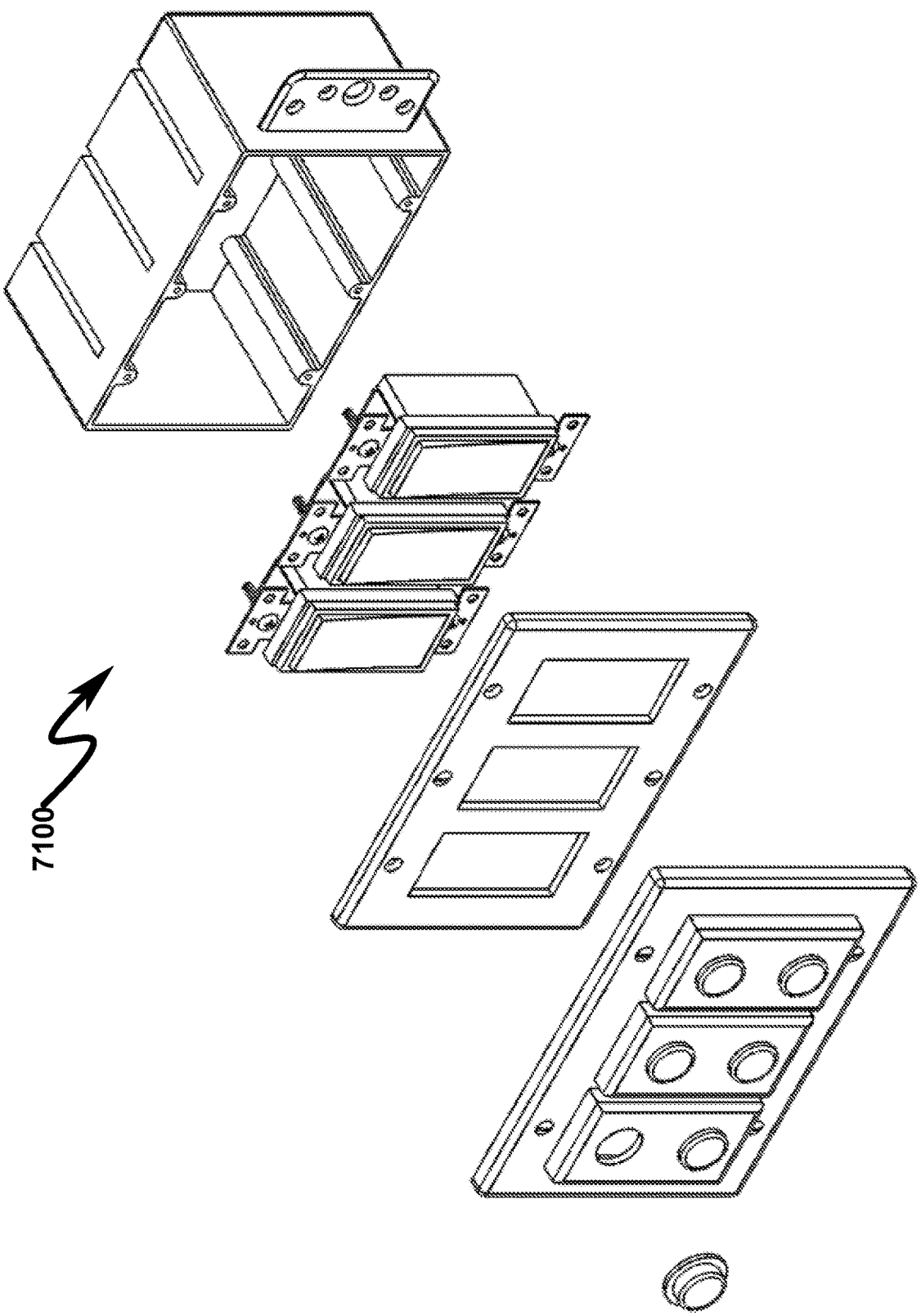
FIG. 71 illustrates a front top right perspective assembly view of a preferred exemplary embodiment of a rocker switch panel (RSP) embodiment of the present invention.
Figure 72:
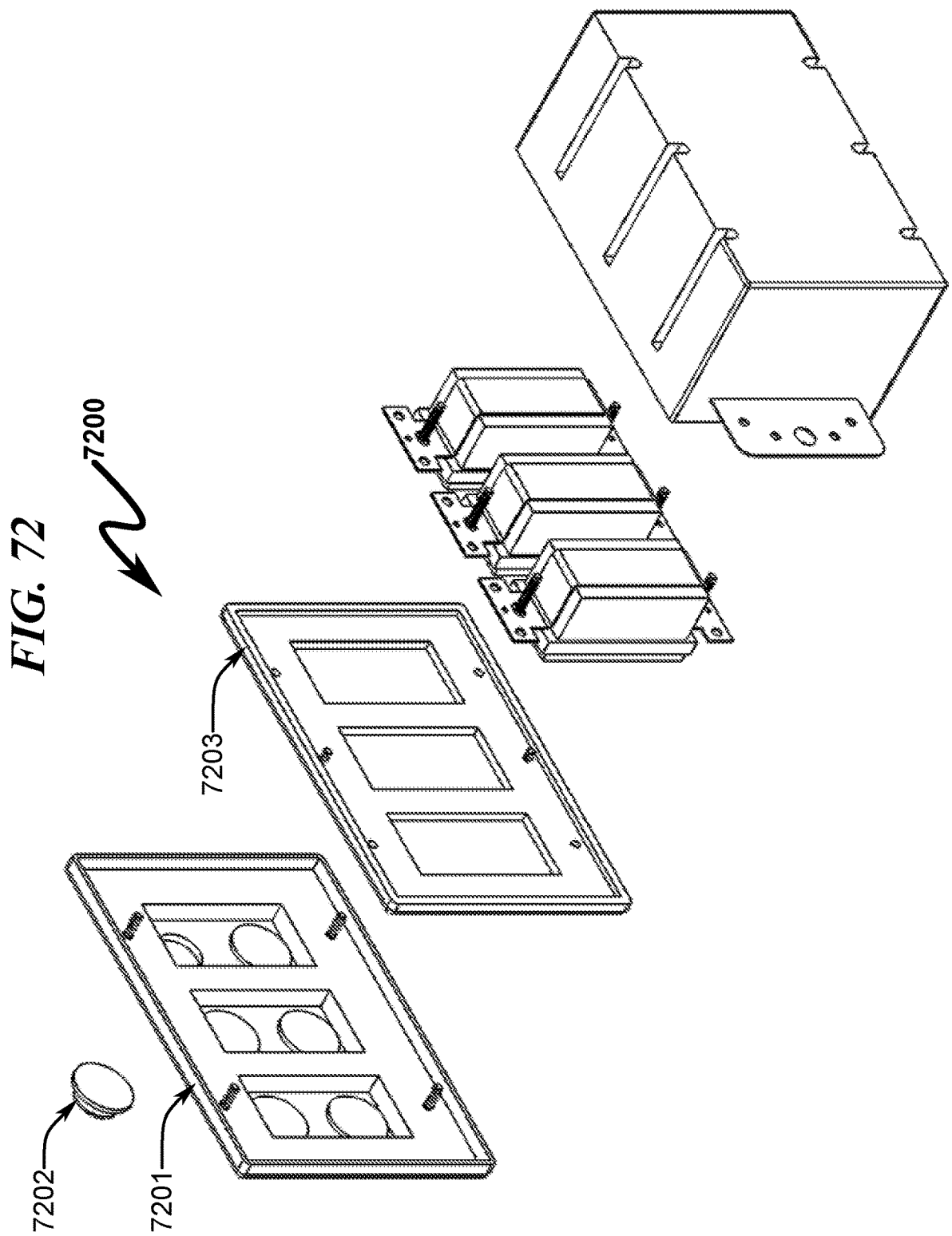
FIG. 72 illustrates a rear top right perspective assembly view of a preferred exemplary embodiment of a rocker switch panel (RSP) embodiment of the present invention.
Figure 73:
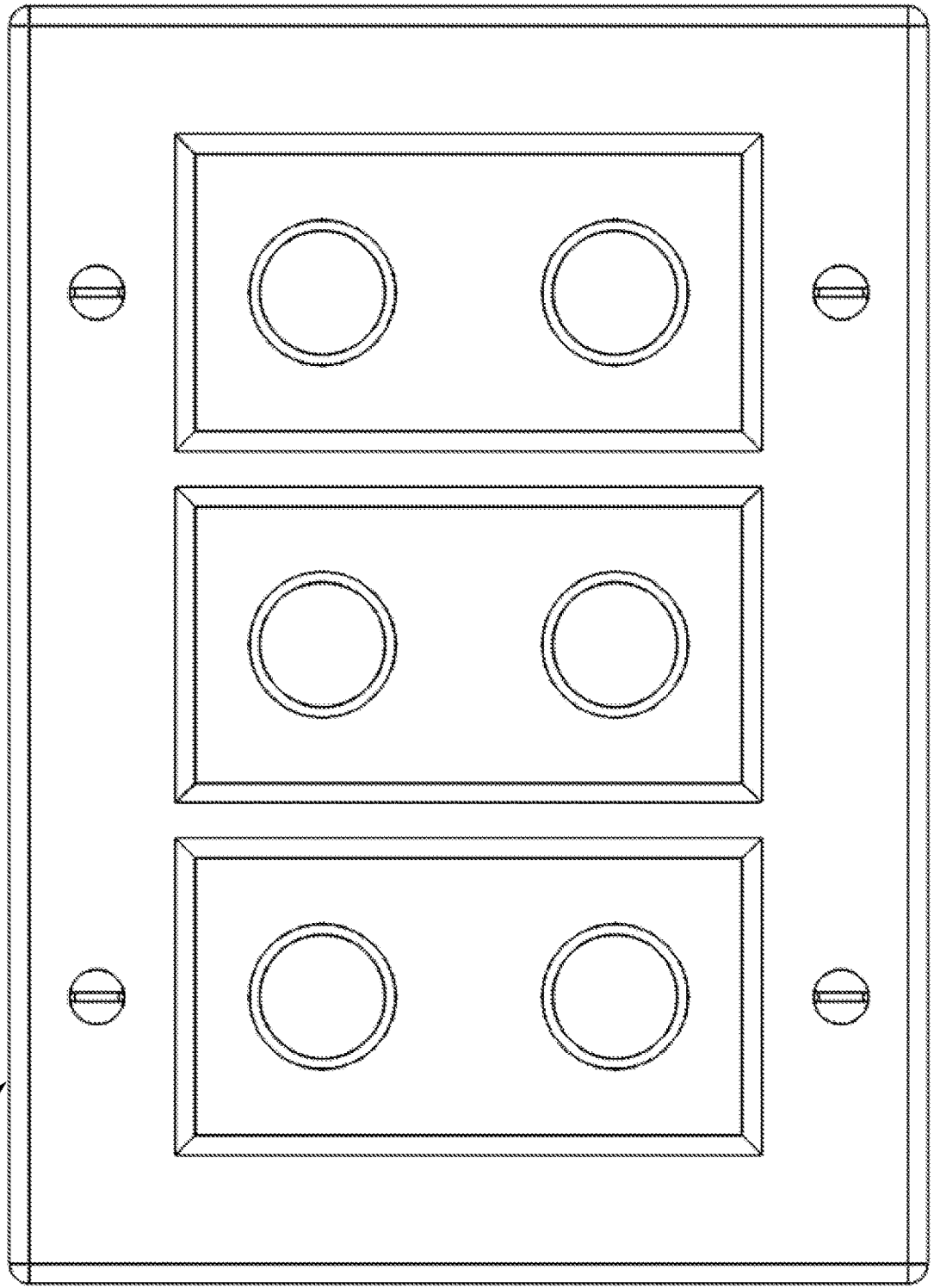
FIG. 73 illustrates a detail front view of a preferred exemplary embodiment of a rocker switch panel (RSP) faceplate (RSF) embodiment of the present invention.
Figure 74:
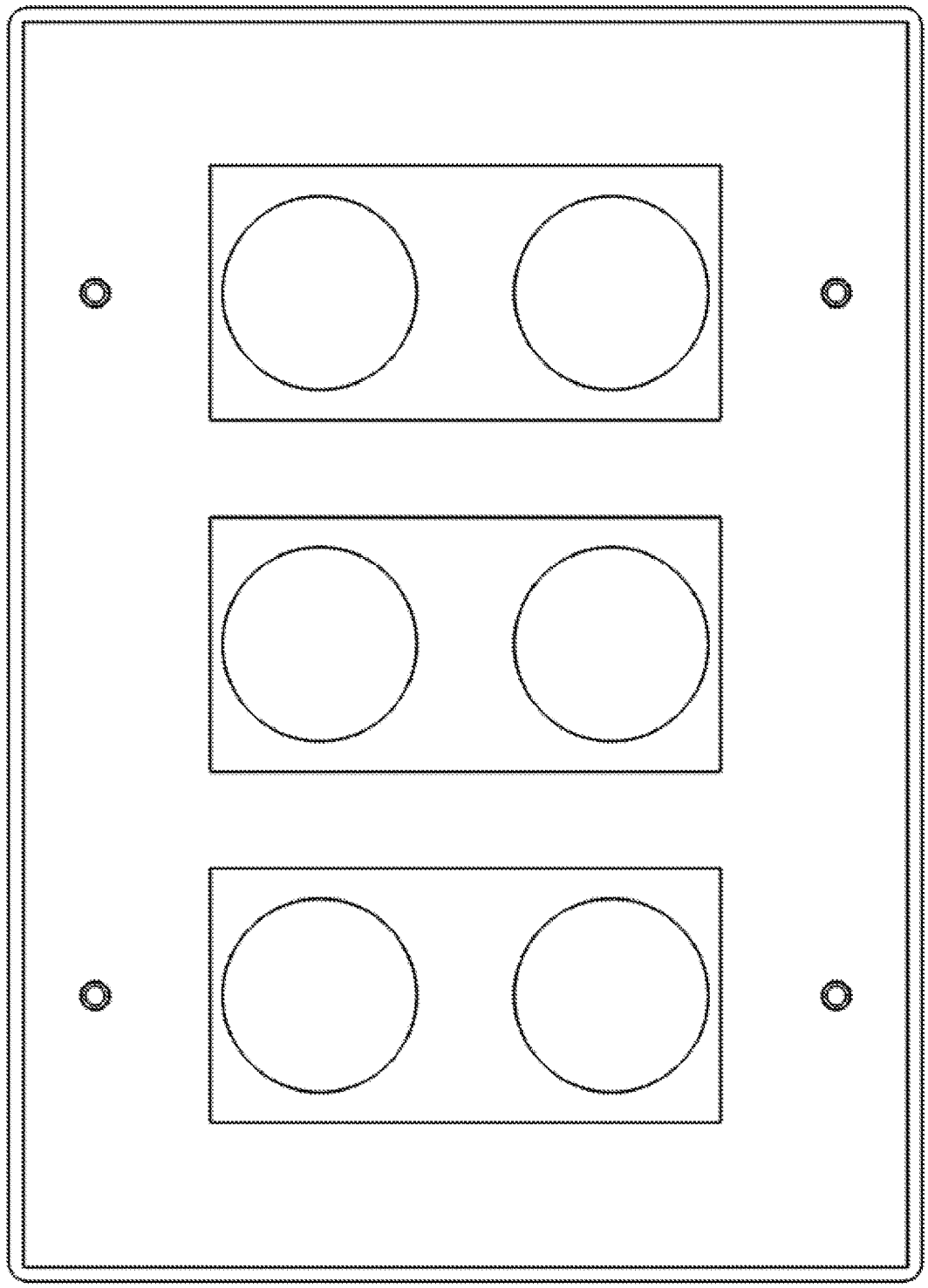
FIG. 74 illustrates a detail rear view of a preferred exemplary embodiment of a rocker switch panel (RSP) faceplate (RSF) embodiment of the present invention.
Figure 76:
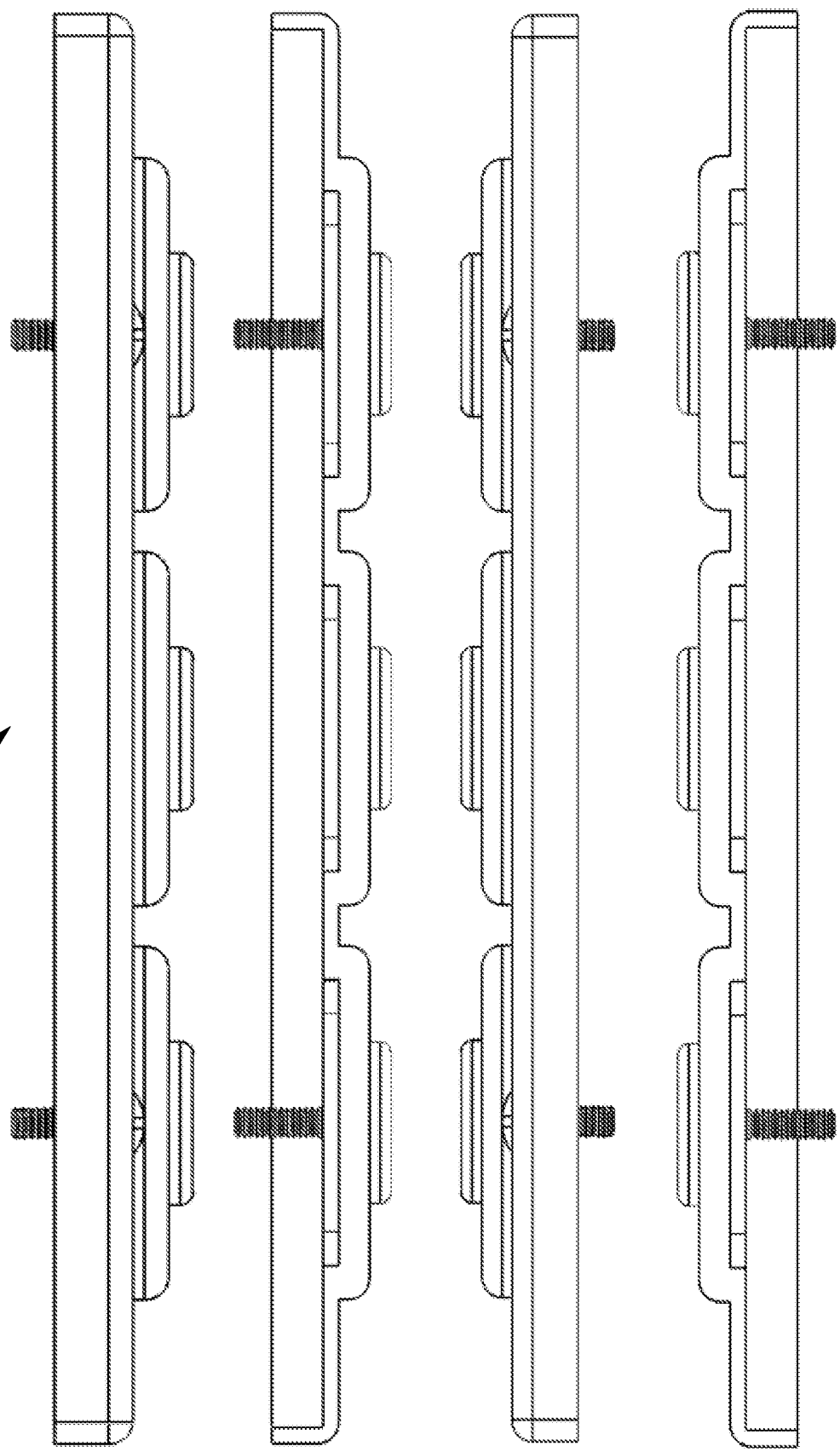
FIG. 76 illustrates detail top and bottom views and top and bottom section views of a preferred exemplary embodiment of a rocker switch panel (RSP) faceplate (RSF) embodiment of the present invention.
Figure 77:
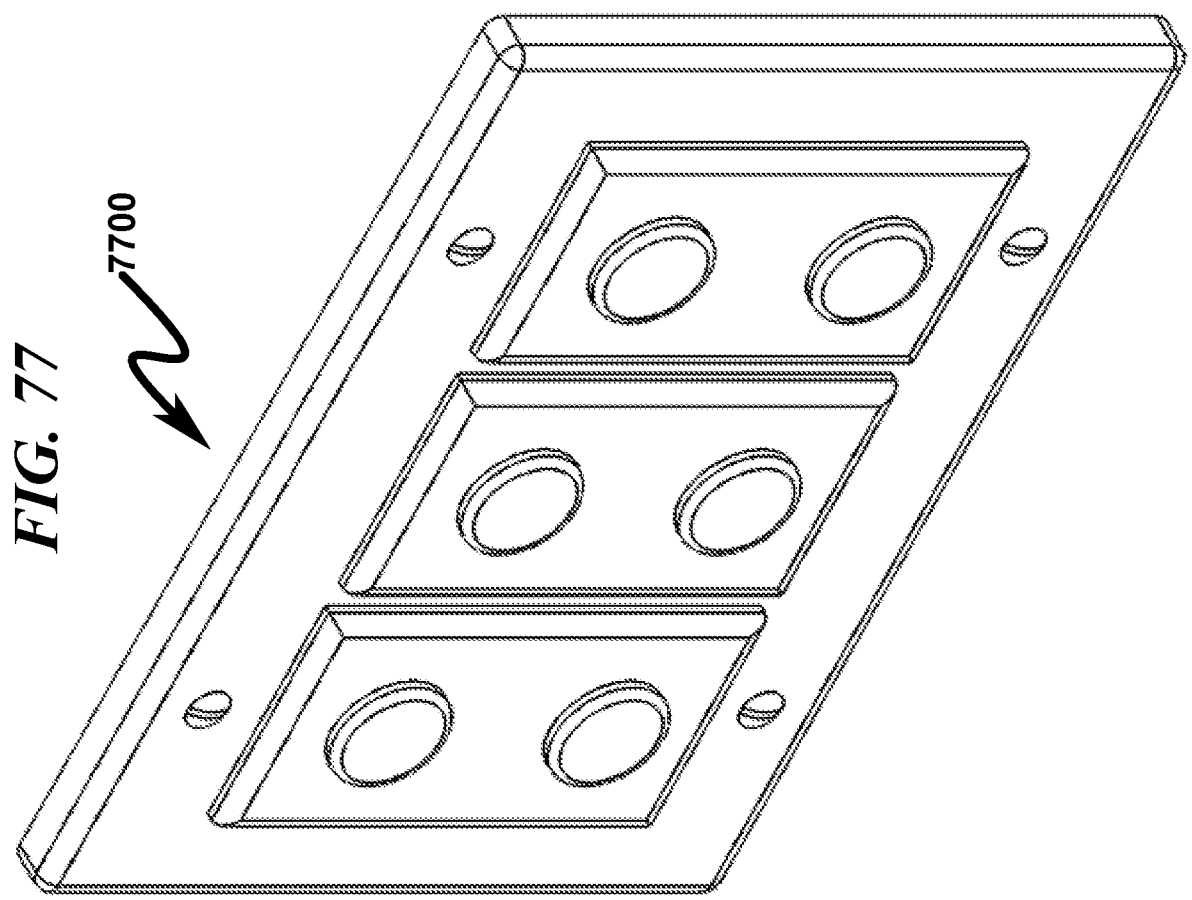
FIG. 77 illustrates a detail front top right perspective view of a preferred exemplary embodiment of a rocker switch panel (RSP) faceplate (RSF) embodiment of the present invention.
Figure 78:
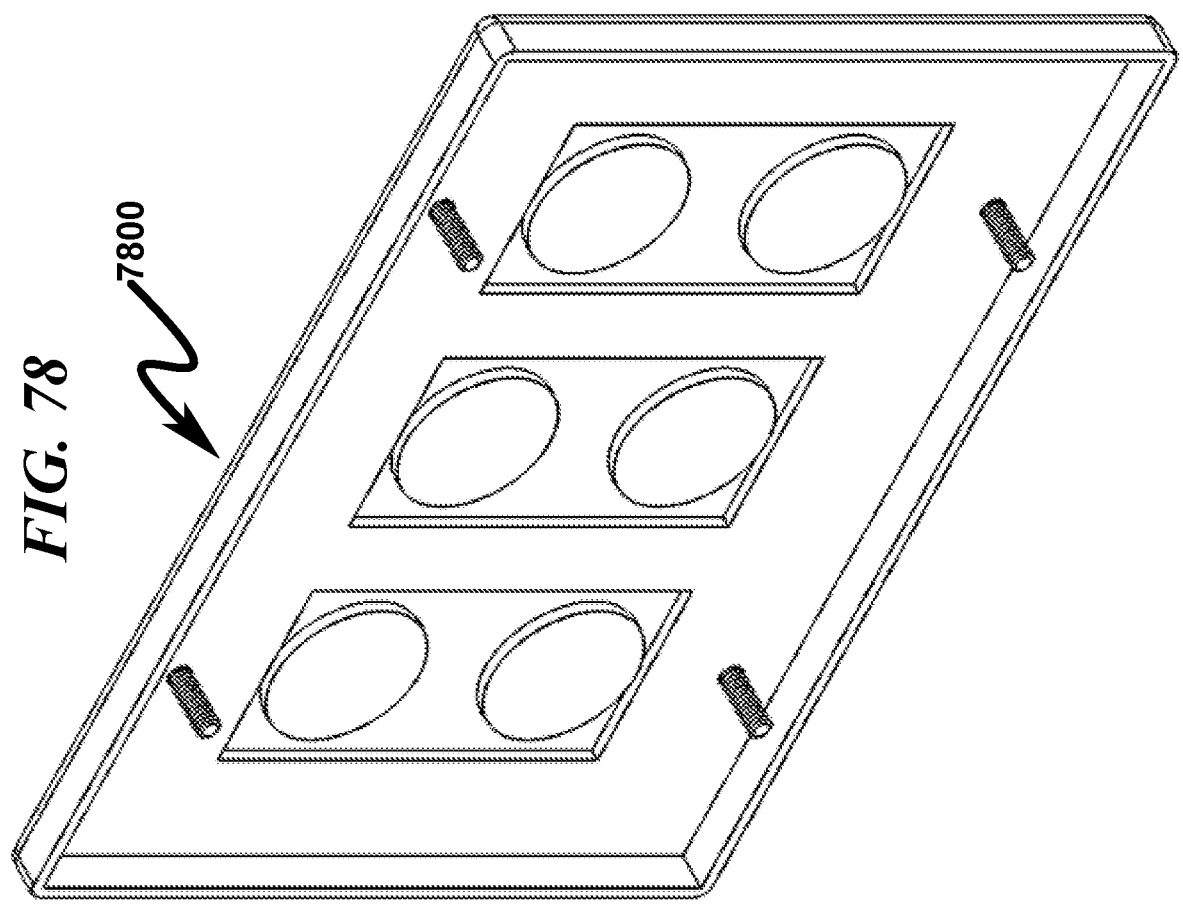
FIG. 78 illustrates a detail rear top left perspective view of a preferred exemplary embodiment of a rocker switch panel (RSP) faceplate (RSF) embodiment of the present invention.

The present t invention may also be embodied in configuration where a rocker switch panel (RSP) instead of toggle switch panel (TSP) is augmented with antimicrobial protection. This configuration is compatible with DÉCOR style rocker switches and associated switch panels. FIG. 65 (6500)-FIG. 79 (7900) provide an example of this configuration in which the rocker switches are augmented with a rocker switch faceplate (RSF) (7201) having rocker pushbutton inserts (RPI) (7202) that are combined together to cover an existing rocker switch faceplate (7203) so that contact with the underlying rocker switches in the configuration is only via the rocker pushbutton inserts (RPI) (7202) and the underlying rocker switch faceplate (7203) is covered by a rocker switch faceplate (RSF) (7201). In this configuration both the RSF (7201) and the RPI (7202) are composed of antimicrobial plastic, thus ensuring that any activation of the underlying rocker switches is isolated by an antimicrobial material.

Antimicrobial Switch Panel Method (8000)

The present invention anticipates that a method may be used to retrofit existing switch panels with antimicrobial features. In this context, a present invention method may be broadly generalized as a an antimicrobial switch panel (ASP) method operating on an antimicrobial switch panel (ASP) system, the system comprising a toggle switch cover (TSC), wherein:
  the TSC comprises a plastic molded extrusion (PME);
  the PME comprises an antimicrobial compound (AMC);
  the PME comprises an outer tactile surface (OTS) and an inner capture recess (ICR);
  the OTS comprises a face surface region (FSR), left surface region (LSR), right surface region (RSR), top surface region (TSR), and bottom surface region (BSR);
  the ICR is configured to conform to the outer surface of a toggle switch (TSW) toggle switch lever (TSL); and
  the ICR comprises one or more surfaces configured with protrusions and/or indentations that affect mechanical coupling between the TSL and the PME when the ICR is mated with the TSL;
  wherein the method comprises the steps of:
  (1) covering a switch panel faceplate (SPF) attached to the TSW with an antimicrobial faceplate cover (AFC) (8001);
  (2) mechanically coupling the AFC to the SPF (8002);
  (3) orienting the ICR over the TSL of the TSW to affect insertion of the ICR around the TSL (8003);
  (4) applying force to the PME to force the ICR in contact with the TSL while simultaneously mating the ICR with outer surfaces of the TSL (8004); and
  (5) continuing step (3) until the FSR makes contact with all surfaces of the ICR of the PME (8005).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

TSC Tactile Differentiation

The present invention specifically anticipates that the toggle switch cover (TSC) formed from a plastic molded extrusion (PME) may be formed such that the four outer surfaces of the PME (front, top, bottom, left, and right) may each contain a tactile surface containing protrusions and/or indentations that uniquely identify the toggle switch associated with the TSC. In this manner, it would be possible to differentiate the function of each switch based on the surface formation of the TSC that covers each individual TSL.

TSC Color Differentiation

The present invention specifically anticipates that the toggle switch cover (TSC) formed from a plastic molded extrusion (PME) may be impregnated with a colorant material that uniquely identify the toggle switch associated with the TSC. In this manner, it would be possible to differentiate the function of each switch based on the color of the TSC that covers each individual TSL. These colors allow the use of generically manufactured TSWs or other switch types to be uniquely identified as to their function. For example, a different color may be used for lighting or fan controls, etc.

PME Photoluminescent Impregnation

The present invention specifically anticipates that the toggle switch cover (TSC) formed from a plastic molded extrusion (PME) may be impregnated with a photoluminescent material such that it glows in the dark when previously exposed to ambient light.

System Summary

The present invention system may be broadly generalized as an antimicrobial switch panel (ASP) system comprising a toggle switch cover (TSC), wherein:
  the TSC comprises a plastic molded extrusion (PME);
  the PME comprises an antimicrobial compound (AMC);
  the PME comprises an outer tactile surface (OTS) and an inner capture recess (ICR);
  the OTS comprises a face surface region (FSR), left surface region (LSR), right surface region (RSR), top surface region (TSR), and bottom surface region (BSR);
  the ICR is configured to conform to the outer surface of a toggle switch (TSW) toggle switch lever (TSL); and
  the ICR comprises one or more surfaces configured with protrusions and/or indentations that affect mechanical coupling between the TSL and the PME when the ICR is mated with the TSL.

This general system summary may be augmented by the various elements described herein to produce a wide variety of invention embodiments consistent with this overall design description.

METHOD SUMMARY

The present invention method may be broadly generalized as a an antimicrobial switch panel (ASP) method operating on an antimicrobial switch panel (ASP) system, the system comprising a toggle switch cover (TSC), wherein:
- the TSC comprises a plastic molded extrusion (PME);
- the PME comprises an antimicrobial compound (AMC);
- the PME comprises an outer tactile surface (OTS) and an inner capture recess (ICR);
- the OTS comprises a face surface region (FSR), left surface region (LSR), right surface region (RSR), top surface region (TSR), and bottom surface region (BSR);
- the ICR is configured to conform to the outer surface of a toggle switch (TSW) toggle switch lever (TSL); and
- the ICR comprises one or more surfaces configured with protrusions and/or indentations that affect mechanical coupling between the TSL and the PME when the ICR is mated with the TSL;
- wherein the method comprises the steps of:
  (1) covering a switch panel faceplate (SPF) attached to the TSW with an antimicrobial faceplate cover (AFC) (8001);
  (2) mechanically coupling the AFC to the SPF (8002);
  (3) orienting the ICR over the TSL of the TSW to affect insertion of the ICR around the TSL (8003);
  (4) applying force to the PME to force the ICR in contact with the TSL while simultaneously mating the ICR with outer surfaces of the TSL (8004); and
  (5) continuing step (3) until the FSR makes contact with all surfaces of the ICR of the PME (8005).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:
- An embodiment wherein the TSC comprises an external surface texture (EST) that identifies the function of the TSW.
- An embodiment wherein the FSR, the LSR, the RSR, the TSR, and the BSR are configured with a combination of individual protrusions, indentations, or lack thereof that identifies the function of the TSW.
- An embodiment wherein the TSC comprises an external surface texture (EST) comprising one or more half-cylinder surface protrusions.
- An embodiment wherein the TSC comprises an external surface texture (EST) comprising one or more perimeter surface ridge protrusions.
- An embodiment wherein the TSC comprises an external surface texture (EST) comprising one or more half-cylinder surface indentions.
- An embodiment wherein the TSC comprises an external surface texture (EST) comprising one or more triangular surface protrusions.
- An embodiment wherein the PME is comprised of a material having a selected color that identifies the function of the TSW.
- An embodiment wherein the PME is comprised of a photoluminescent material.
- An embodiment wherein the PME comprises a V-shaped void on one or more outer surface of the PME that permits flexing of the ICR when mating with the TSL.

One skilled in the art will recognize that other embodiments are possible based on combinations of elements taught within the above invention description.

CONCLUSION

An antimicrobial switch panel (ASP) system/method allowing for retrofit of existing switch panels with protective antimicrobial covers for toggle switch levers has been disclosed. The disclosed system incorporates a toggle switch cover (TSC) formed from a plastic molded extrusion (PME) that is impregnated with an antimicrobial compound (AMC). The PME includes an outer tactile surface (OTS) and an inner capture recess (ICR). The ICR is configured to conform to the outer surface of a toggle switch (TSW) toggle switch lever (TSL) and includes one or more surfaces configured with protrusions and/or indentations that affect mechanical coupling between the TSL and the PME when the ICR is mated with the TSL. The OTS may be configured with a variety of tactile configurations that identify the function of the TSW and/or include a PME colorant that identifies the function of the TSW and/or provide for photoluminescent operation of the PME.

Claims Interpretation

The following rules apply when interpreting the CLAIMS of the present invention:
- The CLAIM PREAMBLE should be considered as limiting the scope of the claimed invention.
- "WHEREIN" clauses should be considered as limiting the scope of the claimed invention.
- "WHEREBY" clauses should be considered as limiting the scope of the claimed invention.
- "ADAPTED TO" clauses should be considered as limiting the scope of the claimed invention.
- "ADAPTED FOR" clauses should be considered as limiting the scope of the claimed invention.
- The term "MEANS" specifically invokes the means-plus-function claims limitation recited in 35 U.S.C. § 112 (f) and such claim shall be construed to cover the corresponding structure, material, or acts described in the specification and equivalents thereof.
- The phrase "MEANS FOR" specifically invokes the means-plus-function claims limitation recited in 35 U.S.C. § 112 (f) and such claim shall be construed to cover the corresponding structure, material, or acts described in the specification and equivalents thereof.
- The phrase "STEP FOR" specifically invokes the step-plus-function claims limitation recited in 35 U.S.C. § 112 (f) and such claim shall be construed to cover the corresponding structure, material, or acts described in the specification and equivalents thereof.
- The step-plus-function claims limitation recited in 35 U.S.C. § 112 (f) shall be construed to cover the corresponding structure, material, or acts described in the specification and equivalents thereof ONLY for such claims including the phrases "MEANS FOR", "MEANS", or "STEP FOR".
- The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. An antimicrobial switch panel (ASP) system comprising a toggle switch cover (TSC), wherein:
    said TSC comprises a plastic molded extrusion (PME);
    said PME comprises an antimicrobial compound (AMC);
    said PME comprises an outer tactile surface (OTS) (3301) and an inner capture recess (ICR) (3302);
    said OTS comprises a face surface region (FSR) (3303, 3503), left surface region (LSR) (3504, 3604), right surface region (RSR) (3505, 3605), top surface region (TSR) (3506, 3606), and bottom surface region (BSR) (3507, 3607);
    said ICR is configured to conform to the outer surface of a toggle switch (TSW) toggle switch lever (TSL);
    said ICR comprises one or more surfaces configured with protrusions (3308, 34083508, 3608) and/or indentations that affect mechanical coupling between said TSL and said PME when said ICR is mated with said TSL; and
    said PME comprises a V-shaped void (3409, 3509, 3609) on one or more outer surface of said PME that permits flexing of said ICR when mating with said TSL.

2. The antimicrobial switch panel (ASP) system of claim 1 wherein said TSC comprises an external surface texture (EST) that identifies the function of said TSW.

3. The antimicrobial switch panel (ASP) system of claim 1 wherein said FSR, said LSR, said RSR, said TSR, and said BSR are configured with a combination of individual protrusions, indentations, or lack thereof that identifies the function of said TSW.

4. The antimicrobial switch panel (ASP) system of claim 1 wherein said TSC comprises an external surface texture (EST) comprising one or more half-cylinder surface protrusions.

5. The antimicrobial switch panel (ASP) system of claim 1 wherein said TSC comprises an external surface texture (EST) comprising one or more perimeter surface ridge protrusions.

6. The antimicrobial switch panel (ASP) system of claim 1 wherein said TSC comprises an external surface texture (EST) comprising one or more half-cylinder surface indentions.

7. The antimicrobial switch panel (ASP) system of claim 1 wherein said TSC comprises an external surface texture (EST) comprising one or more triangular surface protrusions.

8. The antimicrobial switch panel (ASP) system of claim 1 wherein said PME is comprised of a material having a selected color that identifies the function of said TSW.

9. The antimicrobial switch panel (ASP) system of claim 1 wherein said PME is comprised photoluminescent material.

10. An antimicrobial switch panel (ASP) method operating on an antimicrobial switch panel (ASP) system, said system comprising a toggle switch cover (TSC), wherein:
    said TSC comprises a plastic molded extrusion (PME);
    said PME comprises an antimicrobial compound (AMC);
    said PME comprises an outer tactile surface (OTS) (3301) and an inner capture recess (ICR) (3302);
    said OTS comprises a face surface region (FSR) (3303, 3503), left surface region (LSR) (3504, 3604), right surface region (RSR) (3505, 3605), top surface region (TSR) (3506, 3606), and bottom surface region (BSR) (3507, 3607);
    said ICR is configured to conform to the outer surface of a toggle switch (TSW) toggle switch lever (TSL);
    said ICR comprises one or more surfaces configured with protrusions (3308, 3408, 3508, 3608) and/or indentations that affect mechanical coupling between said TSL and said PME when said ICR is mated with said TSL; and
    said PME comprises a V-shaped void (3409, 3509, 3609) on one or more outer surface of said PME that permits flexing of said ICR when mating with said TSL;
    wherein said method comprises the steps of:
    (1) covering a switch panel faceplate (SPF) attached to said TSW with an antimicrobial faceplate cover (AFC) (8001);
    (2) mechanically coupling said AFC to said SPF (8002);
    (3) orienting said ICR over said TSL of said TSW to affect insertion of said ICR around said TSL (8003);
    (4) applying force to said PME to force said ICR in contact with said TSL while simultaneously mating said ICR with outer surfaces of said TSL (8004); and
    (5) continuing said step (3) until said FSR makes contact with all surfaces of said ICR of said PME (8005).

11. The antimicrobial switch panel (ASP) method of claim 10 wherein said TSC comprises an external surface texture (EST) that identifies the function of said TSW.

12. The antimicrobial switch panel (ASP) method of claim 10 wherein said FSR, said LSR, said RSR, said TSR, and said BSR are configured with a combination of individual protrusions, indentations, or lack thereof that identifies the function of said TSW.

13. The antimicrobial switch panel (ASP) method of claim 10 wherein said TSC comprises an external surface texture (EST) comprising one or more half-cylinder surface protrusions.

14. The antimicrobial switch panel (ASP) method of claim 10 wherein said TSC comprises an external surface texture (EST) comprising one or more perimeter surface ridge protrusions.

15. The antimicrobial switch panel (ASP) method of claim 10 wherein said TSC comprises an external surface texture (EST) comprising one or more half-cylinder surface indentions.

16. The antimicrobial switch panel (ASP) method of claim 10 wherein said TSC comprises an external surface texture (EST) comprising one or more triangular surface protrusions.

17. The antimicrobial switch panel (ASP) method of claim 10 wherein said PME is comprised of a material having a selected color that identifies the function of said TSW.

18. The antimicrobial switch panel (ASP) method of claim 10 wherein said PME is comprised of a photoluminescent material.

\* \* \* \* \*